United States Patent
Corbin et al.

(10) Patent No.: US 9,844,911 B2
(45) Date of Patent: *Dec. 19, 2017

(54) AIR CUSHION INFLATION MACHINE

(71) Applicant: Automated Packaging Systems, Inc., Streetsboro, OH (US)

(72) Inventors: Douglas C. Corbin, Twinsburg, OH (US); Donald P. Shook, Solon, OH (US); Robert L. Ferrante, Stow, OH (US); Michael J. Riccardi, Chesterland, OH (US); Rick Steven Wehrmann, Hudson, OH (US)

(73) Assignee: AUTOMATED PACKAGING SYSTEMS, INC., Streetsboro, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/550,034

(22) Filed: Nov. 21, 2014

(65) Prior Publication Data

US 2015/0144268 A1    May 28, 2015

Related U.S. Application Data

(60) Provisional application No. 61/907,347, filed on Nov. 21, 2013.

(51) Int. Cl.
*B29C 65/00* (2006.01)
*B29D 22/02* (2006.01)
(Continued)

(52) U.S. Cl.
CPC ............ *B29C 66/439* (2013.01); *B29C 65/18* (2013.01); *B29C 65/222* (2013.01); (Continued)

(58) Field of Classification Search
CPC . B29C 47/1036; B29C 66/439; B29C 65/222; B29C 65/223; B29C 65/224;
(Continued)

(56) References Cited

U.S. PATENT DOCUMENTS 2,153,214 A   4/1939   Tondrean
2,379,935 A   7/1945   Seiferth et al.
(Continued)

FOREIGN PATENT DOCUMENTS

CA   2428246   9/2002
EP   597446 A1   5/1994
(Continued)

OTHER PUBLICATIONS

Office Action from U.S. Appl. No. 14/482,706 dated Apr. 20, 2016.
(Continued)

*Primary Examiner* — George Koch
(74) *Attorney, Agent, or Firm* — Calfee, Halter & Griswold LLP

(57) ABSTRACT

A machine converts a web of preformed pouches, which are defined by transverse seals extending from a remote edge, into inflated dunnage units. A sealing arrangement is positioned to provide a longitudinal seal intersecting the transverse seals to close the preformed pouches and form a dunnage unit. The sealing arrangement has at least two sealing belts. Each belt is positioned so that respective first sides engage a surface of the web and pull the web through sealing elements positioned on either side of the web. A heating element is on a second side of the first belt not engaging the web. A compliant material is on a second side of the second belt not engaging the web. As the web passes between the heating element and compliant material, imperfections in the web are smoothed by the compliant material and the layers of the web are sealed by the heating element.

8 Claims, 63 Drawing Sheets

(51) Int. Cl.
   *B65D 81/05*      (2006.01)
   *B29C 65/18*      (2006.01)
   *B29C 65/22*      (2006.01)
   *B29C 65/78*      (2006.01)

(52) U.S. Cl.
   CPC ...... *B29C 65/7802* (2013.01); *B29C 65/7873* (2013.01); *B29C 66/0342* (2013.01); *B29C 66/1122* (2013.01); *B29C 66/344* (2013.01); *B29C 66/431* (2013.01); *B29C 66/8161* (2013.01); *B29C 66/81262* (2013.01); *B29C 66/83423* (2013.01); *B29C 66/872* (2013.01); *B29C 66/91213* (2013.01); *B29C 66/91421* (2013.01); *B29C 66/91431* (2013.01); *B29C 66/91641* (2013.01); *B29C 66/91651* (2013.01); *B29C 66/91951* (2013.01); *B29C 66/934* (2013.01); *B29D 22/02* (2013.01); *B65D 81/052* (2013.01); *B29C 66/71* (2013.01); *B29C 66/8122* (2013.01); *B29C 66/81457* (2013.01); *B29C 66/91212* (2013.01); *B29C 66/91643* (2013.01); *B29C 66/91653* (2013.01); *B29C 66/91655* (2013.01)

(58) Field of Classification Search
   CPC .... B29C 65/7873; B65H 20/02; B65H 21/00; B25J 11/005; B25J 15/0028; B29L 2030/00
   USPC .............................. 156/358, 359, 378, 583.5
   See application file for complete search history.

(56) References Cited

U.S. PATENT DOCUMENTS

| | | |
|---|---|---|
| 3,033,257 A | 5/1962 | Weber |
| 3,254,820 A | 6/1966 | Lerner |
| 3,254,828 A | 6/1966 | Lerner |
| 3,298,156 A | 1/1967 | Lerner |
| 3,358,823 A | 12/1967 | Paxton |
| 3,359,703 A | 12/1967 | Quaadgras |
| 3,389,534 A | 6/1968 | Pendelton |
| 3,405,020 A | 10/1968 | Chavannes |
| 3,414,140 A | 12/1968 | Feldkamp |
| 3,456,867 A | 7/1969 | Repko |
| 3,462,027 A | 8/1969 | Puckhaber |
| 3,477,196 A | 11/1969 | Lerner |
| 3,501,085 A | 3/1970 | Dohmeier |
| 3,523,055 A | 8/1970 | Lemelson |
| 3,559,874 A | 2/1971 | Titchenal |
| 3,575,757 A | 4/1971 | Smith |
| 3,575,781 A | 4/1971 | Pezely |
| 3,577,305 A | 5/1971 | Hines et al. |
| 3,597,895 A | 8/1971 | Jensen |
| 3,616,155 A | 10/1971 | Chavannes |
| 3,618,286 A | 11/1971 | Membrino |
| 3,650,877 A | 3/1972 | Johnson |
| 3,660,189 A | 5/1972 | Troy |
| 3,667,593 A | 6/1972 | Pendleton |
| 3,696,580 A | 10/1972 | Saltzer |
| 3,699,746 A | 10/1972 | Titchenal |
| 3,730,240 A | 5/1973 | Presnick |
| 3,744,211 A | 7/1973 | Titchenal et al. |
| 3,791,573 A | 2/1974 | Armstrong |
| 3,795,163 A | 3/1974 | Armstrong et al. |
| 3,802,974 A | 4/1974 | Emmel |
| 3,808,981 A | 5/1974 | Shaw |
| 3,813,845 A | 6/1974 | Weikert |
| 3,817,017 A | 6/1974 | Titchenal |
| 3,817,803 A | 6/1974 | Horsley |
| 3,837,990 A | 9/1974 | Huffaker et al. |
| 3,837,991 A | 9/1974 | Evans et al. |
| 3,855,037 A | 12/1974 | Imhagen et al. |
| 3,868,056 A | 2/1975 | Keren |
| 3,938,298 A | 2/1976 | Luhman et al. |
| 3,939,995 A | 2/1976 | Baxter |
| 3,941,306 A | 3/1976 | Weikert |
| 4,011,798 A | 3/1977 | Bambara |
| 4,014,154 A | 3/1977 | Lerner |
| 4,017,351 A | 4/1977 | Larson |
| 4,021,283 A | 5/1977 | Weikert |
| 4,040,526 A | 8/1977 | Baxter et al. |
| 4,044,693 A | 8/1977 | Ramsey, Jr. |
| 4,076,872 A | 2/1978 | Lewicki et al. |
| 4,087,002 A | 5/1978 | Bambara |
| 4,096,306 A | 6/1978 | Larson |
| 4,102,364 A | 7/1978 | Leslie |
| 4,103,471 A | 8/1978 | Lowdermilk |
| 4,146,069 A | 3/1979 | Angarola et al. |
| 4,169,002 A | 9/1979 | Larson |
| 4,201,029 A | 5/1980 | Lerner |
| 4,214,024 A | 7/1980 | Jacobson |
| 4,245,796 A | 1/1981 | Eglinton |
| 4,284,221 A | 8/1981 | Nagel |
| 4,306,656 A | 12/1981 | Dahlem |
| 4,314,865 A | 2/1982 | Ottaviano |
| 4,354,004 A | 10/1982 | Hughes et al. |
| 4,380,484 A | 4/1983 | Repik et al. |
| 4,493,684 A | 1/1985 | Bolton |
| 4,498,894 A | 2/1985 | Kuckhermann |
| 4,514,962 A | 5/1985 | Ausnit |
| 4,518,654 A | 5/1985 | Eichbauer et al. |
| 4,545,180 A | 10/1985 | Chung et al. |
| 4,551,379 A | 11/1985 | Matarasso |
| 4,564,407 A | 1/1986 | Tsuruta |
| 4,576,669 A | 3/1986 | Caputo |
| 4,597,244 A | 7/1986 | Pharo |
| 4,598,421 A | 7/1986 | Jostler |
| 4,616,472 A | 10/1986 | Owensby et al. |
| 4,619,635 A | 10/1986 | Ottaviano |
| 4,631,901 A | 12/1986 | Chung et al. |
| 4,654,878 A | 3/1987 | Lems |
| 4,664,577 A | 5/1987 | Bonali |
| 4,676,376 A | 6/1987 | Kerswetter |
| 4,679,688 A | 7/1987 | Soderholm |
| 4,787,755 A | 11/1988 | Branson |
| 4,793,123 A | 12/1988 | Pharo |
| 4,847,126 A | 7/1989 | Yamashiro et al. |
| 4,874,093 A | 10/1989 | Pharo |
| 4,901,506 A * | 2/1990 | Weyandt ................ B29C 65/18 219/110 |
| 4,904,092 A | 2/1990 | Campbell et al. |
| 4,918,904 A | 4/1990 | Pharo |
| 4,922,687 A | 5/1990 | Chow et al. |
| 4,931,033 A | 6/1990 | Leeds |
| 4,945,714 A | 8/1990 | Bodolay et al. |
| 4,981,374 A | 1/1991 | Rutter et al. |
| 5,034,450 A | 7/1991 | Betz |
| 5,041,317 A | 8/1991 | Greyvenstein |
| 5,064,408 A | 11/1991 | Bridgeman |
| 5,070,675 A | 12/1991 | Chuan-Shiang |
| 5,094,657 A | 3/1992 | Dworak et al. |
| 5,117,608 A | 6/1992 | Nease et al. |
| 5,141,494 A | 8/1992 | Danforth et al. |
| 5,181,614 A | 1/1993 | Watts |
| 5,187,917 A | 2/1993 | Mykleby |
| 5,188,691 A | 2/1993 | Caputo |
| 5,203,761 A | 4/1993 | Reichental et al. |
| 5,210,993 A | 5/1993 | van Boxtel |
| 5,216,868 A | 6/1993 | Cooper et al. |
| 5,257,492 A | 11/1993 | Watts |
| 5,272,856 A | 12/1993 | Pharo |
| 5,289,671 A | 3/1994 | Lerner |
| 5,307,969 A | 5/1994 | Menendez |
| 5,340,632 A | 8/1994 | Chappuis |
| 5,351,828 A | 10/1994 | Becker et al. |
| 5,383,837 A | 1/1995 | Watts |
| 5,394,676 A | 3/1995 | Lerner |
| 5,427,294 A | 6/1995 | VandenHeuvel |
| 5,427,830 A | 6/1995 | Pharo |
| 5,454,642 A | 10/1995 | DeLuca |
| 5,468,525 A | 11/1995 | Watts |
| 5,470,300 A | 11/1995 | Terranova |
| 5,549,233 A | 8/1996 | Clauser |

(56) References Cited

U.S. PATENT DOCUMENTS

| | | |
|---|---|---|
| 5,552,003 A | 9/1996 | Hoover et al. |
| 5,651,237 A | 7/1997 | DeLuca |
| 5,687,549 A | 11/1997 | Jostler et al. |
| 5,693,163 A | 12/1997 | Hoover et al. |
| 5,699,653 A | 12/1997 | Hartman et al. |
| 5,704,192 A | 1/1998 | Jostler et al. |
| 5,722,218 A | 3/1998 | Lerner |
| 5,733,045 A | 3/1998 | Jostler et al. |
| 5,752,666 A | 5/1998 | Simhaee |
| 5,755,328 A | 5/1998 | DeLuca |
| 5,784,861 A | 7/1998 | Kotsiopoulos |
| 5,810,200 A | 9/1998 | Trokhan |
| 5,824,392 A | 10/1998 | Gotoh et al. |
| 5,826,723 A | 10/1998 | Jaszai |
| 5,921,390 A | 7/1999 | Simhaee |
| 5,941,053 A | 8/1999 | Kotsiopoulos |
| 5,944,424 A | 8/1999 | Lerner et al. |
| 5,961,020 A | 10/1999 | Schmidt |
| 5,987,856 A | 11/1999 | Lerner |
| 5,996,319 A | 12/1999 | Lerner et al. |
| RE36,501 E | 1/2000 | Hoover et al. |
| 6,010,090 A | 1/2000 | Bushmaker et al. |
| 6,015,047 A | 1/2000 | Greenland |
| 6,015,357 A | 1/2000 | Rizza |
| 6,055,796 A | 5/2000 | Lerner et al. |
| RE36,759 E | 7/2000 | Hoover et al. |
| 6,116,000 A | 9/2000 | Perkins et al. |
| 6,139,188 A | 10/2000 | Marzano |
| 6,170,238 B1 | 1/2001 | Lerner |
| 6,199,349 B1 | 3/2001 | Lerner |
| 6,206,262 B1 | 3/2001 | Achelpohl |
| 6,209,286 B1 | 4/2001 | Perkins et al. |
| 6,213,167 B1 | 4/2001 | Greenland |
| 6,228,454 B1 | 5/2001 | Johnson et al. |
| 6,282,716 B1 | 9/2001 | Patterson et al. |
| 6,367,975 B1 | 4/2002 | Cronauer et al. |
| 6,410,119 B1 | 6/2002 | DeLuca et al. |
| 6,423,166 B1 | 7/2002 | Simhaee |
| 6,447,864 B2 | 9/2002 | Johnson et al. |
| 6,460,313 B1 | 10/2002 | Cooper |
| 6,488,222 B1 | 12/2002 | West et al. |
| 6,499,278 B2 | 12/2002 | Cronauer et al. |
| 6,519,916 B1 | 2/2003 | Brown |
| 6,527,147 B2 | 3/2003 | Wehrmann |
| 6,536,624 B2 | 3/2003 | Johnson et al. |
| 6,543,201 B2 | 4/2003 | Cronauer et al. |
| 6,550,229 B2 | 4/2003 | Sperry et al. |
| 6,565,946 B2 | 5/2003 | Perkins et al. |
| 6,582,800 B2 | 6/2003 | Fuss et al. |
| 6,609,644 B1 | 8/2003 | Menna |
| 6,625,956 B1 | 9/2003 | Soudan |
| D480,646 S | 10/2003 | Borchard et al. |
| D480,971 S | 10/2003 | DeLuca et al. |
| 6,635,145 B2 | 10/2003 | Cooper |
| 6,651,406 B2 | 11/2003 | Sperry et al. |
| 6,659,150 B1 | 12/2003 | Perkins et al. |
| 6,672,037 B2 | 1/2004 | Wehrmann |
| 6,696,127 B1 | 2/2004 | Mitchell, Jr. |
| D490,711 S | 6/2004 | DeLuca et al. |
| 6,742,317 B2 | 6/2004 | Cronauer et al. |
| 6,751,926 B1 | 6/2004 | Cooper |
| 6,761,960 B2 | 7/2004 | DeLuca et al. |
| 6,786,022 B2 | 9/2004 | Fuss et al. |
| 6,800,162 B2 | 10/2004 | Kannankeril |
| 6,871,755 B2 | 3/2005 | DeVries |
| 6,889,739 B2 | 5/2005 | Lerner et al. |
| 6,946,044 B2 | 9/2005 | Lörsch |
| 6,948,296 B1 | 9/2005 | Lerner et al. |
| 6,952,910 B1 | 10/2005 | Lörsch |
| 6,955,846 B2 | 10/2005 | Lerner |
| D512,311 S | 12/2005 | DeLuca et al. |
| D513,182 S | 12/2005 | DeLuca et al. |
| 7,032,774 B2 | 4/2006 | Boehm |
| 7,059,794 B2 | 6/2006 | Weeks |
| 7,125,463 B2 | 10/2006 | Lerner et al. |
| 7,128,211 B2 | 10/2006 | Nishi |
| 7,165,375 B2 | 1/2007 | O'Dowd |
| 7,223,462 B2 | 5/2007 | Perkins et al. |
| 7,297,387 B2 | 11/2007 | Koyanagi |
| 7,331,542 B2 | 2/2008 | Coffiadiferro et al. |
| 7,467,738 B2 | 12/2008 | Woods |
| 7,513,090 B2 | 4/2009 | Wehrmann |
| 7,533,772 B2 | 5/2009 | Yoshifusa et al. |
| 7,540,125 B2 | 6/2009 | Lindquist |
| 7,550,191 B2 | 6/2009 | Lerner |
| 7,552,571 B2 | 6/2009 | Lerner et al. |
| D596,031 S | 7/2009 | Wehrmann |
| 7,571,584 B2 | 8/2009 | Lerner |
| 7,578,333 B2 | 8/2009 | Greenwood et al. |
| D599,118 S | 9/2009 | Perkins et al. |
| 7,603,830 B2 | 10/2009 | Nowakowski |
| 7,607,911 B2 | 10/2009 | Sperry et al. |
| D603,705 S | 11/2009 | Wehrmann |
| 7,621,104 B2 | 11/2009 | Piucci |
| 7,665,394 B2 | 2/2010 | Roberts |
| 7,694,495 B2 | 4/2010 | Wehrmann |
| 7,718,028 B2 | 5/2010 | Lerner et al. |
| 7,757,459 B2 | 7/2010 | Wehrmann |
| 7,767,288 B2 | 8/2010 | Lerner |
| D630,945 S | 1/2011 | Wehrmann |
| D633,792 S | 3/2011 | Wehrmann |
| 7,897,219 B2 | 3/2011 | Wehrmann |
| 7,897,220 B2 | 3/2011 | Wehrmann |
| 7,950,433 B2 | 5/2011 | Sperry et al. |
| 7,975,457 B2 | 7/2011 | Wehrmann |
| D646,972 S | 10/2011 | Wehrmann |
| 8,038,348 B2 | 10/2011 | Lerner |
| 8,128,770 B2 | 3/2012 | Wetsch et al. |
| 8,307,617 B2 | 11/2012 | Riccardi et al. |
| 8,354,150 B2 | 1/2013 | Whermann et al. |
| 8,357,439 B2 | 1/2013 | Wehrmann |
| 8,425,994 B2 | 4/2013 | Wehrmann |
| 9,205,622 B2 | 12/2015 | Wehrmann |
| 9,266,300 B2 * | 2/2016 | Chuba ................ B31D 5/0073 |
| 9,283,729 B2 | 3/2016 | Wehrmann et al. |
| 9,550,339 B2 | 1/2017 | Wehrmann et al. |
| 2001/0000719 A1 | 5/2001 | Lerner |
| 2001/0000737 A1 | 5/2001 | Johnson et al. |
| 2001/0013215 A1 | 8/2001 | Fuss et al. |
| 2001/0014980 A1 | 8/2001 | Patterson et al. |
| 2002/0094393 A1 | 7/2002 | Matarasso |
| 2002/0108697 A1 | 8/2002 | Perkins et al. |
| 2002/0150730 A1 | 10/2002 | DeLuca et al. |
| 2002/0155246 A1 | 10/2002 | Johnson et al. |
| 2002/0174629 A1 | 11/2002 | Cronauer et al. |
| 2003/0089082 A1 | 5/2003 | Fuss et al. |
| 2003/0094395 A1 | 5/2003 | Peper et al. |
| 2003/0109369 A1 | 6/2003 | Lerner et al. |
| 2004/0000581 A1 | 1/2004 | Brandolini et al. |
| 2004/0022457 A1 | 2/2004 | Brown |
| 2004/0265523 A1 | 12/2004 | Koyanagi et al. |
| 2005/0221059 A1 | 10/2005 | Matarasso |
| 2005/0266189 A1 | 12/2005 | Wehrmann |
| 2006/0042191 A1 | 3/2006 | Lerner |
| 2006/0086064 A1 | 4/2006 | Wehrmann |
| 2006/0090421 A1 | 5/2006 | Sperry |
| 2006/0218879 A1 | 10/2006 | Garceau et al. |
| 2006/0262997 A1 | 11/2006 | Lerner et al. |
| 2006/0292320 A1 * | 12/2006 | Greenwood ............ B29C 65/18 |
| | | 428/34.1 |
| 2007/0054074 A1 | 3/2007 | Wehrmann |
| 2007/0054075 A1 | 3/2007 | Wehrmann |
| 2007/0084322 A1 | 4/2007 | Williams |
| 2007/0100076 A1 | 5/2007 | Hayes |
| 2008/0022630 A1 | 1/2008 | Fuss et al. |
| 2008/0066852 A1 | 3/2008 | Wetsch et al. |
| 2008/0175522 A1 | 7/2008 | Chuang |
| 2009/0110864 A1 | 4/2009 | Wehrmann |
| 2009/0293427 A1 | 12/2009 | Lerner et al. |
| 2010/0221466 A1 | 9/2010 | Wehrmann |
| 2010/0282824 A1 | 11/2010 | Kannankeril et al. |
| 2011/0165352 A1 | 7/2011 | Wehrmann |
| 2011/0167772 A1 * | 7/2011 | Piucci, Jr. ............ B29C 65/18 |
| | | 53/477 |

(56) References Cited

U.S. PATENT DOCUMENTS

| | | | |
|---|---|---|---|
| 2012/0084999 A1 | | 4/2012 | Davis et al. |
| 2012/0214658 A1* | | 8/2012 | Chuba .................. B65B 43/123 |
| | | | 493/405 |
| 2013/0011510 A1* | | 1/2013 | Chuba .................. B31D 5/0073 |
| | | | 425/324.1 |
| 2014/0130461 A1 | | 5/2014 | Johan |
| 2014/0314978 A1 | | 10/2014 | Lepine |

FOREIGN PATENT DOCUMENTS

| | | |
|---|---|---|
| EP | 1466720 | 10/2004 |
| EP | 1466839 A1 | 10/2004 |
| EP | 2143555 A1 | 1/2010 |
| GB | 2384459 | 7/2003 |
| JP | 2006069641 A1 | 3/2006 |
| WO | 97/46453 | 12/1997 |
| WO | 00/71423 | 11/2000 |
| WO | 01/53153 | 7/2001 |
| WO | 01/85434 | 11/2001 |
| WO | 02/26589 | 4/2002 |
| WO | 2005/118408 | 12/2005 |
| WO | 2007/070240 | 6/2007 |
| WO | 2009/058749 | 5/2009 |
| WO | 2010/109727 A1 | 9/2010 |
| WO | 2010/129530 A1 | 11/2010 |
| WO | 2013/022398 A1 | 2/2013 |

OTHER PUBLICATIONS

Office Action from U.S. Appl. No. 14/934,594 dated Apr. 13, 2016.
International Search Report and Written Opinion from PCT/US05/18817 dated Mar. 30, 2007.
International Search Report and Written Opinion from PCT/US06/45447, dated Feb. 22, 2007.
International Search Report and Written Opinion from PCT/US08/81410 dated Mar. 31, 2009.
International Search Report and Written Opinion from PCT/US09/38344 dated Dec. 22, 2009.
International Search Report and Written Opinion for PCT/US12/45718 dated Oct. 22, 2012.
International Search Report and Written Opinion for PCT/US2014/030424 dated Aug. 8, 2014.
International Search Report and Written Opinion for PCT/US2014/054965 dated Feb. 10, 2015.
International Search Report and Written Opinion from PCT/US2014/066799 dated Feb. 24, 2015.
Office action from U.S. Appl. No. 10/408,946 dated Jun. 7, 2004.
Amendment from U.S. Appl. No. 10/408,946 dated Sep. 23, 2004.
Office action from U.S. Appl. No. 10/408,946 dated Jan. 6, 2005.
Interview Summary from U.S. Appl. No. 10/408,946 dated Mar. 4, 2005.
Response from U.S. Appl. No. 10/408,946 dated Mar. 10, 2005.
Notice of Allowance from U.S. Appl. No. 10/408,946 dated Apr. 25, 2005.
Notice of Allowance from U.S. Appl. No. 10/408,947 dated Dec. 21, 2004.
Office action from U.S. Appl. No. 11/111,164 dated Apr. 27, 2006.
Response from U.S. Appl. No. 11/111,164 dated Jul. 17, 2006.
Notice of Allowance from U.S. Appl. No. 11/111,164 dated Aug. 23, 2006.
Office action from U.S. Appl. No. 11/141,304 dated Nov. 7, 2008.
Amendment from U.S. Appl. No. 11/141,304 dated Jan. 20, 2009.
Office action from U.S. Appl. No. 11/141,304 dated Apr. 28, 2009.
Amendment from U.S. Appl. No. 11/141,304 dated Jun. 24, 2009.
Office action from U.S. Appl. No. 11/141,304 dated Aug. 7, 2009.
Amendment from U.S. Appl. No. 11/141,304 dated Jan. 7, 2010.
Notice of Allowance from U.S. Appl. No. 11/141,304 dated Mar. 31, 2010.
Office action from U.S. Appl. No. 11/194,375 dated Nov. 13, 2006.
Office action from U.S. Appl. No. 11/194,375 dated Feb. 6, 2007.
Amendment from U.S. Appl. No. 11/194,375 dated May 4, 2007.
Office action from U.S. Appl. No. 11/194,375 dated Aug. 21, 2007.
Amendment from U.S. Appl. No. 11/194,375 dated Oct. 2, 2007.
Advisory action from U.S. Appl. No. 11/194,375 dated Oct. 9, 2007.
Office action from U.S. Appl. No. 11/194,375 dated Nov. 20, 2007.
Amendment from U.S. Appl. No. 11/194,375 dated Feb. 29, 2008.
Office action from U.S. Appl. No. 11/194,375 dated Jun. 2, 2008.
Amendment from U.S. Appl. No. 11/194,375 dated Aug. 4, 2008.
Advisory action from U.S. Appl. No. 11/194,375 dated Aug. 12, 2008.
Office action from U.S. Appl. No. 11/194,375 dated Sep. 19, 2008.
Amendment from U.S. Appl. No. 11/194,375 dated Dec. 19, 2008.
Notice of Allowance from U.S. Appl. No. 11/194,375 dated Apr. 10, 2009.
Office action from U.S. Appl. No. 11/252,365 dated Jan. 31, 2008.
Amendment from U.S. Appl. No. 11/252,365 dated Mar. 18, 2008.
Notice of Allowance from U.S. Appl. No. 11/252,365 dated Feb. 27, 2009.
Amendment after Allowance from U.S. Appl. No. 11/252,365 dated Mar. 4, 2009.
Office action from U.S. Appl. No. 11/299,933 dated Mar. 19, 2008.
Response from U.S. Appl. No. 11/299,933 dated Jun. 3, 2008.
Office action from U.S. Appl. No. 11/299,933 dated Sep. 16, 2008.
Response from U.S. Appl. No. 11/299,933 dated Nov. 17, 2008.
Office action from U.S. Appl. No. 11/299,933 dated Dec. 18, 2008.
Amendment from U.S. Appl. No. 11/299,933 dated Mar. 6, 2009.
Office action from U.S. Appl. No. 11/299,933 dated Jun. 12, 2009.
Response to Office action from U.S. Appl. No. 11/299,933 dated Dec. 9, 2009.
Office action from U.S. Appl. No. 11/299,933 dated Dec. 31, 2009.
Response from U.S. Appl. No. 11/299,933 dated Mar. 30, 2010.
Office action from U.S. Appl. No. 11/299,933 dated Jun. 14, 2010.
Response from U.S. Appl. No. 11/299,933 dated Oct. 14, 2010.
Notice of Allowance from U.S. Appl. No. 11/299,933 dated Dec. 28, 2010.
Office action from U.S. Appl. No. 11/496,654 dated Apr. 1, 2009.
Response from U.S. Appl. No. 11/496,654 dated Jun. 26, 2009.
Office action from U.S. Appl. No. 11/496,654 dated Aug. 11, 2009.
Amendment from U.S. Appl. No. 11/496,654 dated Dec. 11, 2009.
Office action from U.S. Appl. No. 11/496,654 dated Jan. 13, 2010.
Amendment from U.S. Appl. No. 11/496,654 dated Jun. 14, 2010.
Office action from U.S. Appl. No. 11/496,654 dated Jun. 28, 2010.
Notice of Allowance from U.S. Appl. No. 11/496,654 dated Jun. 20, 2011.
Pre-Appeal Brief Request and Notice of Appeal from U.S. Appl. No. 11/496,654 dated Nov. 29, 2010.
Response from U.S. Appl. No. 11/496,654 dated May 31, 2011.
Office action from U.S. Appl. No. 11/496,645 dated Aug. 31, 2009.
Response from U.S. Appl. No. 11/496,645 dated Nov. 30, 2009.
Notice of Allowance from U.S. Appl. No. 11/496,645 dated Jan. 4, 2010.
Notice of Allowance from U.S. Appl. No. 11/496,645 dated Feb. 26, 2010.
Office action from U.S. Appl. No. 11/594,539 dated Apr. 19, 2010.
Response from U.S. Appl. No. 11/594,539 dated Jul. 19, 2010.
Office action from U.S. Appl. No. 11/594,539 dated Sep. 30, 2010.
Interview Summary from U.S. Appl. No. 11/594,539 dated Dec. 15, 2010.
Notice of Allowance from U.S. Appl. No. 11/594,539 dated Jan. 7, 2011.
Office action from U.S. Appl. No. 11/594,540 dated Sep. 3, 2010.
Response from U.S. Appl. No. 11/594,540 dated Dec. 2, 2010.
Office action from U.S. Appl. No. 11/594,540 dated Feb. 3, 2011.
Response from U.S. Appl. No. 11/594,540 dated Jul. 5, 2011.
Office action from U.S. Appl. No. 11/594,540 dated Jul. 22, 2011.
Response from U.S. Appl. No. 11/594,540 dated Dec. 15, 2011.
Final Office Action from U.S. Appl. No. 11/594,540 dated Mar. 5, 2012.
Response to Office Action and Request for RCE from U.S. Appl. No. 11/594,540 dated Jun. 28, 2012.
Office Action from U.S. Appl. No. 11/594,540 dated Jul. 16, 2012.
Response to Office Action in U.S. Appl. No. 11/594,540 dated Oct. 15, 2012.

(56) References Cited

OTHER PUBLICATIONS

Notice of Allowance in U.S. Appl. No. 11/594,540 dated Dec. 28, 2012.
Supplemental Notice of Allowance for U.S. Appl. No. 11/594,540 dated Mar. 4, 2013.
Office action from U.S. Appl. No. 12/259,419 dated Sep. 16, 2011.
Amendment in Response to Non-Final Office Action in U.S. Appl. No. 12/259,419 dated Dec. 7, 2011.
Office action from U.S. Appl. No. 12/259,419 dated Jan. 18, 2012.
Reasons for Requesting Pre-Appeal Brief Review from U.S. Appl. No. 12/259,419 dated Jun. 18, 2012.
Notice of Allowance and Fees due for U.S. Appl. No. 12/259,419 dated Sep. 24, 2012.
Examiner Initiated Interview Summary in U.S. Appl. No. 12/259,419 dated Dec. 7, 2012.
Office action from U.S. Appl. No. 12/394,781 dated Jun. 10, 2011.
Response from U.S. Appl. No. 12/394,781 dated Oct. 10, 2011.
Final Office Action from U.S. Appl. No. 12/394,781 dated Feb. 15, 2012.
Notice of Allowance from U.S. Appl. No. 12/394,781 dated Aug. 4, 2015.
Reasons for Requesting Pre-Appeal Brief Review from U.S. Appl. No. 12/394,781 dated Aug. 3, 2012.
Notice of Panel Decision from Pre-Appeal Brief Review for U.S. Appl. No. 12/394,781 dated Aug. 22, 2012.
Office Action for U.S. Appl. No. 12/394,781 dated Jan. 3, 2013.
Amendment in Response to office action in U.S. Appl. No. 12/394,781 dated Jul. 2, 2013.
Final Office Action in U.S. Appl. No. 12/394,781 dated Oct. 11, 2013.
Non-Final Office Action from U.S. Appl. No. 12/394,781 dated Dec. 16, 2014.
Response to Office Action from U.S. Appl. No. 12/394,781 dated Apr. 16, 2015.
Non final office action for U.S. Appl. No. 13/739,049 dated Jun. 20, 2013.
Office action for U.S. Appl. No. 13/739,049 dated Jan. 28, 2014.
Response to Office Action for U.S. Appl. No. 13/739,049 dated Mar. 5, 2014.
Final Office Action for U.S. Appl. No. 13/739,049 dated Mar. 28, 2014.
Notice of Appeal, Pre-Appeal Brief Request for Review and Reasons for Request for Pre-Appeal Brief Review for U.S. Appl. No. 13/739,049 dated Sep. 25, 2014.
Office Action for U.S. Appl. No. 13/739,049 dated Mar. 10, 2015.
Response to Office Action for U.S. Appl. No. 13/739,049 dated Aug. 10, 2015.
Final Office Action for U.S. Appl. No. 13/739,049 dated Sep. 16, 2015.
Response to Final Office Action for U.S. Appl. No. 13/739,049 dated Oct. 20, 2015.
Notice of Allowance for U.S. Appl. No. 13/739,049 dated Nov. 10, 2015.
Notice of Allowance from U.S. Appl. No. 29/332,921 dated Aug. 11, 2009.
Office action from U.S. Appl. No. 12/409,026 dated Feb. 4, 2010.
Response from U.S. Appl. No. 12/409,026 dated May 3, 2010.
Notice of Allowance from U.S. Appl. No. 12/409,026 dated Jun. 17, 2010.
Office action from U.S. Appl. No. 12/818,318 dated Dec. 10, 2010.
Response from U.S. Appl. No. 12/818,318 dated Jun. 10, 2011.
Office action from U.S. Appl. No. 12/818,318 dated Jul. 29, 2011.
Response to Final Office Action from U.S. Appl. No. 12/818,318 dated Dec. 29, 2011.
Office action from U.S. Appl. No. 12/818,318 dated Mar. 8, 2012.
Response to Office Action from U.S. Appl. No. 12/818,318 dated Jul. 9, 2012.
Final Office Action from U.S. Appl. No. 12/818,318 dated Aug. 8, 2012.
Amendment with RCE for U.S. Appl. No. 12/818,318 dated Feb. 6, 2013.
Office action from U.S. Appl. No. 12/818,318 dated Jul. 12, 2013.
Response to Office Action in U.S. Appl. No. 12/818,318 dated Dec. 12, 2013.
Final Office Action from U.S. Appl. No. 12/818,318 dated Feb. 26, 2014.
Office action from U.S. Appl. No. 12/507,220 dated Oct. 22, 2009.
Response to Office action from U.S. Appl. No. 12/507,220 dated Apr. 16, 2010.
Office action from U.S. Appl. No. 12/507,220 dated May 6, 2010.
Response from U.S. Appl. No. 12/507,220 dated Aug. 5, 2010.
Office action from U.S. Appl. No. 12/507,220 dated Aug. 12, 2010.
Amendment from U.S. Appl. No. 12/507,220 dated Dec. 13, 2010.
Office action from U.S. Appl. No. 12/507,220 dated Jan. 28, 2011.
Office Action from U.S. Appl. No. 13/036,170 dated Nov. 26, 2012.
Response to Office Action for U.S. Appl. No. 13/036,170 dated May 28, 2013.
Final Office Action from U.S. Appl. No. 13/036,170 dated Aug. 16, 2013.
Amendment with RCE for U.S. Appl. No. 13/036,170 dated Feb. 14, 2014.
Non-final Office Action from U.S. Appl. No. 13/036,170 dated Mar. 27, 2014.
Final Office Action from U.S. Appl. No. 13/036,170 dated Dec. 3, 2014.
Office Action from U.S. Appl. No. 13/036,172 dated Jan. 9, 2012.
Response to Non-Final Office Action from U.S. Appl. No. 13/036,172 dated Jun. 11, 2012.
Office Action from U.S. Appl. No. 13/036,172 dated Aug. 21, 2012.
Response to Final Office Action with Terminal Disclaimer from U.S. Appl. No. 13/036,172 dated Oct. 26, 2012.
Notice of Allowance for U.S. Appl. No. 13/036,172 dated Nov. 16, 2012.
Office Action for U.S. Appl. No. 13/739,049 dated Jun. 20, 2013.
Office Action for U.S. Appl. No. 13/866,165 dated Sep. 18, 2013.
Response in U.S. Appl. No. 13/866,165 dated Mar. 14, 2014.
Office Action for U.S. Appl. No. 13/866,165 dated May 21, 2014.
Office Action for U.S. Appl. No. 13/866,165 dated Nov. 10, 2014.
Response to Office Action for U.S. Appl. No. 13/866,165 dated Apr. 6, 2015.
Final Office Action for U.S. Appl. No. 13/866,165 dated Jun. 18, 2015.
Response to Office Action for U.S. Appl. No. 13/866,165 dated Nov. 18, 2015.
Preliminary Amendment in U.S. Appl. No. 13/543,082 dated Jul. 22, 2013.
Office Action from U.S. Appl. No. 13/543,082 dated Jun. 19, 2014.
Amendment from U.S. Appl. No. 13/543,082 dated Dec. 19, 2014.
Office Action from U.S. Appl. No. 13/543,082 dated Apr. 6, 2015.
Response to Office Action from U.S. Appl. No. 13/543,082 dated Sep. 4, 2015.
Notice of Allowance from U.S. Appl. No. 13/543,082 dated Oct. 14, 2015.
Amendment After Allowance from U.S. Appl. No. 13/543,082 dated Nov. 17, 2015.
One page drawing, BRIGGS BAG 1, illustrates a web of pre-formed bags sold by Applicant for use in Applicant's SP machines more than one year prior to the priority date of the present application. Operation of Applicant's SP machines is disclosed by U.S. Pat. Nos. 4,969,310; 5,743,070; 5,944,424; 5,722,218; and 6,035,611.
One page drawing, GOODY BAG 1, illustrates a web of pre-formed bags sold by Applicant for use in Applicant's SP machines more than one year prior to the priority date of the present application. Operation of Applicant's SP machines is disclosed by U.S. Pat. Nos. 4,969,310; 5,743,070; 5,944,424; 5,722,218; and 6,035,611.
Office action from U.S. Appl. No. 13/866,165 dated Dec. 3, 2015.
Office Action from U.S. Appl. No. 13/036,170 dated Jan. 11, 2016.
Amendment from U.S. Appl. No. 13/866,165 dated Mar. 3, 2016.
Office Action from U.S. Appl. No. 13/866,165 dated May 31, 2016.
Office Action from U.S. Appl. No. 15/040,447 dated May 5, 2016.
Office Action from U.S. Appl. No. 13/036,170 dated Jul. 29, 2016.

(56) References Cited

OTHER PUBLICATIONS

Response to Office Action from U.S. Appl. No. 13/036,170 dated Nov. 29, 2016.
Response to Office Action from U.S. Appl. No. 13/866,165 dated Oct. 31, 2016.
Advisory Action from U.S. Appl. No. 13/866,165 dated Nov. 28, 2016.
Office Action from U.S. Appl. No. 13/866,165 dated Dec. 23, 2016.
Response to Office Action from U.S. Appl. No. 14/482,706 dated Oct. 19, 2016.
Final Office Action from U.S. Appl. No. 14/482,706 dated Nov. 9, 2016.
Notice of Allowance from U.S. Appl. No. 14/934,594 dated Nov. 7, 2016.
Response to Office Action from U.S. Appl. No. 15/040,447 dated Aug. 5, 2016.
Notice of Allowance from U.S. Appl. No. 15/040,447 dated Sep. 22, 2016.
Response to Office Action from U.S. Appl. No. 13/036,170 dated May 11, 2016.
Response to Office Action from U.S. Appl. No. 14/934,594 dated Jul. 7, 2016.
Office Action from U.S. Appl. No. 14/216,135 dated Feb. 6, 2017.
Response to Office Action from U.S. Appl. No. 14/482,706 dated Feb. 8, 2017.
Office Action from U.S. Appl. No. 14/550,034 dated Feb. 8, 2017.
Office Action from U.S. Appl. No. 13/036,170 dated Dec. 30, 2016.
Response Office Action from U.S. Appl. No. 13/036,170 dated Jun. 21, 2017.
Response Office Action from U.S. Appl. No. 13/866,165 dated Jun. 21, 2017.
Response to Office Action from U.S. Appl. No. 14/216,135 dated Jun. 6, 2017.
Office Action from U.S. Appl. No. 14/482,706 dated Jun. 12, 2017.
Final Office Action from U.S. Appl. No. 14/216,135 dated Jul. 21, 2017.
Office Action from U.S. Appl. No. 13/036,170 dated Sep. 20, 2017.
Office Action from U.S. Appl. No. 13/866,165 dated Sep. 8, 2017.

\* cited by examiner

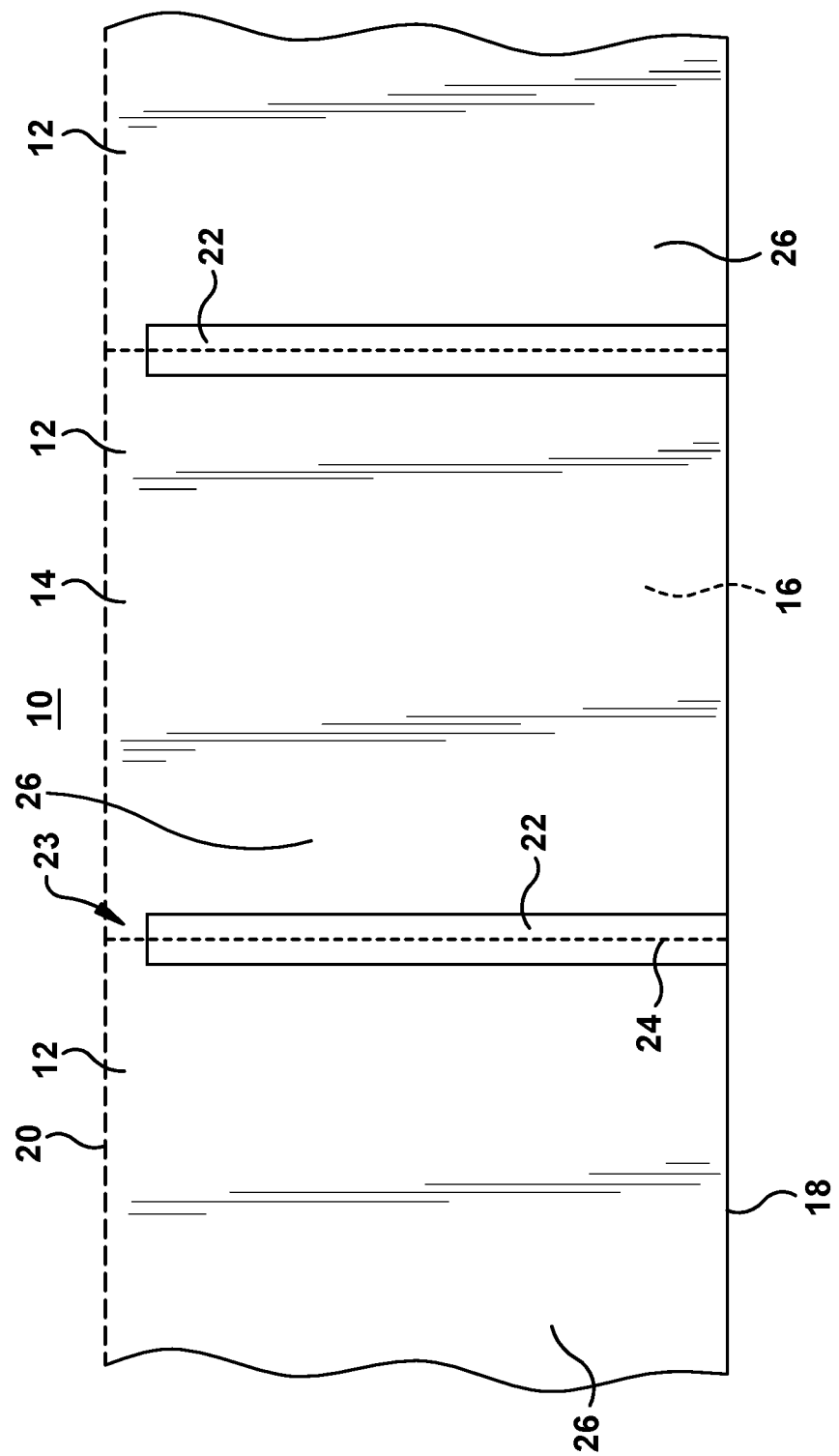

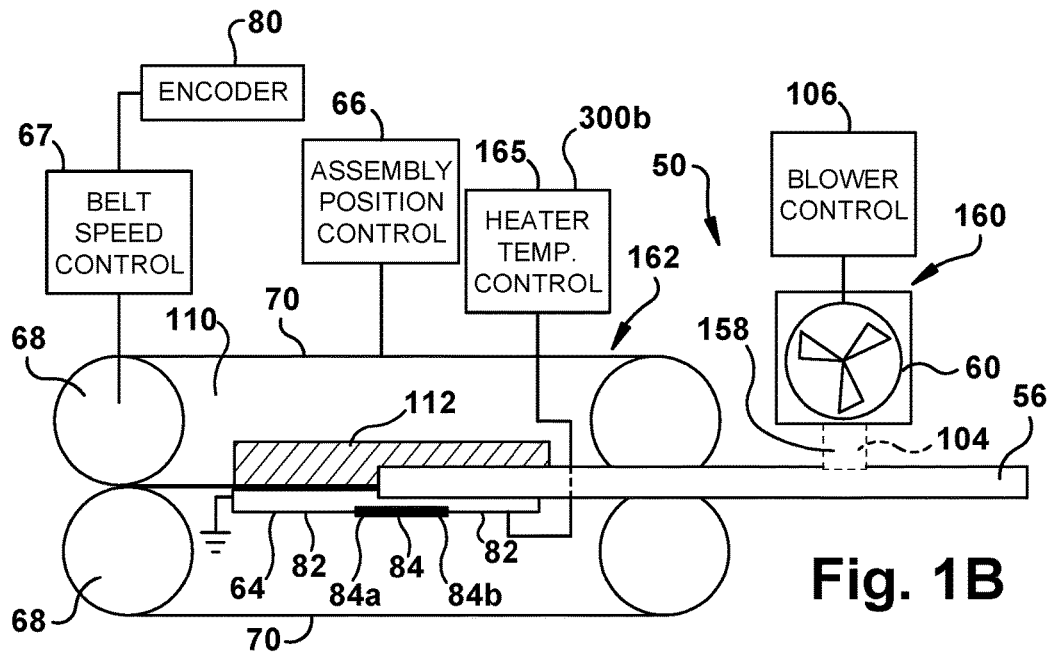
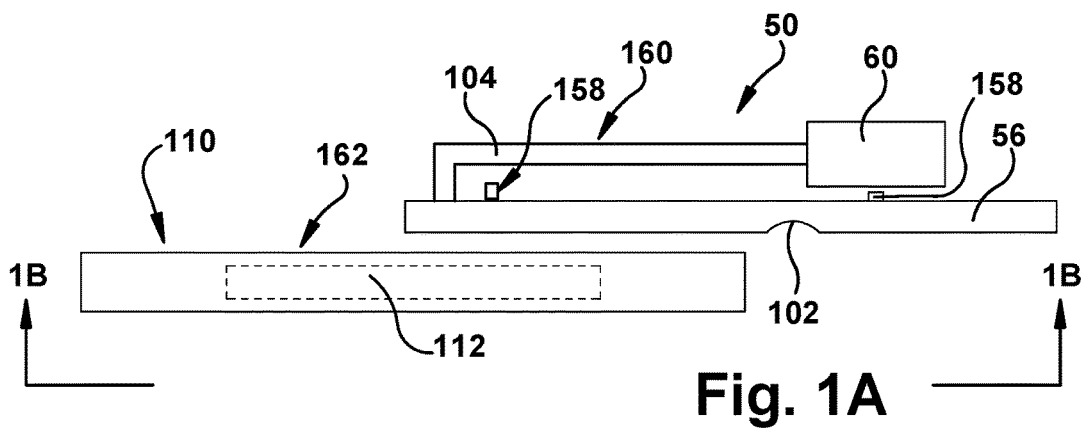
Fig. 1B
Fig. 1A

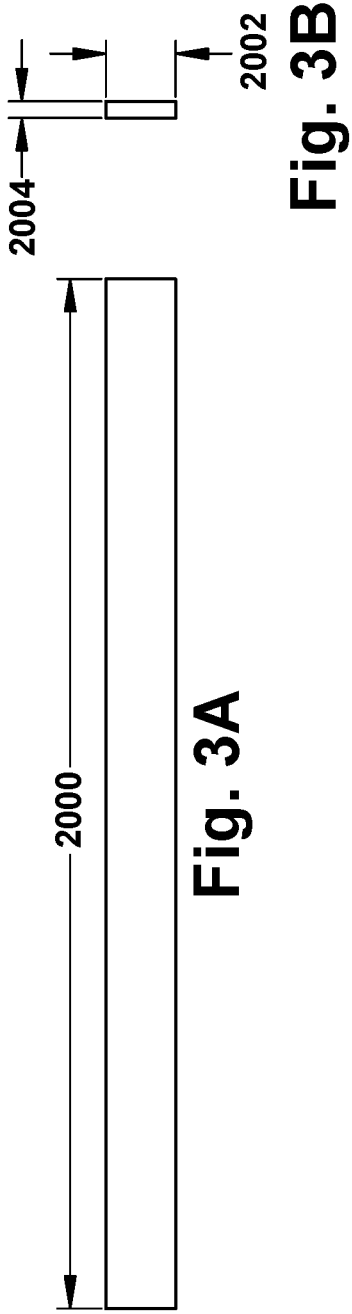

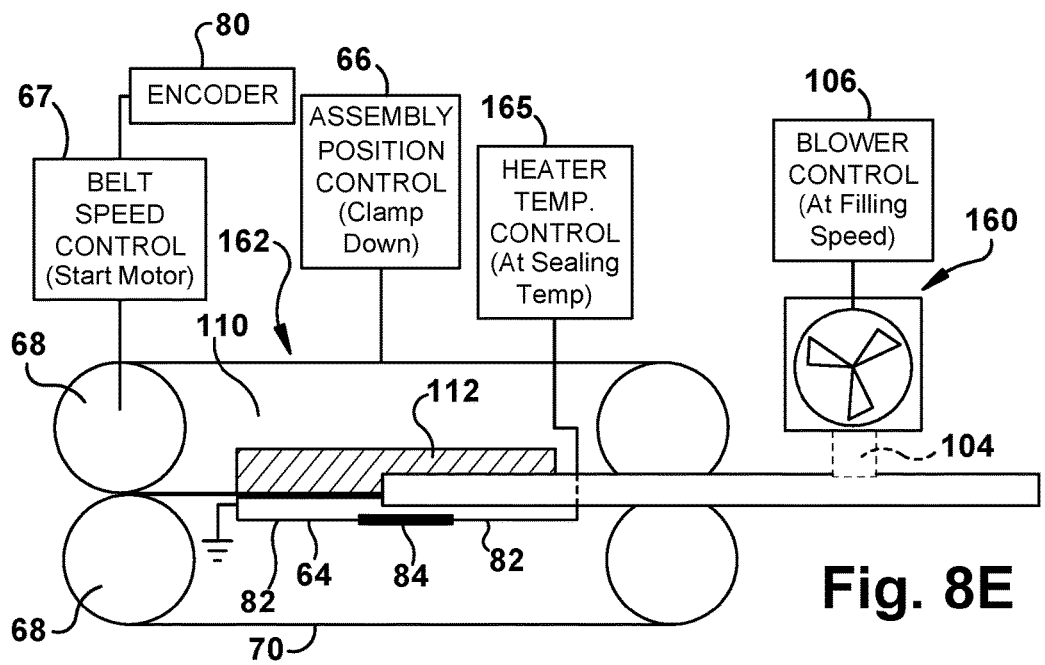
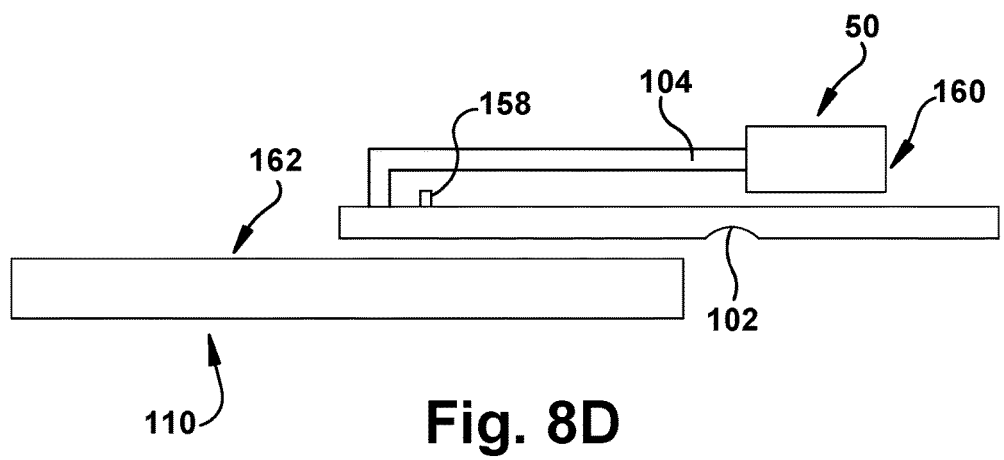

AIR CUSHION INFLATION MACHINE

RELATED APPLICATION

This application claims the benefit of U.S. Provisional Application No. 61/907,347, filed Nov. 21, 2013, the entire disclosure of which is hereby incorporated by reference.

INCORPORATION BY REFERENCE

This application incorporates by reference the entire disclosures of, to the extent they are not conflicting with the present application, U.S. patent application Ser. No. 13/543,082 entitled AIR CUSHION INFLATION MACHINE, filed Jul. 6, 2012, and U.S. Provisional Patent Application No. 61/505,261 entitled AIR CUSHION INFLATION MACHINE, filed Jul. 7, 2011.

BACKGROUND

The present invention relates to fluid filled units and more particularly to a novel and improved machine for converting a web of preformed pouches to dunnage units and will be described with particular reference thereto. It will be appreciated, however, that the invention is also amenable to other applications.

Machines for forming and filling dunnage units from sheets of plastic are known. Machines which produce dunnage units by inflating preformed pouches in a preformed web are also known. For many applications, machines which utilize preformed webs are used.

The present invention provides a new and improved apparatus and method which addresses the above-referenced problems.

SUMMARY

In one aspect of the present invention, it is contemplated that a machine converts a web of preformed pouches, which are defined by transverse seals extending from a remote edge, into inflated dunnage units. A sealing arrangement is positioned to provide a longitudinal seal intersecting the transverse seals to close the preformed pouches and form dunnage units. The sealing arrangement has at least two sealing belts. Each belt is positioned so that respective first sides of the belts engage a surface of the web and pull the web past at least one sealing element. In one exemplary embodiment, a heating element is on a second side of the first belt not engaging the web and a compliant material is on a second side of the second belt not engaging the web. As the web passes between the heating element and compliant material, imperfections in the web are smoothed by the compliant material and the layers of the web are sealed by the heating element. The present application also discloses that compliant or softer material or a compliant or softer belt spreads the pressure applied to the sealed area more evenly, which results in a more uniform seal.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

FIG. 1 is a plan view of an exemplary embodiment of air cushion material;

FIG. 1A is a top plan view of an exemplary embodiment of an air cushion inflation machine;

FIG. 1B is a view taken along lines 1B-1B in FIG. 1A;

FIG. 3A is a side view of an element made of compliant material;

FIG. 3B is an end view of an element made of compliant material;

FIGS. 8B-8E illustrate an example of states of components of an air cushion inflation machine when the air cushion inflation machine is in a start condition;

DETAILED DESCRIPTION OF ILLUSTRATED EMBODIMENT

As described herein, when one or more components are described as being connected, joined, affixed, coupled, attached, or otherwise interconnected, such interconnection may be direct as between the components or may be indirect such as through the use of one or more intermediary components. Also as described herein, reference to a "member," "component," or "portion" shall not be limited to a single structural member, component, or element but can include an assembly of components, members or elements.

Figure 2:
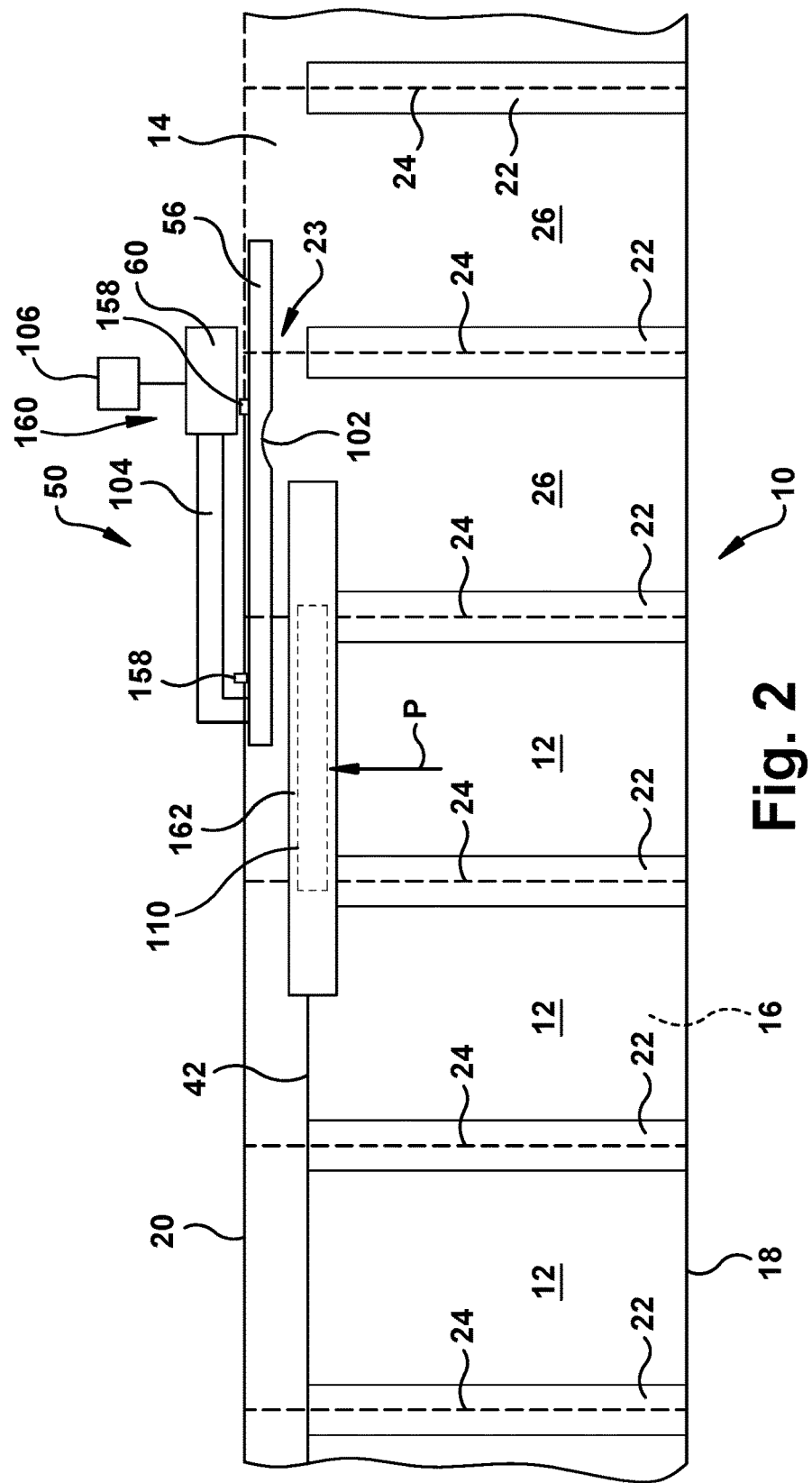
FIG. 2 is a view similar to FIG. 1A with a web of air cushion material installed in the air cushion inflation machine.
Figure 2A:
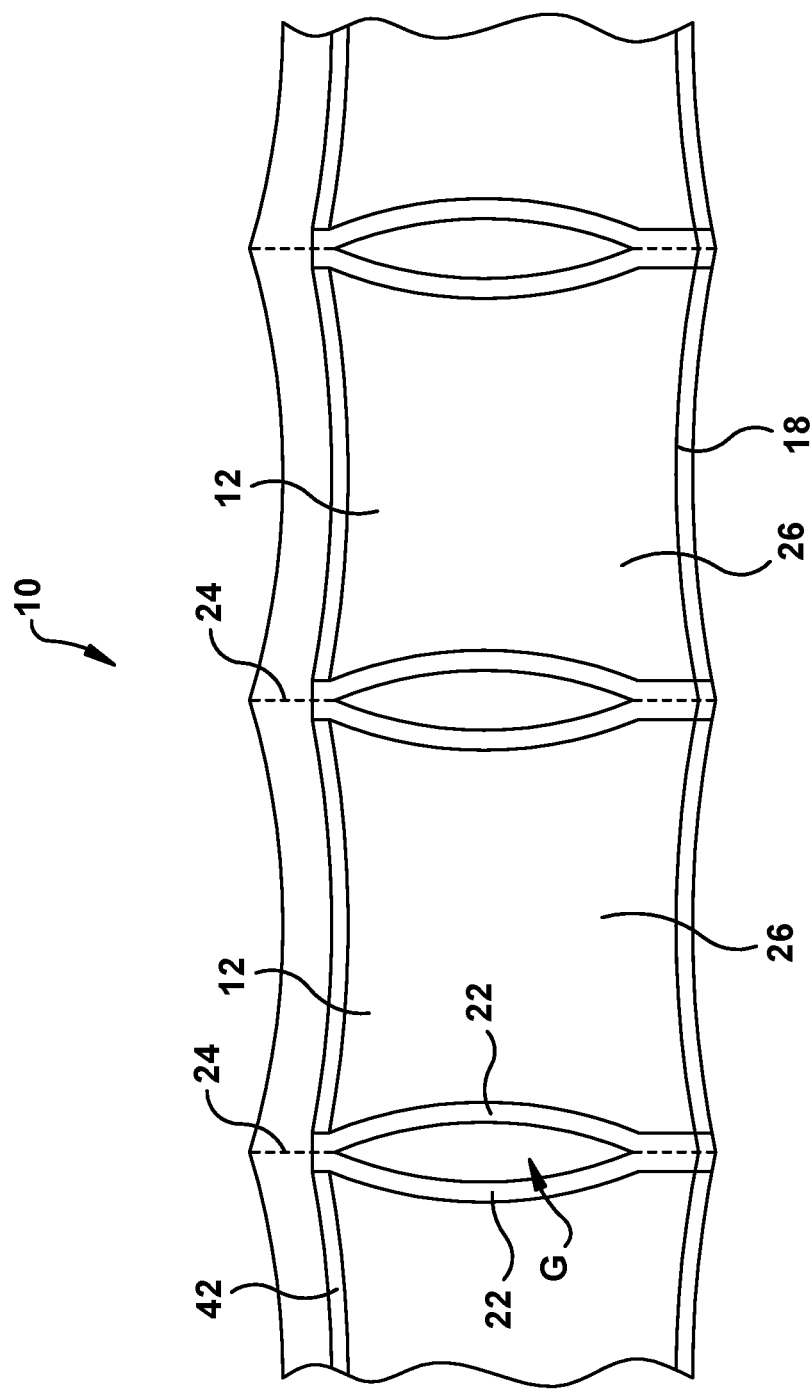
FIG. 2A is a plan view of inflated and sealed air cushions.

FIG. 1 illustrates an example of a preformed web 10 that can be processed by a new machine 50 (See machine examples of FIGS. 1A, 7C, 13, and 14) to produce inflated air cushions 12 (See FIG. 2A). The preformed web can take a wide variety of different forms. Any preformed web that can be inflated, sealed and then separated from the machine 50 can be used. Examples of acceptable webs 10 include, but are not limited to, any of the webs shown and/or described by U.S. Pat. Nos. D633792; 7897220; 7897219; D630945; 7,767,288; 7,757,459; 7,718,028; 7,694,495; D603705; 7,571,584; D596031; 7,550,191; 7,125,463; 7,125,463; 6,889,739; or 7,975,457; or United States Patent Application Publn. Nos. 20100281828A1; 20100221466A1; 20090293427A1; and 20090110864A1, which are all incorporated herein by reference in their entirety. It should be readily apparent that other preformed webs could be used in the machine 50 to produce dunnage units.

The illustrated web 10 is formed of a heat sealable plastic film, such as polyethylene. However, any heat sealable material can be used. The web 10 includes superposed top and bottom, elongate layers 14, 16 connected together along spaced seal and inflation side edges 18, 20. Each of the edges may be either a fold or a seal. The superposed layers 14, 16 are hermetically connected along the seal side edge 18. In the illustrated embodiment, the inflation side edge 20 is perforated. In another embodiment, the inflation side edge 20 is not perforated and a line of perforations is included in one of the layers 14, 16, with the line of perforations being spaced apart from and running parallel to the inflation side edge 20. In another embodiment, the inflation side edge 20 is not perforated and a line of perforations is included in each of the layers 14, 16, with the lines of perforations being spaced apart from and running parallel to the inflation side edge 20. In yet another embodiment, the layers 14, 16 are not connected together at the inflation side edge.

A plurality of longitudinally spaced, transverse seals 22 join the top and bottom layers 14, 16. Referring to FIGS. 1 and 2, the transverse seals 22 extend from the seal edge 18 to within a short distance of the inflation edge 20 to form pouches 26. An optional pocket 23 is formed between the transverse seals 22 and the inflation edge 20. A pocket is not formed if the inflation edges of the layers 14, 16 are not connected. A line of perforations 24 extends through the top and bottom layers. FIG. 2A illustrates a length of the web 10 after it has been inflated and sealed to form inflated cushions 12. An inflation seal 42, closes the pouches 26 defined by the transverse seals 22 and the seal side edge 18 to form the inflated cushions. The illustrated inflated cushions 12 include gaps G (see FIG. 2A) between each pair of adjacent cushions. A web 10 that is specially constructed to form the gaps G was used in the illustrated embodiment. In other embodiments, a web 10 may be used that does not form the illustrated gaps G (see FIG. 2A).

FIGS. 1A-1B and 2 schematically illustrate an exemplary embodiment of a machine 50 for converting a preformed web 10 (see FIG. 1) to inflated cushions 12 (see FIG. 2A). The machine 50 may take a wide variety of different forms and the inflation, sealing and separation arrangements described below may be in the order/positions described or in any other order/position that facilitates inflation of the web 10, sealing of the web, and separation of the web from the machine 50. In the example illustrated by FIGS. 1A-1B and 2, the machine 50 includes an inflation arrangement 160, a sealing arrangement 162, a clamping arrangement 110 including a compliant material 112, and a web separation device 158. In one embodiment, the compliant material 112 is a silicone foam rubber, closed cell material having less than a Shore A hardness. The compliant material 112 may be coated with acrylic adhesive on both sides. In one embodiment, the compliant material 112 is usable up to about 390° F. As illustrated in FIG. 3, in one embodiment, it is contemplated that the compliant material 112 has a length 2000 of about 4.38", a height 2002 of about ¼", and a thickness 2004 of about 1/16".

The inflation arrangement 160 can take a wide variety of different forms. Any arrangement capable of providing air under increased pressure (above atmosphere) to the pouches 26 can be used. In the illustrated embodiment, the inflation arrangement 160 includes a hollow, longitudinally extending guide pin 56 and a blower 60. Referring to FIG. 2, a web 10 is routed from a supply and the pocket 23 is placed around the guide pin 56, such that the guide pin 56 is between the inflation side edge 20 and the transverse seals 22. The guide pin 56 aligns the web as it is pulled through the machine 50. The guide pin 56 includes an inflation opening 102 that is fluidly connected to the blower 60 by a conduit 104. The blower 60 inflates the web pouches 26 as the web moves past the inflation opening 102.

In an exemplary embodiment, the inflation arrangement 160 also includes a blower control 106. The blower control 106 can take a wide variety of different focus. For example, the blower control 106 can be any arrangement that is operable to control the flow rate and/or pressure of air provided by the inflation arrangement 160 to the pouches 26. In one embodiment, the blower control 106 is a speed controller that controls the operation speed of the blower 60. Such a speed controller speeds the blower up to provide air at higher pressures and/or flow rates and reduces the blower speed to reduce the pressure and/or flow rate. In another embodiment, the blower control 106 comprises a flow control valve in the conduit 104 between the blower 60 and the inflation opening 102. The conduit 104 may be short as illustrated by FIG. 1B or long as illustrated by FIG. 1A. The conduit may perform or be adapted to perform the function of the web separation device 158.

The sealing arrangement 162 forms the seal 42 (FIG. 2) to create sealed inflated cushions 12. The sealing arrangement 162 can take a wide variety of different forms. For example, the sealing arrangement 162 can be any arrangement capable of forming a hermetic seal between the layers 14, 16. Referring to FIG. 1B, the sealing arrangement 162 includes a heated sealing element 64, a temperature control arrangement 165, an assembly positioning device 66, the compliant material 112, a pair of drive rollers 68, a belt speed control 67, and a pair of drive belts 70. The belt speed control 67 electronically communicates with an encoder 80 to control the speed of the belts 70. For example, based on a feedback loop, the encoder determines the relative speeds of the belts 70. If the relative speeds of the belts 70 are not within a predetermined tolerance, the encoder 80 determines an error has occurred. In one embodiment, if the encoder 80 determines an error occurs, the encoder 80 causes the motors to stop the belts 70. Although the encoder 80 is illustrated as part of the belt speed control 67, it is to be understood that other embodiments in which the encoder 80 is separate from the belt speed control 67 are also contemplated.

In an alternate embodiment, a pair of cooling elements are provided downstream of the heated sealing element 64. Each belt 70 is provided around its respective drive roller 68. Each belt 70 is driven by its respective drive roller 68. The speed of the drive rollers 68 and belts 70 are controlled by the belt speed control 67. The belts 70 are in close proximity or engage one another, such that the belts 70 pull the web 10 proximate to the heat sealing element 64. The seal 42 (see FIG. 2) is formed as the web 10 passes through first the heated sealing elements 64.

The heating element 64 can take a wide variety of different forms. Any arrangement capable of raising the temperature of the layers 14 and/or 16 to a point where the layers will hermetically bond together can be used. For example, the heating element 64 may be a heating wire, ceramic element or other member that provides heat upon the application of power. For example, resistance of the heating element 64 causes the heating element 64 to heat up when voltage is applied across the heating element. In the illustrated embodiment, the heating element 64 is a heating wire having a length between about 1" to about 12". It is also contemplated that the heating element 64 is a substantially flat wire having a thickness of about 0.011".

The heating element 64 (wire) also includes at least one low resistance portion 82 and at least one high resistance portion 84. As illustrated in FIG. 1B, the heating element 64 (wire) includes two relatively lower resistance portions 82 and one relatively higher resistance portion 84. In one embodiment, the lower resistance portions 82 are copper or are at least include a copper coating or other low resistance coating to provide for relatively high electrical conductivity and relatively low electrical resistance. The lower resistance portions 82 have substantially no electrical resistance, which results in substantially no heat or heat dissipation along those lower resistance portions 82. The higher resistance portion 84 includes a material that produces relatively low electrical conductivity and relatively high electrical resistance. Consequently, substantially all of the heat is dissipated along the relatively higher resistance portion 84 of the heating element 64.

Figure 4:
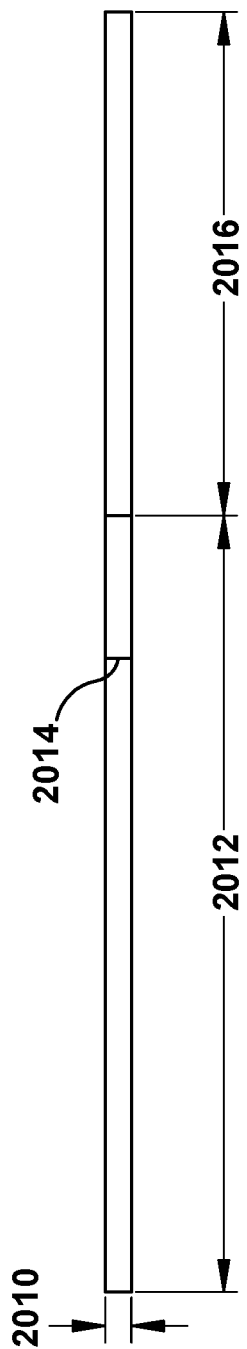
FIG. 4 is an illustration of a heating element having a higher resistance portion and a lower resistance portion.

In one embodiment, the higher resistance portion 84 is between about 1" long and about 9" long. In another embodiment, the higher resistance portion 84 is between about 2" long and about 8" long. In another embodiment, the higher resistance portion 84 is between about 3" long and about 7" long. In another embodiment, the higher resistance portion 84 is between about 4" long and about 6" long. In another embodiment, the higher resistance portion 84 is about 4.5" long. In the embodiment illustrated in FIG. 4, the lower resistance portion 82, which includes a copper coating, has a width 2010 of about 0.118" (3.0 mm), a length 2012 of about 7.165" (182 mm), and a thickness of about 0.006" (0.15 mm). The higher resistance portion 84, which does not include a copper coating, has a width 2014 of about 0.110" (2.8 mm) at a point "A", a length 2016 of about 4.84" (123 mm), and a thickness of about 0.006" (0.15 mm).

With reference again to FIG. 1B, the relatively shorter length of the higher resistance portion 82 provides for greater control of the electrical resistance and temperature (e.g., ±1 degree, 2, 5 or 10 degrees,). For example, in one exemplary embodiment the higher resistance portion is only provided in an area where the seal is being formed. This shorter, higher resistance, portion in only the area where the seal is being formed results in more consistent electrical resistance and temperature control than results over a longer high electrically resistive material that has portions outside the area where the seal is being formed. In addition, the relatively shorter length and more consistent electrical resistance of the higher resistance portion 84 results in faster temperature changes when electrical current is applied and removed from the heating element 64. The faster temperature changes along the heating element 64 are discussed in more detail below.

The assembly positioning device 66 is capable of moving the belt 70 associated with the compliant material 112 away from the belt 70 associated with the heating element 64. For example, the assembly positioning device 66 may cause the belt 70 associated with the compliant material 112 to move upward and away from the belt 70 associated with the heating element 64. At times, it is desirable to move the belt 70 associated with the compliant material 112 away from the belt 70 associated with the heating element 64 to position the web between the belts 70.

With further reference to FIG. 1B, in the illustrated embodiment the temperature control arrangement 165 is coupled to the heating element 64 to control the temperature of the heating element 64. In this embodiment, the temperature control arrangement 165 is coupled to the low resistance portion 82 of the heating element 64. However, other embodiments in which the temperature control arrangement 165 is coupled to the high resistance portion 84 of the heating element 64 are also contemplated.

The temperature control arrangement 165 may take a wide variety of different forms. Any arrangement capable of controlling the heating element 64 can be used. In one exemplary embodiment, the temperature control arrangement 165 includes a thermocouple. The thermocouple may be coupled to the heating element 64 in a variety of different ways. In one exemplary embodiment, the heating element 64 includes a ceramic member that is encapsulated with the thermocouple. The encapsulation of the ceramic member with the thermocouple provides for very accurate measurement of the temperature of the heating element 64. The temperature measured by the thermocouple is used to adjust the power (e.g., current, voltage, and/or duty cycle) applied to the heating element 64 and thereby control the temperature of the heating element 64.

In one exemplary embodiment, the current passing through the heating element 64 is used to determine the resistance of the heating element. The resistance of the heating element 64 is, in turn, used to determine the temperature of the heating element 64. For example, the resistance of the heating element 64 can be calculated based on the current passing through the heating element 64 and the voltage across the heating element. The voltage used in the calculation may be acquired in a wide variety of different ways. For example, the voltage used in the calculation may be the voltage applied by the power supply or the voltage may be directly measured by optional bypass leads 84a, 84b as illustrated by FIG. 1B. The current used in the calculation may be acquired in a wide variety of different ways. For example, the current used in the calculation may be measured using a Hall Effect sensor or a low resistance, high precision feedback resistor. In one embodiment, where the current is measured with a Hall Effect Sensor, the temperature control arrangement 165 is a solid state device including a Hall Effect sensor for measuring resistance on the heating element 64. In another embodiment the current is measured with a low resistance, high precision feedback resistor that is in series with the heating element. For example, the low resistance, high precision feedback resistor may be a 20 mΩ resistor.

In another exemplary embodiment, the current applied to the heating element is controlled or held constant and the voltage drop across the heating element 64 is used to determine the resistance of the heating element. The resistance of the heating element 64 is, in turn, used to determine the temperature of the heating element 64. For example, the resistance of the heating element 64 can be calculated based on the current passing through the heating element 64 and the voltage across the heating element. The voltage used in the calculation may be acquired in a wide variety of different ways. For example, the voltage used in the calculation may be the voltage applied by the power supply or the voltage may be directly measured by optional bypass leads 84a, 84b as illustrated by FIG. 1B. The current used in the calculation may be acquired in a wide variety of different ways. For example, the current used in the calculation may be a fixed current applied by the power supply. In this embodiment, the duty cycle of the current can be increased to increase the temperature of the heating element and the duty cycle of the current can be decreased to decrease the temperature of the heating element.

Figure 5:
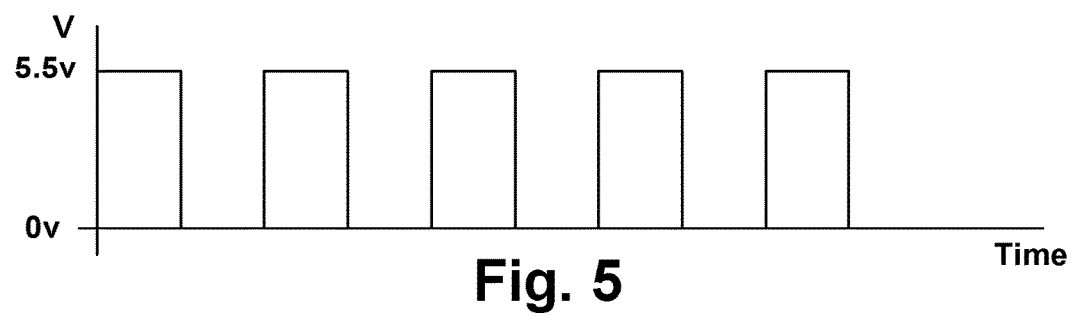
FIG. 5 is a plot of DC heating element voltage switched between maximum and minimum voltages according to a duty cycle.

In one embodiment, it is contemplated that direct current (DC) is used to power the heating element 64. Powering the heating element 64 with direct current (DC), as opposed to alternating current (AC), permits the temperature control arrangement 165 to calculate resistance (i.e. as a function of current and voltage) in the heating element 64 (e.g., the high resistance portion 84 of the heating element 64). The temperature of the heating element 64 (e.g., high resistance portion 84 of the heating element 64) is determined (e.g., calculated or correlated) based on the calculated resistance. Determining the temperature of the heating element 64 based on the calculated resistance provides a relatively faster temperature response than if alternating current (AC) is used to power the heating element 64. In one embodiment, the DC power is cycled on and off according to a duty cycle to achieve a desired set point temperature of the high resistance portion 84 of the heating element 64. For example, with respect to FIG. 5, a voltage of the DC power is switched between zero (0) volts and 5.5 volts according to a duty cycle to achieve a desired temperature of the heating element 64. For example, the duty cycle is increased (i.e. more on time) to increase the temperature and the duty cycle is decreased (i.e. more off time) to decrease the temperature.

Figure 5A:
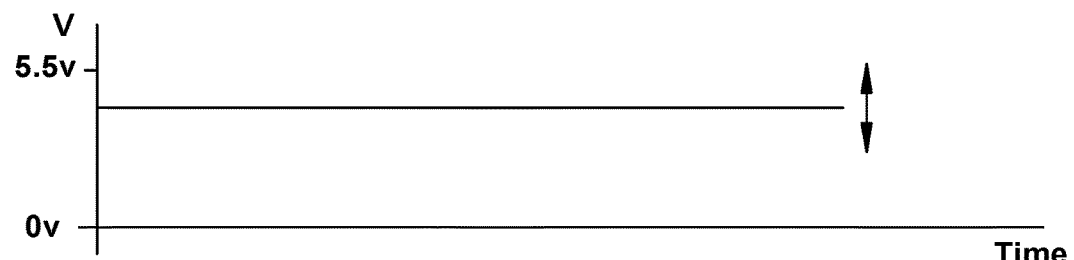
FIG. 5A is a plot of an analog DC heating element voltage that is adjustable between maximum and minimum voltages.

Referring to FIG. 5A, in another embodiment, which is discussed in more detail below, a voltage of the DC power is controlled to a continuous (e.g., constant) voltage output between, for example, zero (0) volts and 5.5 volts to achieve the desired temperature of the heating element 64. For example, the DC voltage is increased to increase the temperature and the DC voltage is decreased to decrease the temperature.

Once the temperature control arrangement 165 determines the temperature of the heating element 64 (e.g., high resistance portion 84 of the heating element 64), the heating element 64 is capable of controlling the power supplied to the heating element 64 for achieving or maintaining a temperature of the high resistance portion 84 of the heating element 64 within a predetermined temperature range. For example, if the temperature of the high resistance portion 84 of the heating element 64 is above the predetermined temperature range, the temperature control arrangement 165 may cause the amount of direct current (DC) supplied to the heating element 64 to be reduced. Conversely, if the temperature of the high resistance portion 84 of the heating element 64 is below the predetermined temperature range, the temperature control arrangement 165 may cause the amount of direct current (DC) supplied to the heating element 64 to be increased.

FIG. 1B illustrates an exemplary embodiment of a clamping arrangement 110 including the compliant material 112. The clamping arrangement 110 is positioned to pinch the top and bottom layers 14, 16 of the preformed web 10 together. The clamping arrangement 110 inhibits air under pressure P (FIG. 2) in the inflated webs from applying force to the molten longitudinal seal 42. This prevents the air under pressure P from blowing the molten longitudinal seal 42 open and/or creating undesirable stresses that weaken the longitudinal seal.

The clamping arrangement 110 can take a wide variety of different forms. For example, the clamping arrangement 110 can be any arrangement capable of squeezing the layers 14, 16 in an area where the material of the layers is molten, soft or not yet completely solidified and cool. In the illustrated embodiment of FIG. 1B, the clamping arrangement 110 includes a pair of drive rollers 68, a pair of drive belts 70, the compliant material 112, and an optional assembly positioning device 66. Each belt 70 is disposed around its respective drive roller 68. Each belt 70 is driven by its respective drive roller 68. The drive rollers 68 may be coupled to the drive rollers 68 (see FIG. 1B) of the heat sealing belts 70 (see FIG. 1B) or the drive rollers 68 may be driven independently of the drive rollers 68 (see FIG. 1B). The belts 70 engage one another, such that the belts 70 pull the web 10 and pinch the web as the web passes by the heat sealing element 64 and the compliant material 112. Another exemplary clamping arrangement is disclosed by U.S. Pat. No. 7,571,584, which is incorporated herein by reference in its entirety.

In the illustrated embodiment, the compliant material 112 is on an opposite side of the belt 70 than the web 10. As the web passes by the heat sealing element 64 and the compliant material 112, the compliant material acts to keep substantially constant pressure on the web while the web passes by the heat sealing element 64. For example, the compliant material 112 is a material having a spongy and/or rubbery characteristic. Therefore, as the web passes by the compliant material 112, imperfections in the web (e.g., wrinkles) are reduced since the spongy and/or rubbery compliant material 112 can slightly deform as the imperfections pass by the compliant material 112. In other words, the "forgiving" nature of the compliant material 112 results in the substantially constant pressure on the web as the web passes by the heat sealing element 64. The substantially constant pressure on the web results in a better seal.

Figure 18:
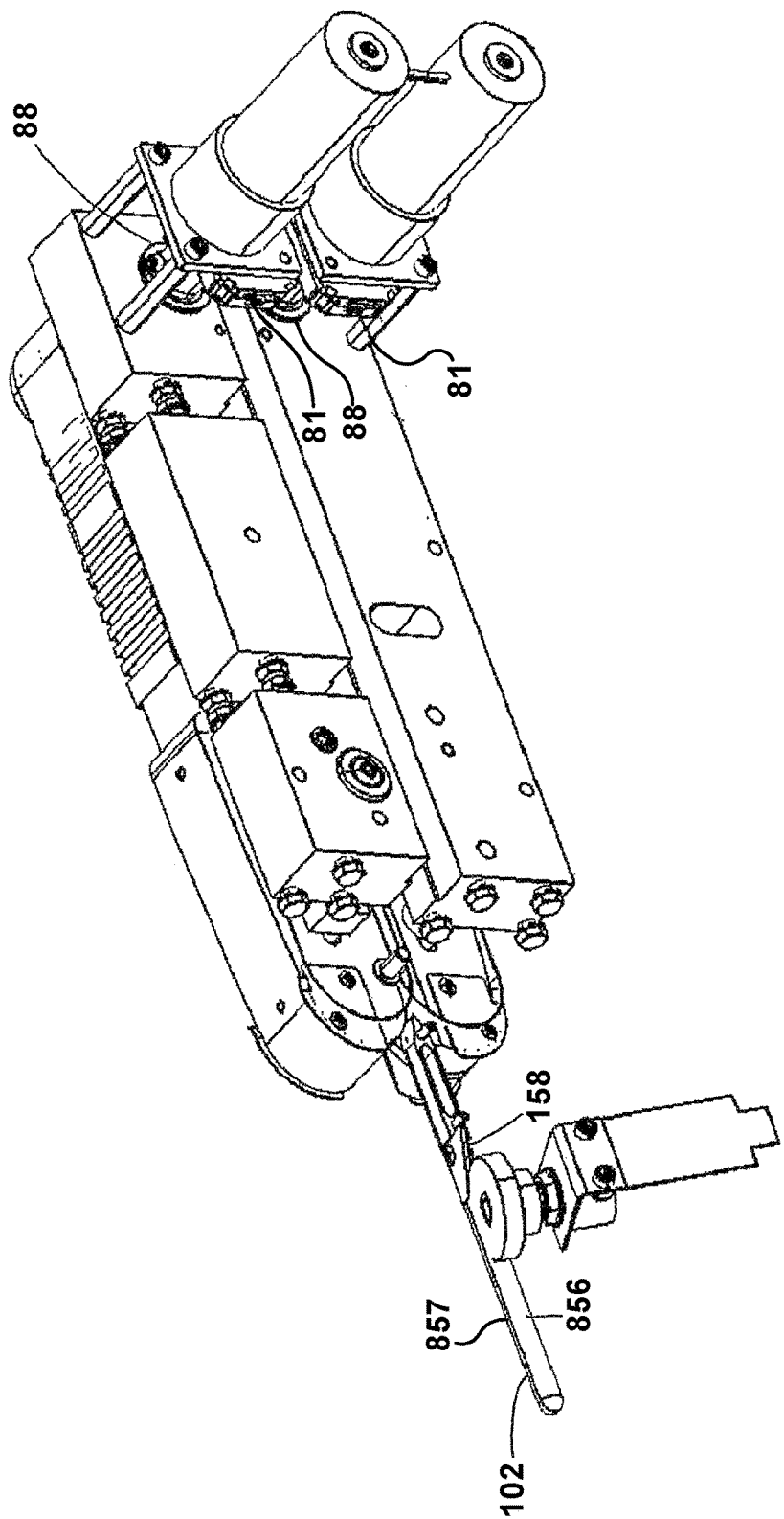
FIG. 18 is a rear perspective view of a sealing assembly of the air cushion inflation machine illustrated by FIG. 13A.

It is contemplated that the compliant material 112 is at least as long as the high resistance portion 84 of the heat sealing element 64. However, the compliant material 112 may be longer as illustrated, for example, at least twice or even three times, or more as long, as illustrated by FIG. 18.

Referring to FIG. 2, the web separation device 158 can take a wide variety of different forms. For example, when the web 10 includes a line of perforations at or along the seal side edge 18, the web separation device 158 may be a blunt surface, when the inflation edge 20 is not perforated the separation device 158 may be a sharp knife edge, and when the layers 14, 16 are not connected together at the seal side edge the web separation device may be omitted. In the illustrated embodiment, the web separation device 158 is positioned along the path of travel of the web prior to the heat sealing element 64. The web separation device 158 is positioned prior to the heat sealing element 64 so that the web separation device opens the pocket 23 of the web at the same time the pouches 26 are being sealed. However, the web separation device 158 can be positioned anywhere along the path of travel of the web. For example, the web separation device 158 can be positioned before the sealing arrangement 162, after the sealing arrangement, before the inflation opening 102, or after the inflation opening 102. The illustrated separation device 158 extends from the pin 56. However, the separation device 158 may be mounted to the machine 50 in any manner. The separation device 158 opens the web 10 at or near the inflation side edge 20 as the web moves through the machine 50.

Figure 6:
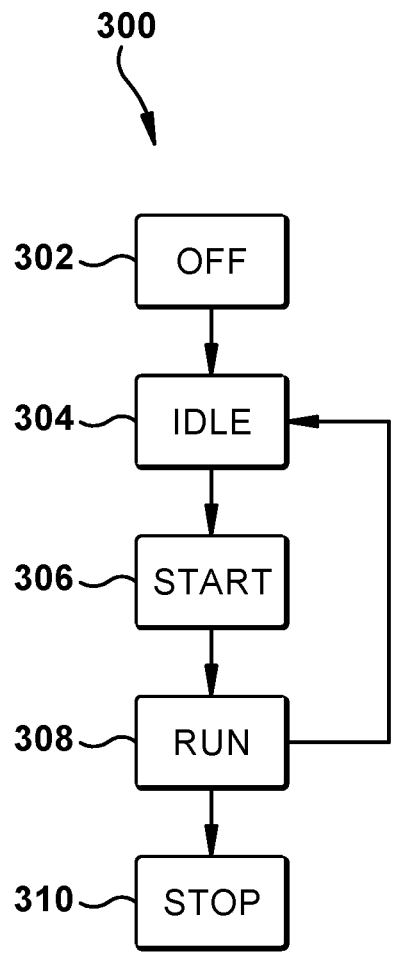
FIG. 6 is a flow chart illustrating an exemplary embodiment of a control algorithm for an air cushion inflation machine.

FIG. 6 illustrates an exemplary embodiment of a control algorithm 300 for the inflation machine 50. In the illustrated embodiment, the control algorithm 300 includes an off state 302, an idle sequence 304, a start sequence 306, a run sequence 308, and a stop sequence 310. In the off state, the inflation arrangement 160 and the sealing arrangement 162 are both turned off.

Figure 7A:
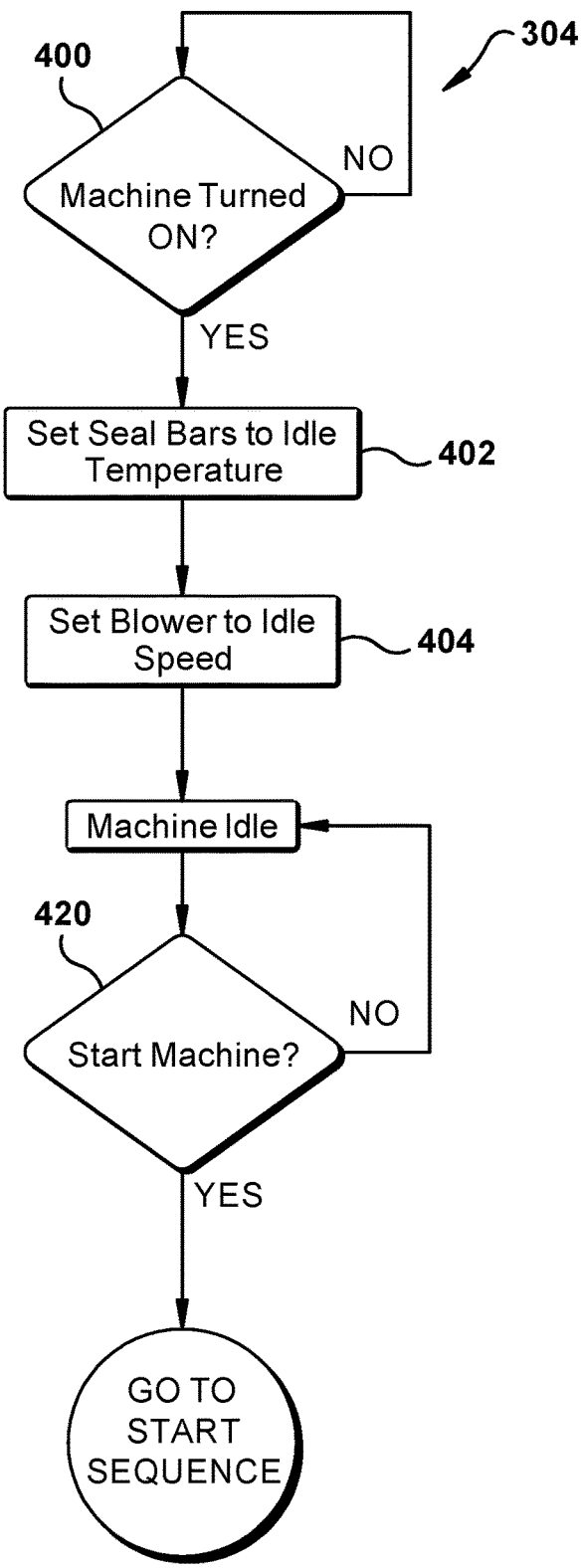
FIG. 7A is a flow chart illustrating an exemplary embodiment of an idle sequence of a control algorithm for an air cushion inflation machine.
Figure 7C:
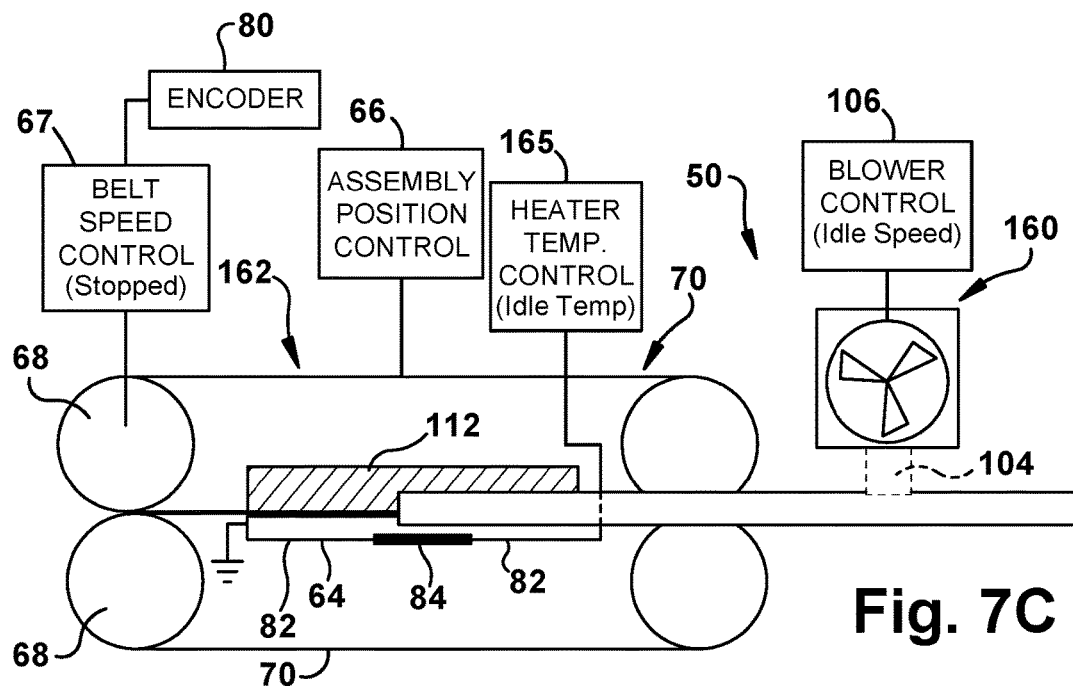
FIGS. 7B-7C illustrate an example of states of components of an air cushion inflation machine when the air cushion inflation machine is in an idle condition.
Figure 7B:
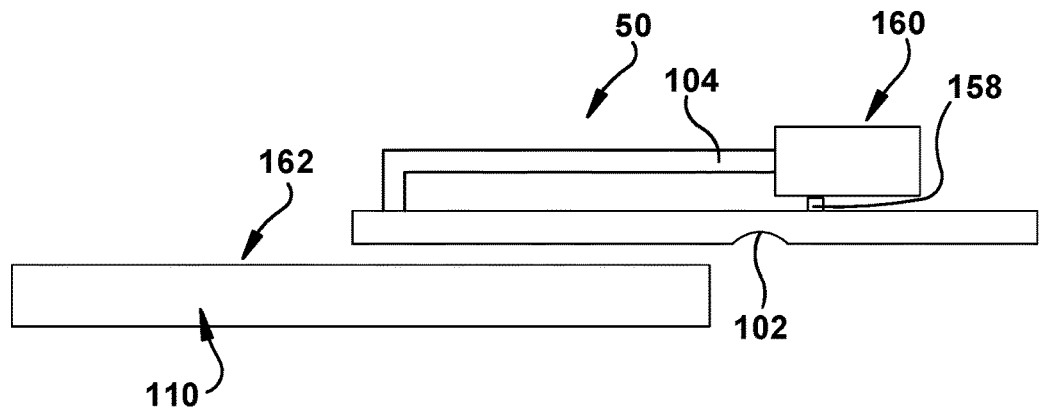

FIG. 7A illustrates the idle sequence 304 and FIGS. 7B-7C illustrate the states of the components of the machine 50 when the machine executes the idle sequence. FIGS. 7B and 7C illustrate an exemplary embodiment where the sealing arrangement 110 illustrated by FIGS. 1A and 1B is idle. When the machine 50 is turned on 400, the machine begins the idle sequence 304. In the idle sequence 304, the sealing element 64 is set 402 to an idle temperature by the temperature control arrangement 165. The inflation arrangement 160 is set 404 to an idle output or speed by the inflation control 106. Referring to FIG. 7C, in an exemplary embodiment, the belt speed control 67 stops the belts 70, 70 and the positioning device 66 positions the belt 70 to either separate from or connect to the web 10. As such, when the machine 50 executes the idle sequence 304, the inflation arrangement 160 pre-inflates the pouches 26 and the heating element 64 is pre-heated, but spaced apart from the web. This pre-inflation and pre-heating reduces the time it takes for the machine 10 to transition to production of inflated cushioning members. In one exemplary embodiment, the web is pre-inflated, but the heating element 84 is not preheated. For example, when the heating element 84 is short and has a fast response time, the heating element heats up very quickly and does not need to be preheated in the idle sequence of FIG. 7A.

Figure 8A:
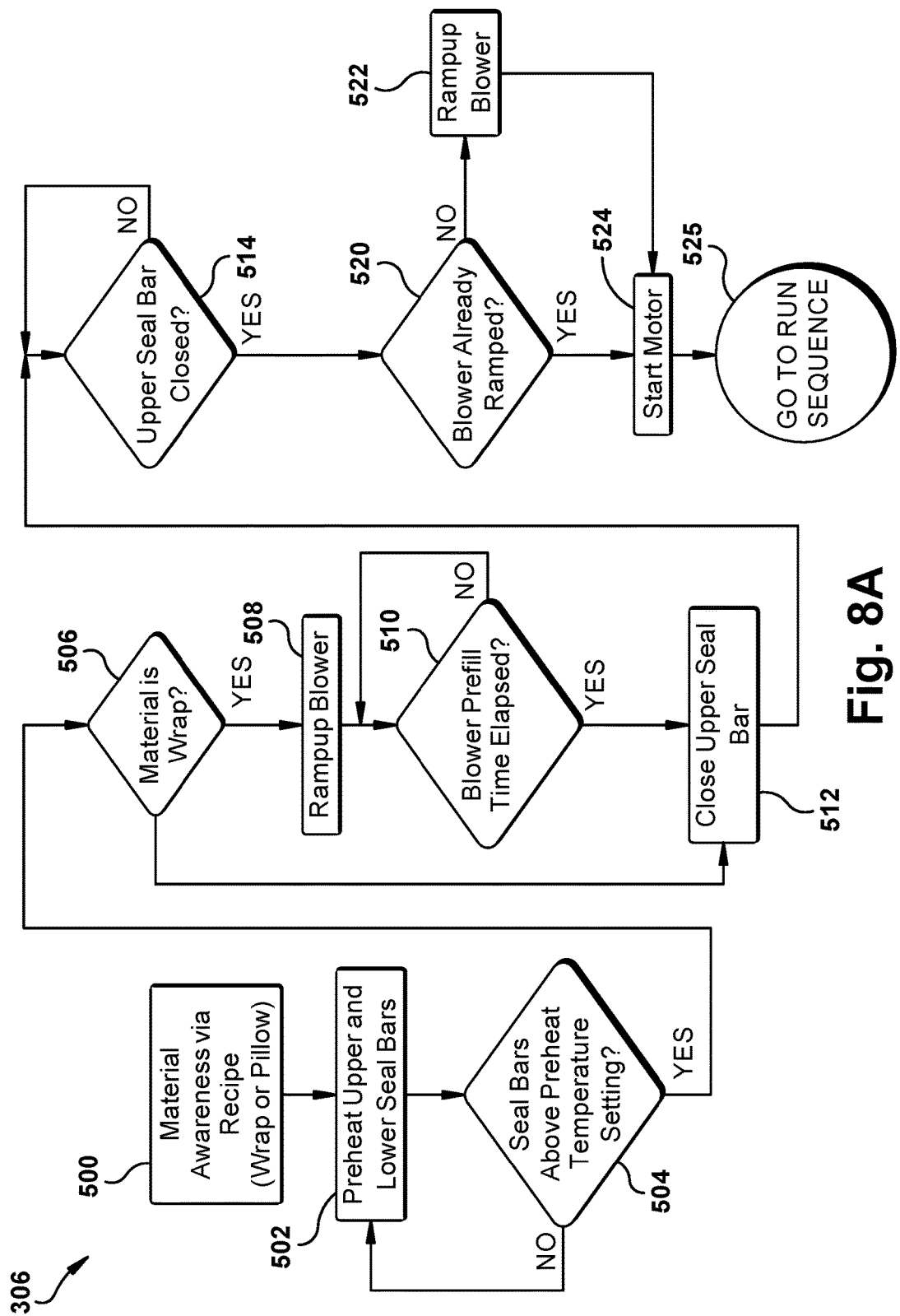
FIG. 8A is a flow chart illustrating an exemplary embodiment of a start sequence of a control algorithm for an air cushion inflation machine.
Figure 8C:
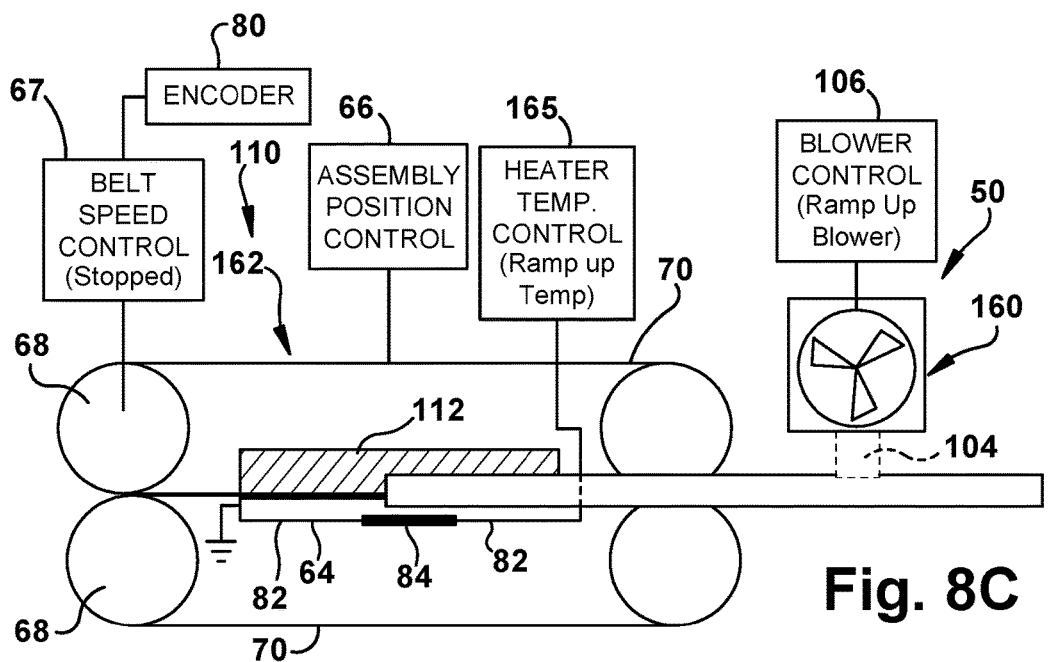
Figure 8B:
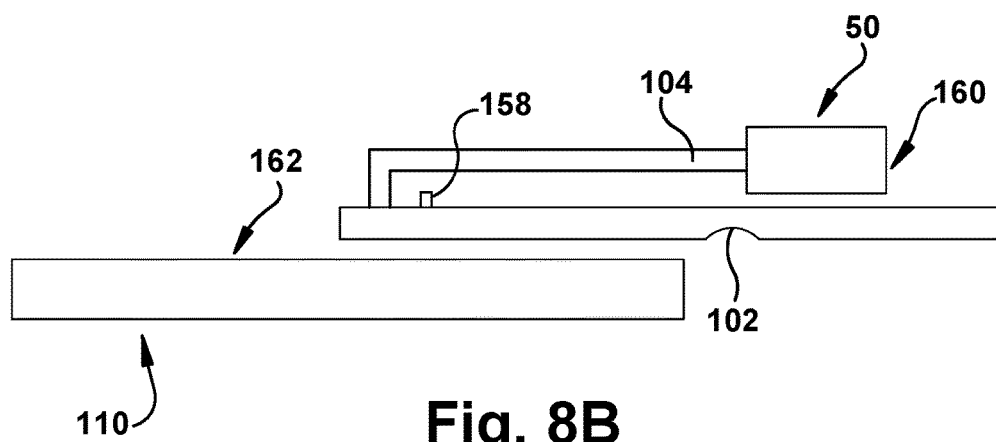

FIG. 8A illustrates the start sequence 306 and FIGS. 8B-8E illustrate the states of the components as the machine 50 executes the start sequence. When the machine 50 is turned 420 (FIG. 7A) from the idle sequence 304 to the start sequence 306, the machine 50 optionally identifies 500 the type of material being inflated and sealed. For example, the machine may determine that that the material is a pillow type material (see for example FIG. 1) or a wrap type material (see for example U.S. Pat. Nos. D633792 and D630945). The machine may also optionally determine the size and type of material the web 10 is made from in this step.

In the start sequence 304, the sealing elements 64 are raised from the idle temperature to a sealing temperature (when the sealing temperature is higher than the idle temperature or when the sealing elements are not pre-heated) by the temperature control arrangement 165 at steps 502 and 504. At step 506, the inflation arrangement 160 is optionally ramped up 508 from the idle output or speed to the inflation output or speed. The ramp up from the idle output or speed to the inflation output or speed may be controlled in a variety of different ways. For example, the inflation arrangement may be ramped up until an inflation pressure set point in the web 10 is reached, until the inflation device reaches a speed set point, and/or until a predetermined period of time has elapsed after the inflation device reaches a speed set point.

In the exemplary embodiment, the machine closes (See FIG. 8E) the sealing element 64 at steps 512 and 514, when the machine is not already closed. Very little or no material is wasted upon start up of the machine. That is, the first pouches 26 that are fed into the machine 50 are inflated and sealed, rather than being un-inflated or under-inflated.

In the exemplary embodiment, the machine optionally determines 520 whether the inflation arrangement 160 has already been ramped to the inflation speed or output after the sealing element has closed on the web 10. Once the sealing element 64 is closed on the web 10, the belt speed control 67 starts 524 the belts 70, 70 (see arrows in FIG. 8E) and the machine begins producing sealed and inflated cushions and moves on 525 to the run sequence.

In one exemplary embodiment, control of the sealing arrangement 162, inflation arrangement 160, and/or the drive rollers 68 are interrelated. For example, the sealing arrangement 162, inflation arrangement 160, and/or the drive rollers 68 are controlled based on input from one or more of the temperature control arrangement 165, belt speed control 67 and/or the blower control 106. By interrelating the sealing arrangement 162, inflation arrangement 160, and/or the drive rollers 68, the air/pressure in the pouches and/or the quality of the inflation seal 41, may be precisely controlled.

In an exemplary embodiment, the belt speed may be controlled based on feedback from the encoder 80, the blower control 106 and/or the temperature control arrangement 165. If the temperature of the sealing element 64 is lower than a predetermined set point, the belt speed may be reduced to ensure that enough heat is applied to the web to form a high quality seal. Similarly, if the temperature of the sealing element 64 is higher than a predetermined set point, the belt speed may be increased to ensure that too much heat is not applied to the web and thereby ensure that a high quality seal is formed. If the output or speed of the inflation arrangement 160 is lower than a predetermined set point, the belt speed may be reduced to ensure that the pouches 26 are optimally filled. In an exemplary embodiment, the encoder 80, the blower output or speed and/or the heating element temperature 64 are continuously controlled to bring the blower output or speed and the heating element temperature to predetermined set points. The speed of the belts may be continuously updated based on the feedback from the blower control 106 and/or the temperature control arrangement 165 to optimize the seal quality and pouch filling, especially as the inflation arrangement and/or the sealing element are being ramped to their normal operating conditions.

In an exemplary embodiment, the temperature of the sealing element 64 may be controlled based on feedback from the encoder 80, the inflation control 106 and/or the belt speed control 67. If the belt speed is lower than a predetermined set point, the temperature of the sealing element 64 may be reduced to ensure that too much heat is not applied to the web and ensure that a high quality seal is formed. Similarly, if the belt speed is higher than a predetermined set point, the temperature of the sealing element 64 may be increased to ensure that enough heat is applied to the web and a high quality seal is formed. In an exemplary embodiment, the encoder 80, the blower output or speed and/or the belt speed control 67 are continuously controlled to bring the blower output or speed and the belt speed to predetermined set points. The temperature of the sealing element 64 may be continuously updated based on the feedback from the blower control 106 and/or the belt speed to optimize the seal quality and pouch filling, especially as the inflation arrangement and/or the belt speed are being ramped to their normal operating conditions.

In an exemplary embodiment, the inflation arrangement 160 may be controlled based on feedback from the encoder 80, the belt speed control 67 and/or the temperature control arrangement 165. If the temperature of the sealing element 64 is lower than a predetermined set point, the blower output or speed may be changed to ensure proper inflation and sealing of the air filled cushions. If the belt speed is lower than a predetermined set point, the blower output or speed may be changed to ensure proper inflation and sealing of the air filled cushions. In an exemplary embodiment, the belt speed and/or the heating element temperature are continuously controlled to bring the belt speed and/or the heating element temperature to predetermined set points. The blower speed or output may be continuously updated based on the feedback from the encoder 80, the drive roller control 67 and/or the temperature control arrangement 165 to optimize the seal quality and pouch filling, especially as the belt speed and/or the sealing temperature are being ramped to their normal operating conditions.

In one exemplary embodiment, the temperature of the sealing arrangement 162 is independent of feedback from inflation control and belt control. In this embodiment, belt speed may be controlled based solely on feedback from the sealing arrangement 162. Similarly, in this embodiment, the inflation arrangement 162 may be controlled based solely on feedback from the sealing arrangement 162. In an exemplary embodiment, the machine 50 is programmed with a control loop that brings the sealing arrangement 162 to a temperature set point and to hold the temperature at the set point. During execution of this control loop, the current temperature of the sealing arrangement is monitored and is used to control the belt speed and inflation arrangement 162.

Figure 9:
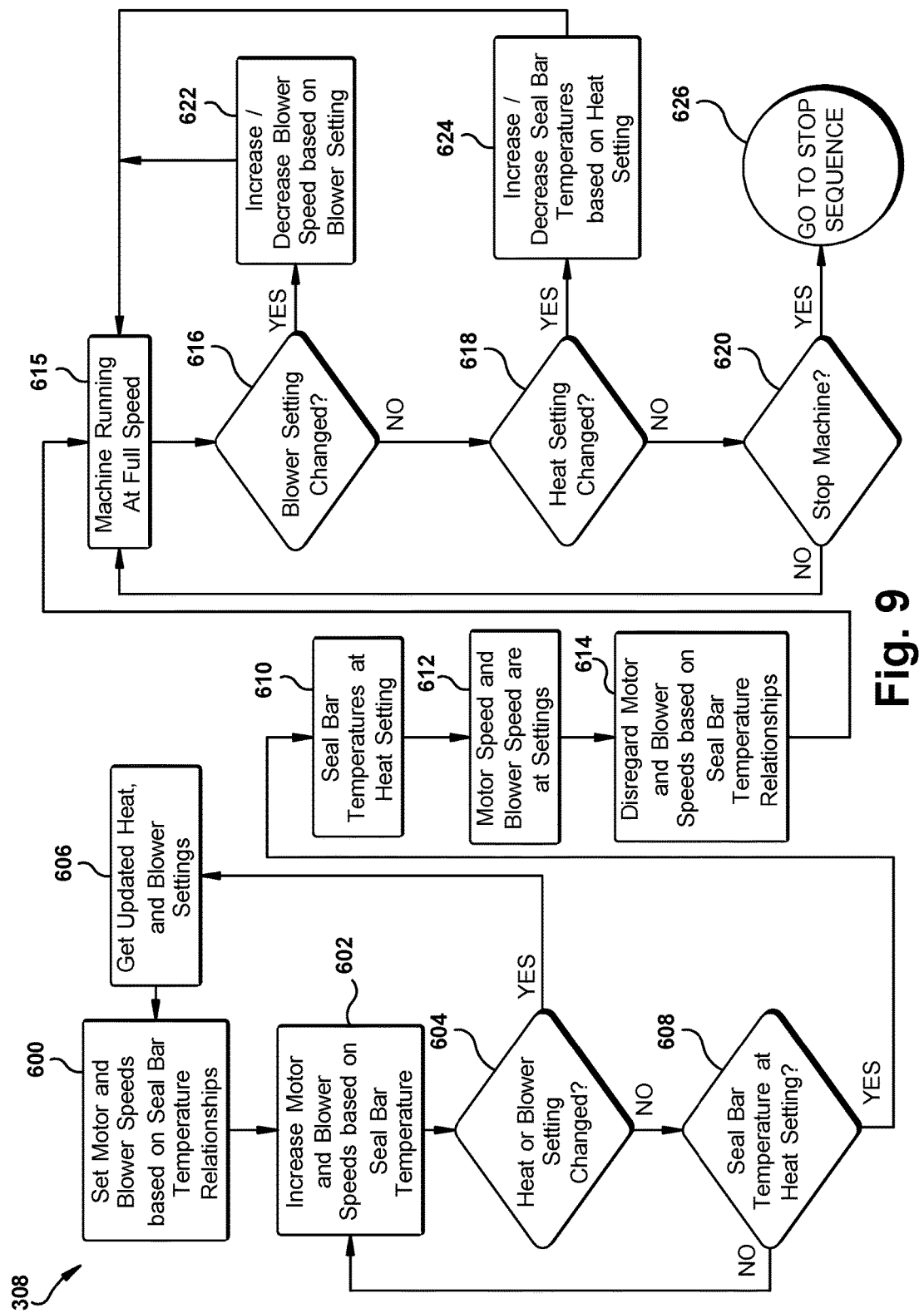
FIG. 9 is a flow chart illustrating an exemplary embodiment of a run sequence of a control algorithm for an air cushion inflation machine.

FIG. 9 illustrates an exemplary embodiment of a run sequence 308 where control of the sealing arrangement 162, inflation arrangement 160, and/or the drive rollers 68 are interrelated. It should be appreciated that the control of the sealing arrangement 162, inflation arrangement 160, and/or the drive rollers 68 can be interrelated in a wide variety of different ways and that FIG. 9 illustrates one of the many possibilities. In FIG. 9, relationships of the belt speed and inflation device speed or output with respect to the temperature of the heating device are set 600. The belt speed and inflation device speed or output are set 602 based on the current temperature of the sealing element 64. In another embodiment, where the response time of the sealing element is fast, the temperature of the sealing element may be set based on the belt speed and/or the inflation device speed. In the illustrated example, the belt speed and inflation device speed or output are set 602 based on the current temperature of the sealing element 64. At optional step 604, if the set point of the sealing element 64 and/or the set point of the inflation arrangement 160 have changed (for example, due to user input), the updated set points are retrieved 606 and the relationships of the belt speed and inflation device speed or output with respect to the temperature of the heating device are reset 600. If the set point of the sealing element 64 and/or the set point of the inflation arrangement 160 have not changed, the sequence checks 608 to see if the sealing element 64 has reached the temperature set point. If the sealing element 64 has not reached the temperature set point, the belt speed and inflation device speed or output are updated 602 based on the current temperature of the sealing element 64. This process is repeated until the sealing element 64 reaches the temperature set point.

Once the sealing element 64 is at the temperature setting 610 and the belt speed and inflation device output are at the corresponding set points 612, the encoder 80 ensures the relationships between the belt speed and inflation device speed are maintained. Alternatively, in other embodiments, the relationships between the belt speed and inflation device speed or output with respect to the temperature of the heating device may optionally be disregarded 614 until the machine is stopped or for a predetermined period of time or until an event is detected that triggers updating of the belt speed and/or inflation device output. At this point, the machine 50 is running at a full or optimal speed 615 and continues to do so until an inflation setting changes 616, a heat setting changes 618, or the machine is stopped 620. When an inflation device setting changes, the inflation device speed or output is increased or decreased 622 based on the new setting. When a temperature setting changes, the heating device temperature set point is increased or decreased 624 based on the new setting. When the machine is stopped, the sequence proceeds 626 to the stop sequence 310.

Figure 10A:
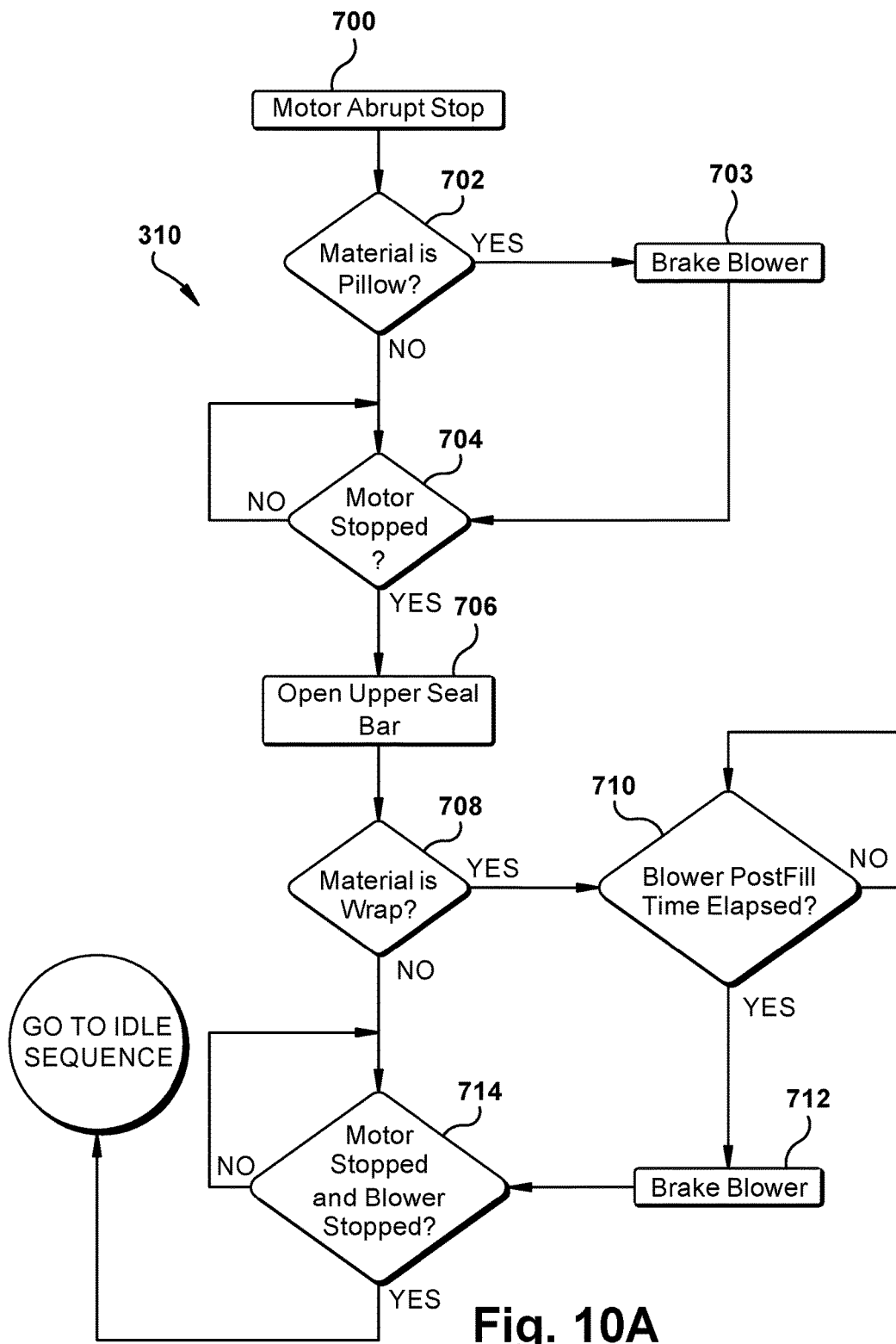
FIG. 10A is a flow chart illustrating an exemplary embodiment of a stop sequence of a control algorithm for an air cushion inflation machine.
Figure 10C:
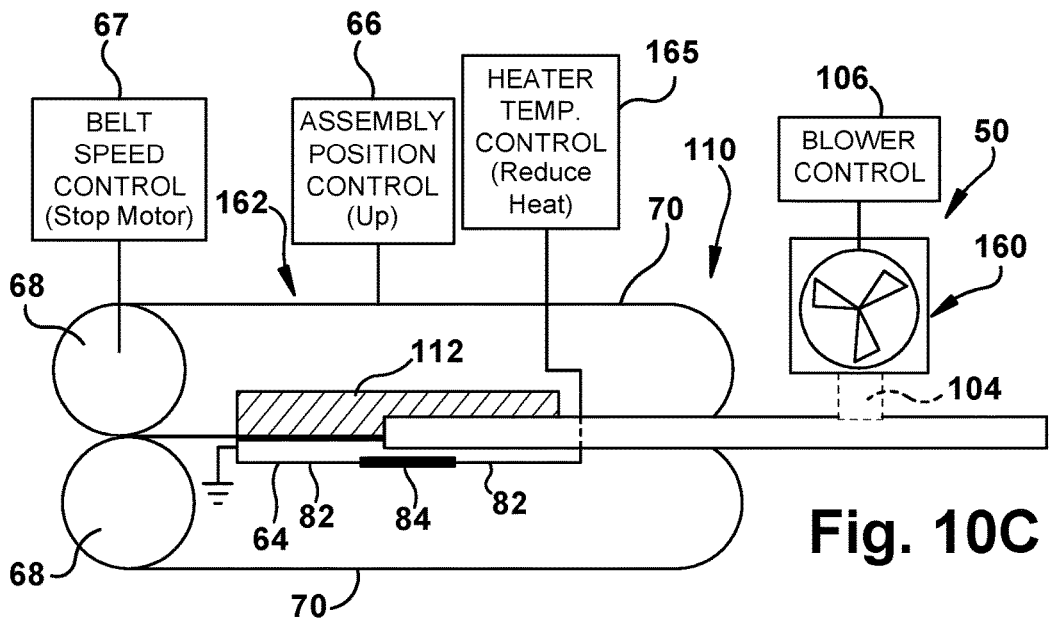
FIGS. 10B-10C illustrate an example of states of components of an air cushion inflation machine when the air cushion inflation machine is in a stop condition.
Figure 10B:
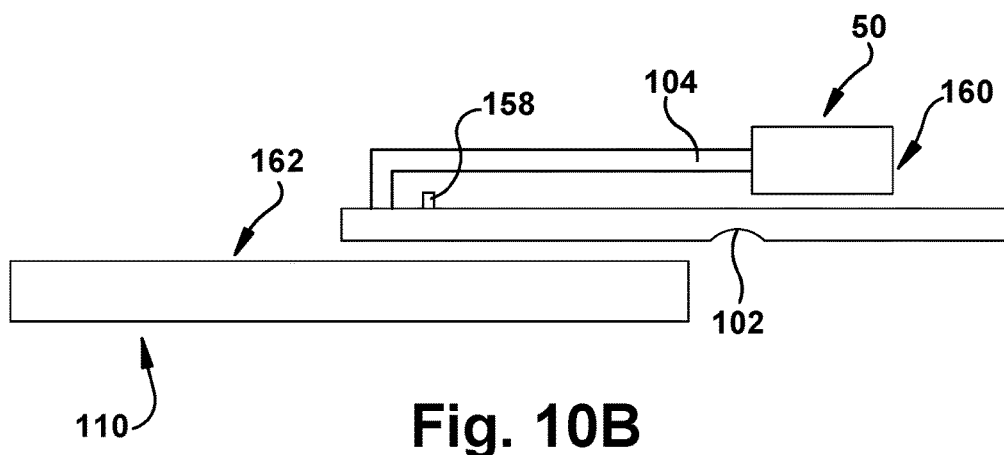

FIG. 10A illustrates an exemplary stop sequence and FIGS. 10B-10C illustrate examples of conditions of components of the machine 50 during the stop sequence. In the stop sequence 310, the belt speed control 67 stops 700 the belts 70, 70 (FIG. 7C). At optional step 702, if the material is pillow type material, the inflation arrangement 160 is braked 703. At step 704, the sequence optionally confirms that the belts 70 have been stopped. Once the belts 70 are stopped, the machine optionally opens 706 the sealing element 64. At optional step 708, if the material is wrap type material, the sequence allows 710 a predetermined period of time to elapse and then the inflation arrangement 160 is braked 712. At step 714, the sequence confirms 716 that both the belts 70 and the inflation arrangement 160 are stopped and the sequence optionally returns to the idle sequence 304 or the stop state 302.

Figure 11:
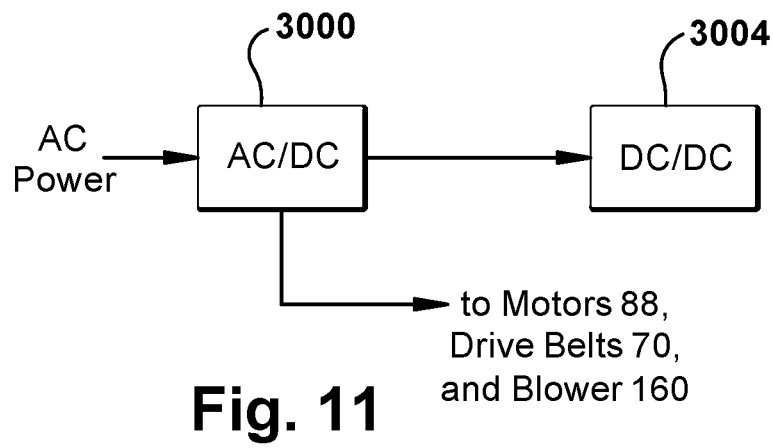
FIG. 11 illustrates one embodiment of alternating current (AC) to direct current (DC) converter (AC/DC converter) providing DC power to a system.

With reference to FIG. 11, in one embodiment, alternating current (AC) power is supplied to an alternating current to direct current (DC) converter (AC/DC converter) 3000. The AC/DC converter 3000 provides DC power to, for example, motors 88 (see FIG. 13) that drive the belts 70 (see FIG. 1B), the blower 60, and a DC/DC converter 3004. The DC power supplied to the motors, blower, and/or the DC/DC converter can be any appropriate DC voltage, such as 12V, 24V, or 48V. In one embodiment, the DC/DC converter 3004 receives the DC power from the AC/DC converter 3000 and is programmable to provide a DC power output that is adjustable between zero (0) volts and an appropriate maximum DC voltage for the heating element 64, such as, for example 5.5 Volts DC. It is contemplated that the DC power output between zero (0) volts and the maximum DC voltage is a continuous analog DC output that is quickly adjustable to control the temperature of the heating element 64. In another embodiment, the DC/DC converter 3004 receives is programmable to provide a DC power output having a current output that is adjustable to control the temperature of the heating element 64.

The DC power output of the DC/DC converter 3004 may be used to control the heater temperature control 165 (see FIG. 1B). In one embodiment, the DC power output of the DC/DC converter 3004 is included in a control loop with the heater temperature control 165 for controlling the temperature of the heating element 64. In one exemplary embodiment, the output voltage of the DC/DC converter is increased to increase the temperature of the heating element 64 or decreased to decrease the temperature of the heating element 64. In another exemplary embodiment, the output current of the DC/DC converter is increased to increase the temperature of the heating element 64 or decreased to decrease the temperature of the heating element 64.

In one embodiment, the heater temperature control 165 (see FIG. 1B) receives a desired set point temperature from, for example, a user input 3006 (see FIG. 1B) such as a knob or switch that may be included on the heater temperature control 165. Alternatively, the heater temperature control 165 receives the desired set point temperature from an external computing device. The heater temperature control 165 electronically communicates a signal to the DC/DC converter 3004 based on a current temperature of the heating element 64 (see FIG. 1B) and the set point temperature. In one embodiment, the current temperature of the high resistance portion 84 (see FIG. 1B) of the heating element 64 (see FIG. 1B) is determined based on a calculated resistance of the high resistance portion as described above. For example, voltage measurements may be obtained at the ends 84a, 84b (see FIG. 1B) of the high resistance portion 84 (see FIG. 1B) or by using the voltage applied by the DC/DC converter 3004. Then, the current through the high resistance portion 84 (see FIG. 1B) is measured, for example with a Hall Effect sensor or a low resistance, high precision feedback resistor as described above. The resistance is determined based on the voltage and the current according to the equation Resistance (R)=Voltage (V)/Current (I).

If, for example, the set point temperature is 300° F. and the current temperature of the heating element 64 (see FIG. 1B) is determined to be 280° F., the heater temperature control 165 (see FIG. 1B) electronically communicates a signal to the DC/DC converter 3004 to increase the DC voltage output of the DC/DC converter 3004 which, in turn, increases the resistance of the high resistance portion 84 (see FIG. 1B) of the heating element 64 (see FIG. 1B). Since the temperature of the high resistance portion 84 (see FIG. 1B) of the heating element 64 (see FIG. 1B) is related to the resistance of the high resistance portion 84 (see FIG. 1B), changing the resistance of the high resistance portion 84 (see FIG. 1B) correspondingly changes the temperature of the high resistance portion 84 (see FIG. 1B). It is contemplated that the temperature of the heating element is measured and calculated very often. In one exemplary embodiment, the temperature of the heating element is measured and calculated at more than 100 Hz, such as at about 281 Hz. As such, the heated sealing element 64 is monitored every 10 ms or less, 5 ms or less, 2 ms or less, or 1 ms or less, instead of about every 20 ms if the system uses AC power operated at 50 Hz and sampling is done on full waves. This allows for very precise control of the temperature of the heating element, such as between 1° F. and 5° F.

It is contemplated that the signal communicated to the DC/DC converter 3004 is based on the level of temperature changed (e.g., resistance change) desired to achieve the set point temperature of the heating element 64 (see FIG. 1B). For example, if it is desired to raise the temperature of the heating element 64 to achieve the set point temperature by only 10° F., the signal communicated to the DC/DC converter 3004 will cause the DC/DC converter 3004 to change the DC voltage output a relatively smaller amount than if it is desired to raise the temperature of the heating element 64 (see FIG. 1B) by 50° F. In other words, the signal communicated to the DC/DC converter 3004 will cause the DC/DC converter 3004 to change the DC voltage output proportionally according to the level of resistance change (e.g., temperature change) needed to bring the temperature of the heating element 64 (see FIG. 1B) to the set point temperature. In that regard, if it is desired to raise the temperature of the heating element 64 (see FIG. 1B) to achieve the set point temperature, the signal communicated to the DC/DC converter 3004 will cause the DC/DC converter 3004 to increase the DC voltage output, while if it is desired to lower the temperature of the heating element 64 (see FIG. 1B) to achieve the set point temperature, the signal communicated to the DC/DC converter 3004 will cause the DC/DC converter 3004 to lower the DC voltage output.

In the embodiment discussed above, the resistance is changed to achieve a desired temperature change of the high resistance portion 84 (see FIG. 1B) of the heating element 64 (see FIG. 1B). Alternatively, a thermocouple is provided to directly measure the temperature of the high resistance portion 84 (see FIG. 1B) of the heating element 64 (see FIG. 1B).

Figure 12:
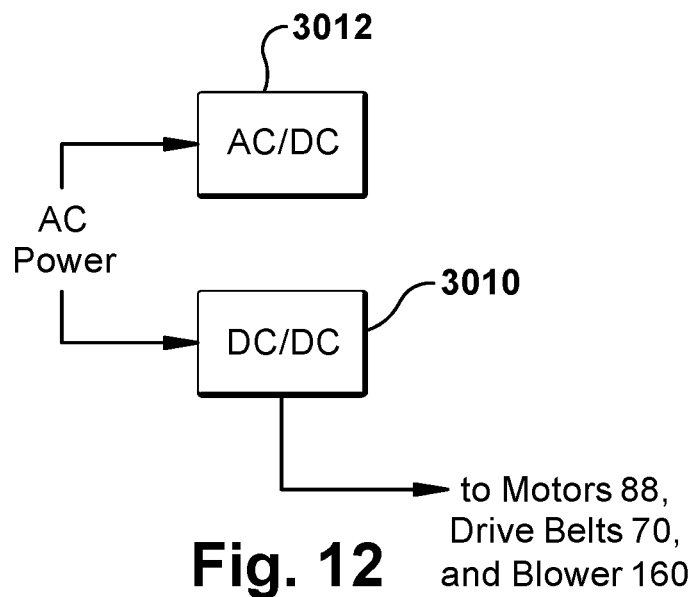
FIG. 12 a second embodiment of the alternating current (AC) to direct current (DC) converter (AC/DC converter) providing DC power to the system.

With reference to FIG. 12, in another embodiment, alternating current (AC) power is supplied to two alternating current to direct current (DC) converters (AC/DC converters) 3010, 3012. The first of the AC/DC converters 3010 provides DC power (e.g., a fixed DC voltage) to, for example, motors 88 (see FIG. 13) that drive the belts 70 (see FIG. 1B), and the blower 60. Any appropriate DC voltage for the motors 88 and blower 60 may be selected. For example, this DC voltage may be 12V, 24V, or 48V. The second of the AC/DC converters 3012 is programmable to provide an adjustable DC power output between zero (0) volts and an appropriate maximum DC voltage for the heating element 64, such as 5.5 Volts DC. However, any maximum DC voltage may be selected (as long as it is high enough to achieve the maximum temperature of the heating element), since the output is adjustable. It is contemplated that the DC power output between zero (0) volts and the maximum DC voltage is a continuous analog DC output and is quickly adjustable to control the temperature of the heating element. The output DC voltage of the AC/DC converter is increased to increase the temperature of the heating element 64 or decreased to decrease the temperature of the heating element 64.

Figure 13:
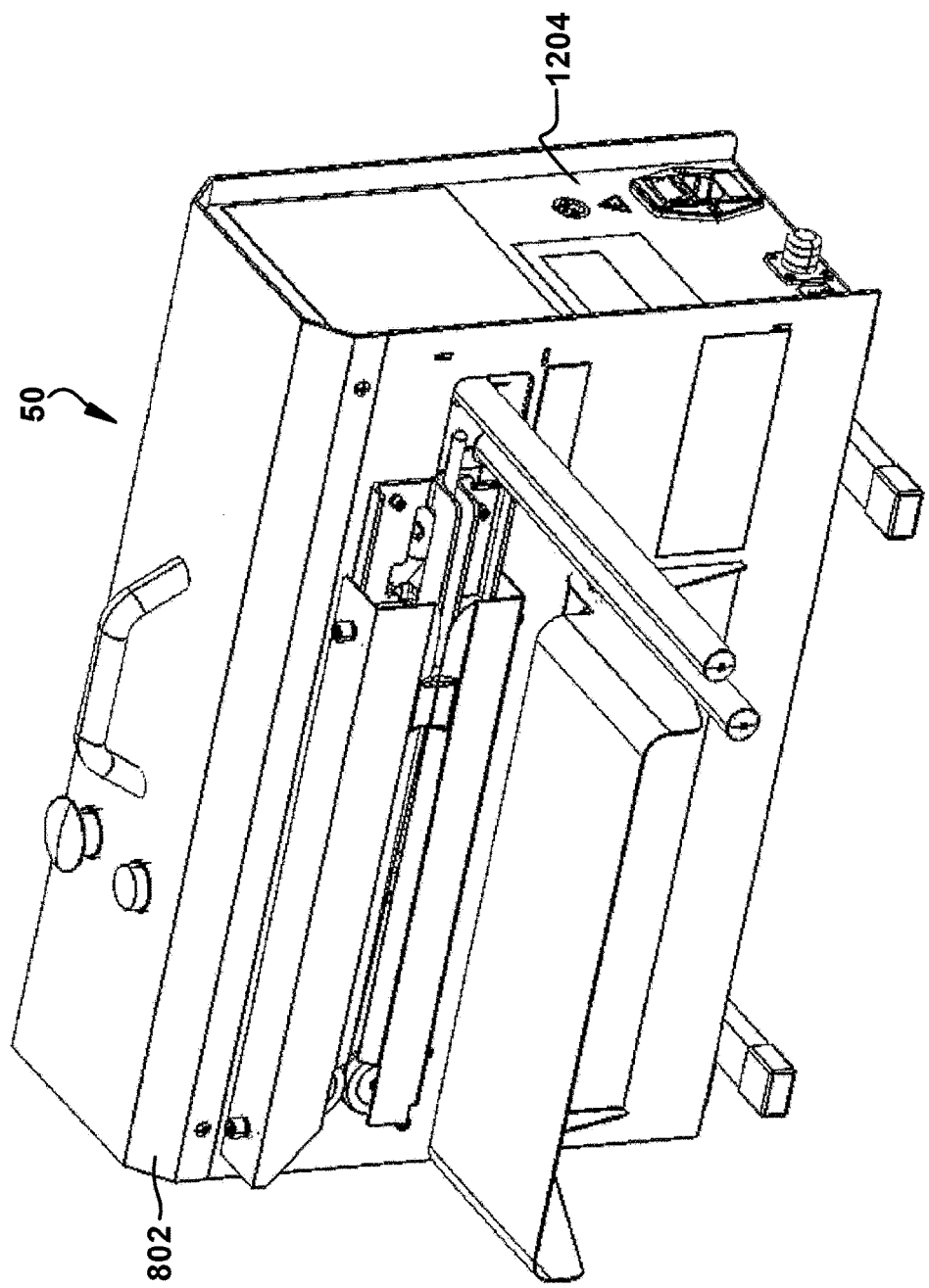
FIGS. 13 and 13A are perspective views of an exemplary embodiment of an air cushion inflation machine.
Figure 13A:
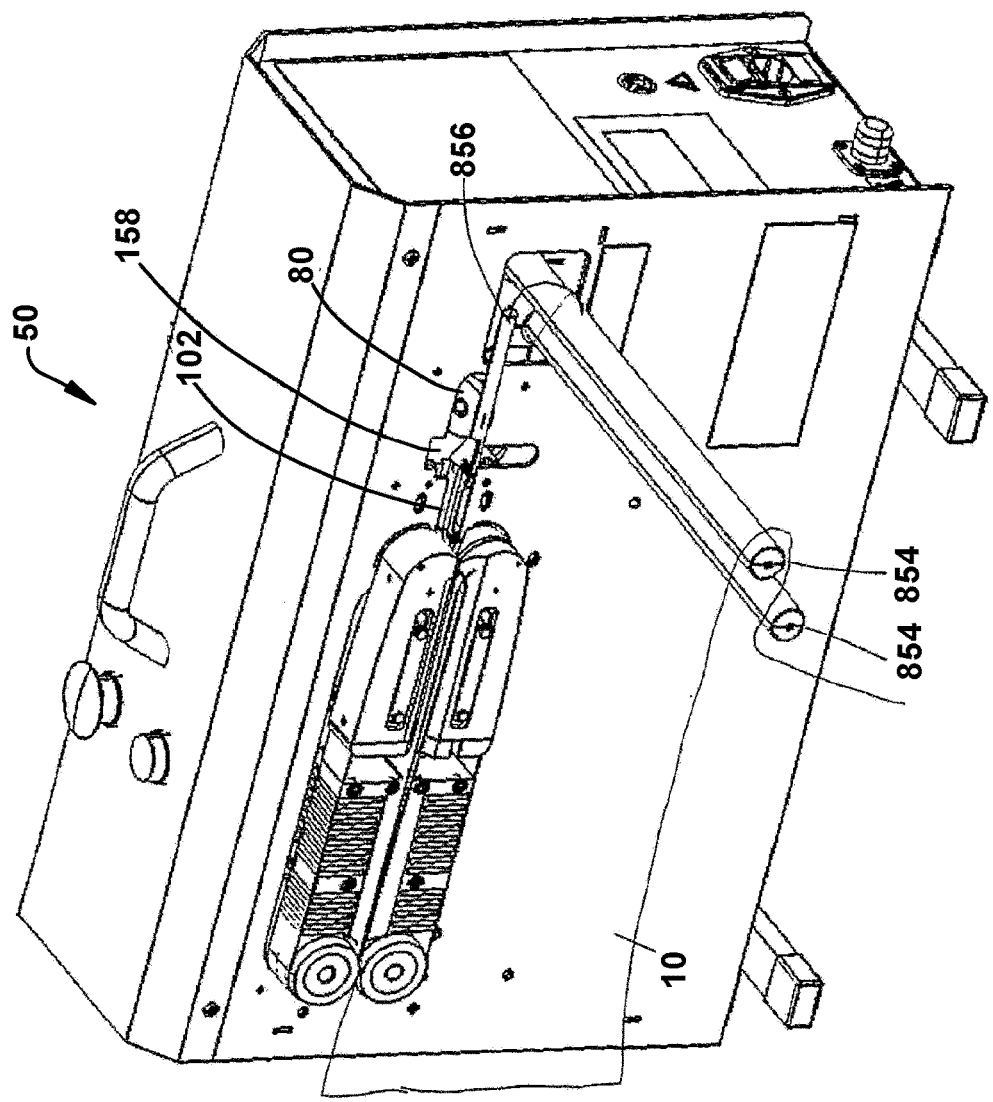

The machine 50 may take a wide variety of different forms. FIGS. 13, 13A, 15A, 18, 19, 31, and 32 and FIGS. 14, 14A, 16, 17, 20, and 21 illustrate two non-limiting, exemplary embodiments of the machine 50 in detail. In the example illustrated by FIGS. 13, 13A, 15A, 18, 19, 31, and 32, the machine 50 includes an inflation arrangement 102, and a sealing arrangement 110. FIG. 13 illustrates the machine 50 with a cover 802 disposed over the sealing arrangement 110. FIG. 13A illustrate the machine 50 with the cover removed.

Referring to FIGS. 13, 13A, 15A, 18, 19, 31, and 32, the web 10 is routed from a supply to and around a pair of elongated, transversely extending guide rolls 854. The web 10 is then routed to a longitudinally extending guide pin 856. The guide pin 856 is disposed between the inflation edge 20 and the transverse seals 22 of the web 10. The guide pin 856 aligns the web as it is pulled through the machine.

The inflation arrangement 110 can take a wide variety of different forms. Referring to FIG. 18, in the illustrated embodiment, the inflation arrangement 110 includes the hollow, longitudinally extending guide pin 856. The blower and blower control are disposed in a housing 1204 (FIG. 13) of the machine 50.

Figure 14A:
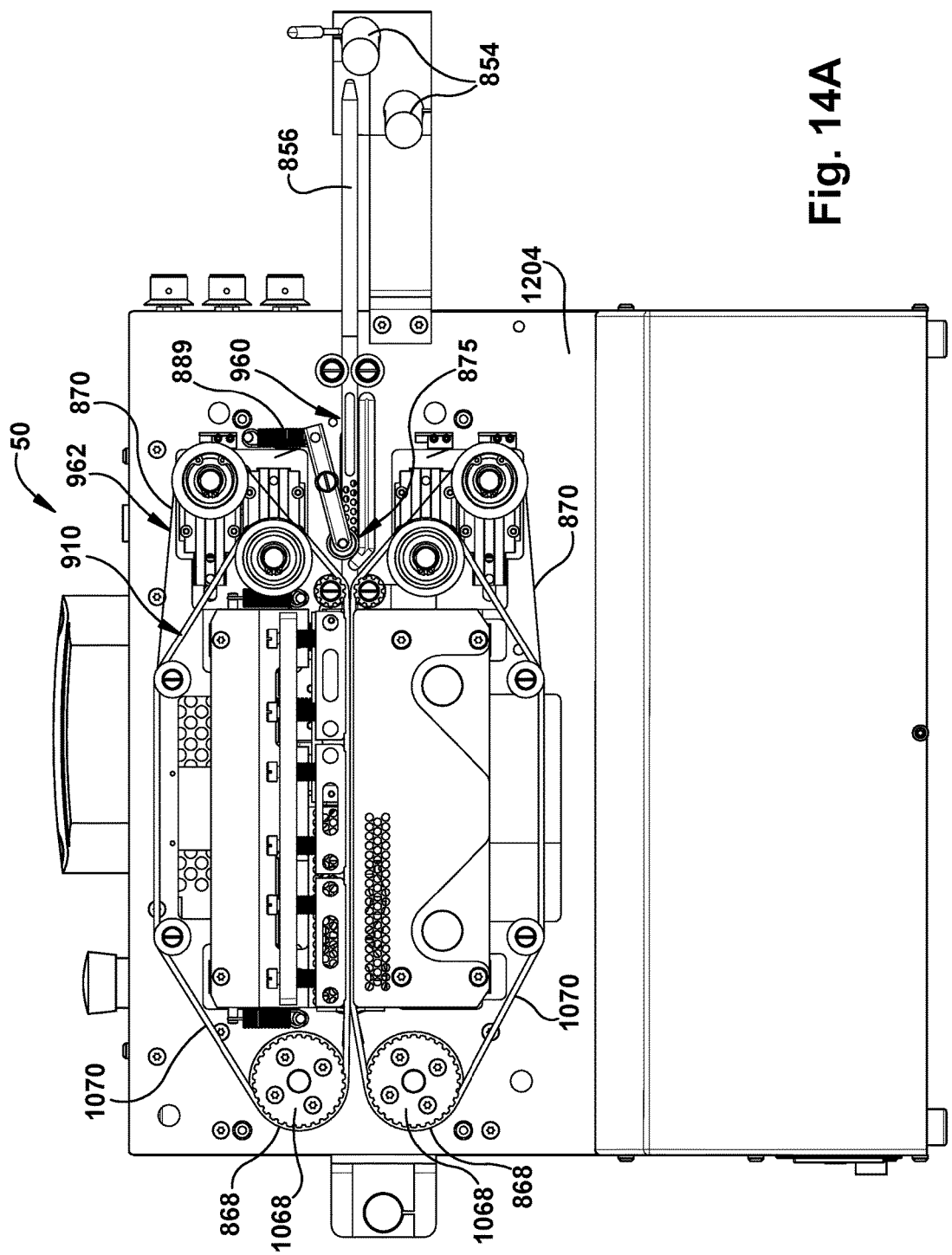
FIG. 14A is a side view of the air cushion inflation machine illustrated by FIG. 14.
Figure 15A:
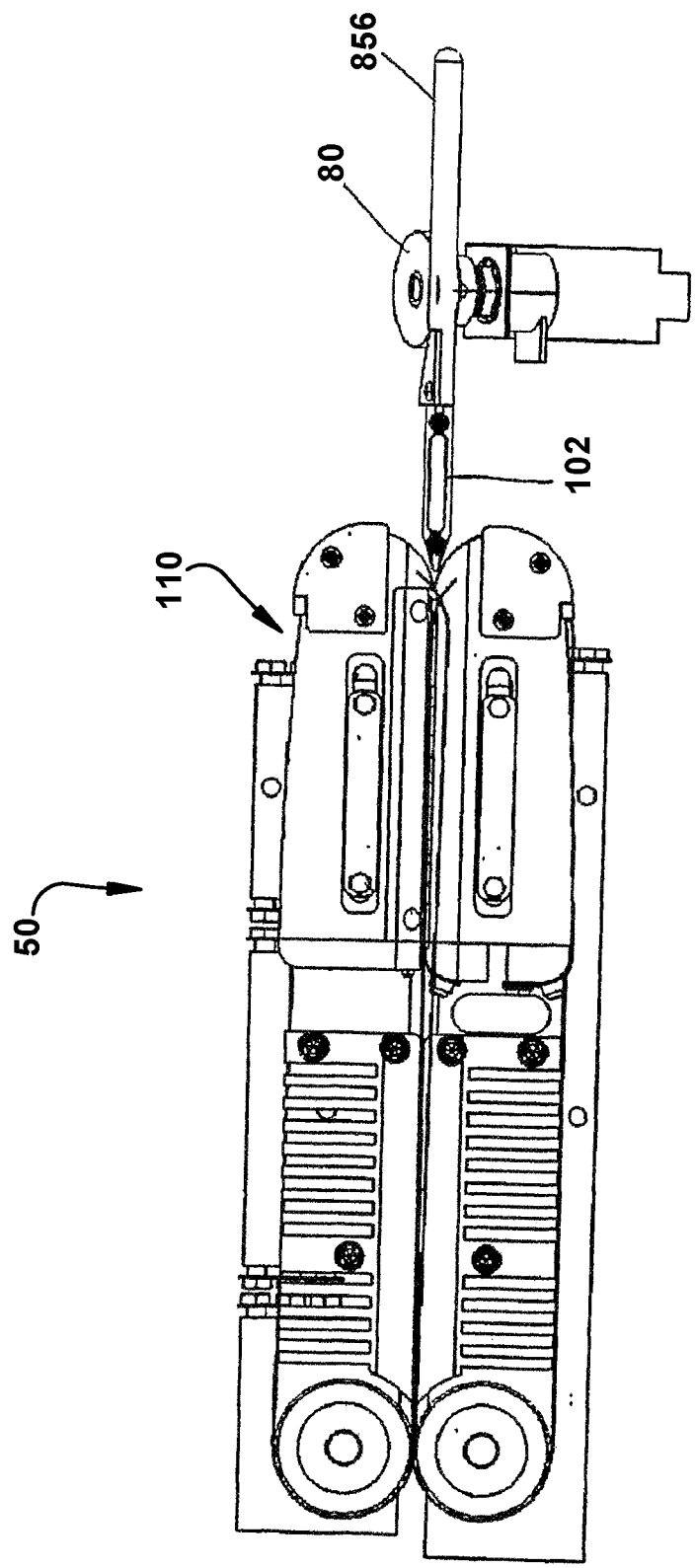
FIG. 15A is a front view of sealing components of the air cushion inflation machine illustrated by FIGS. 13 and 13A.
Figure 16:
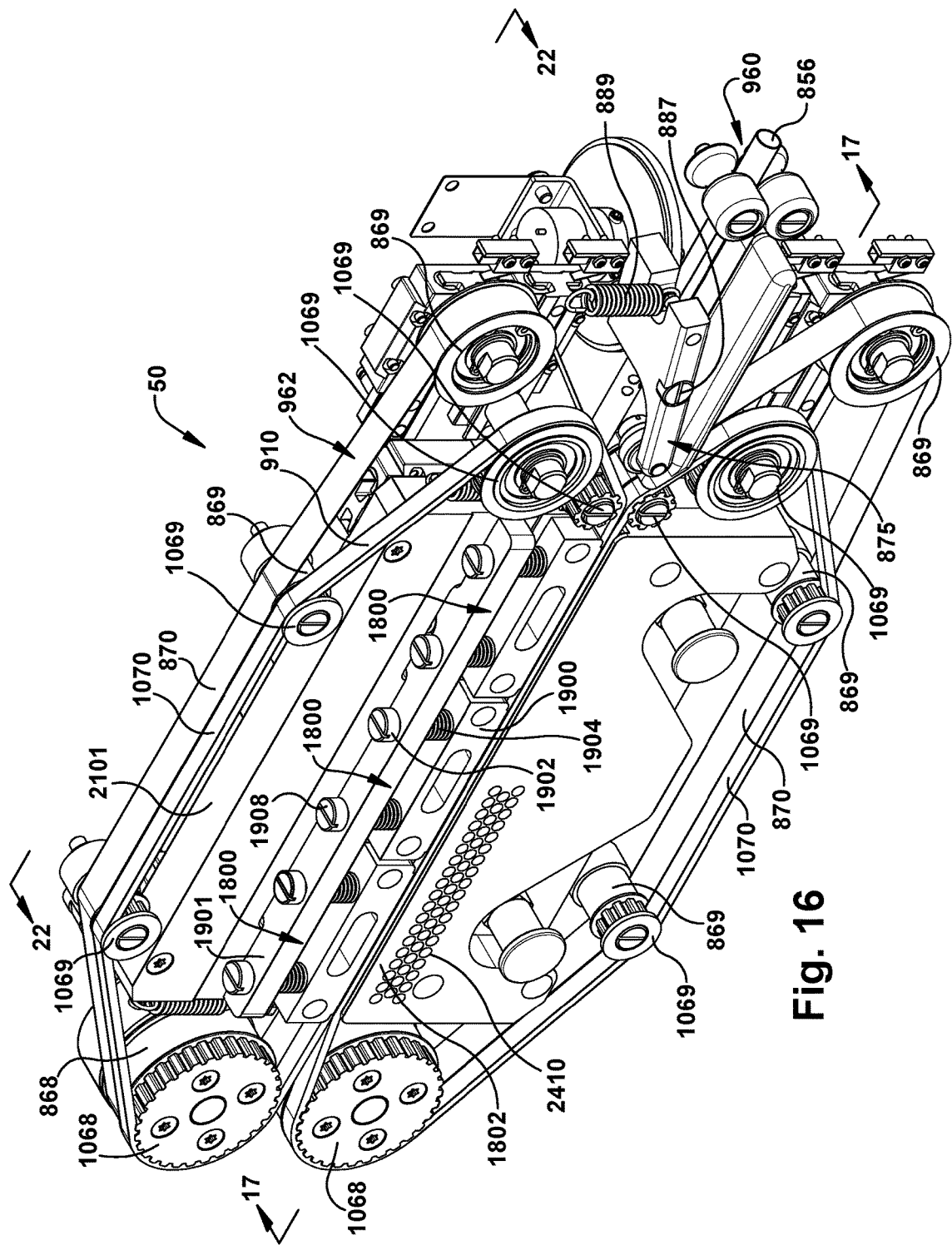
FIG. 16 is a perspective view of the sealing and clamp assemblies of the air cushion inflation machine shown in FIG. 14.
Figure 19:
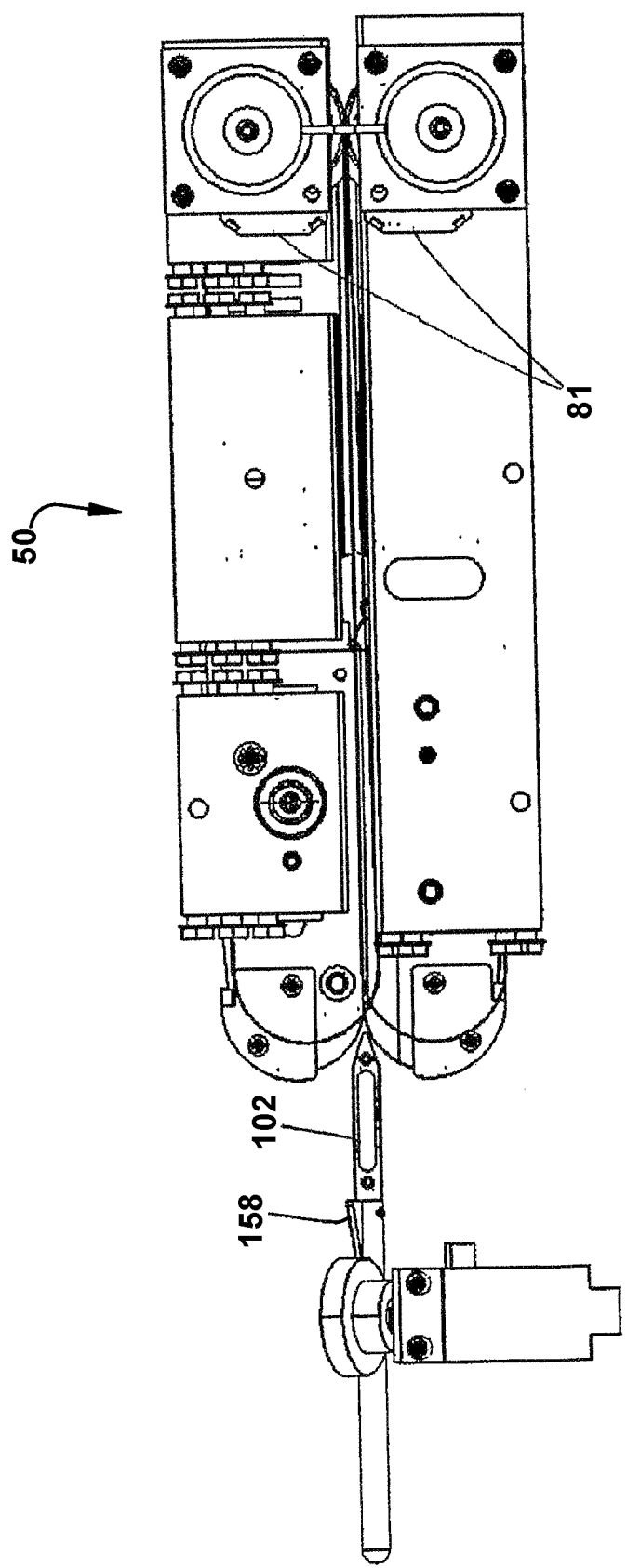
FIG. 19 is a rear view of a sealing assembly of the air cushion inflation machine illustrated by FIG. 13A.

With reference to FIG. 13A, the web 10 passes from the guide rolls 854 to the pin 856 and the separation device 158 before passing into the sealing and clamping arrangement 110. With reference to FIG. 14A, the machine 50 includes the encoder 80 to measure the web 10 travel and encoders 81 to measure the operating speeds the motors. With reference to FIG. 15A, the encoder 80 is illustrated before the separation device 158 and the sealing and clamping arrangement 110. With reference to FIGS. 18 and 19, the encoders 81 are illustrated as separate from the motors 88, but may be part of the motor assemblies.

Figure 31:
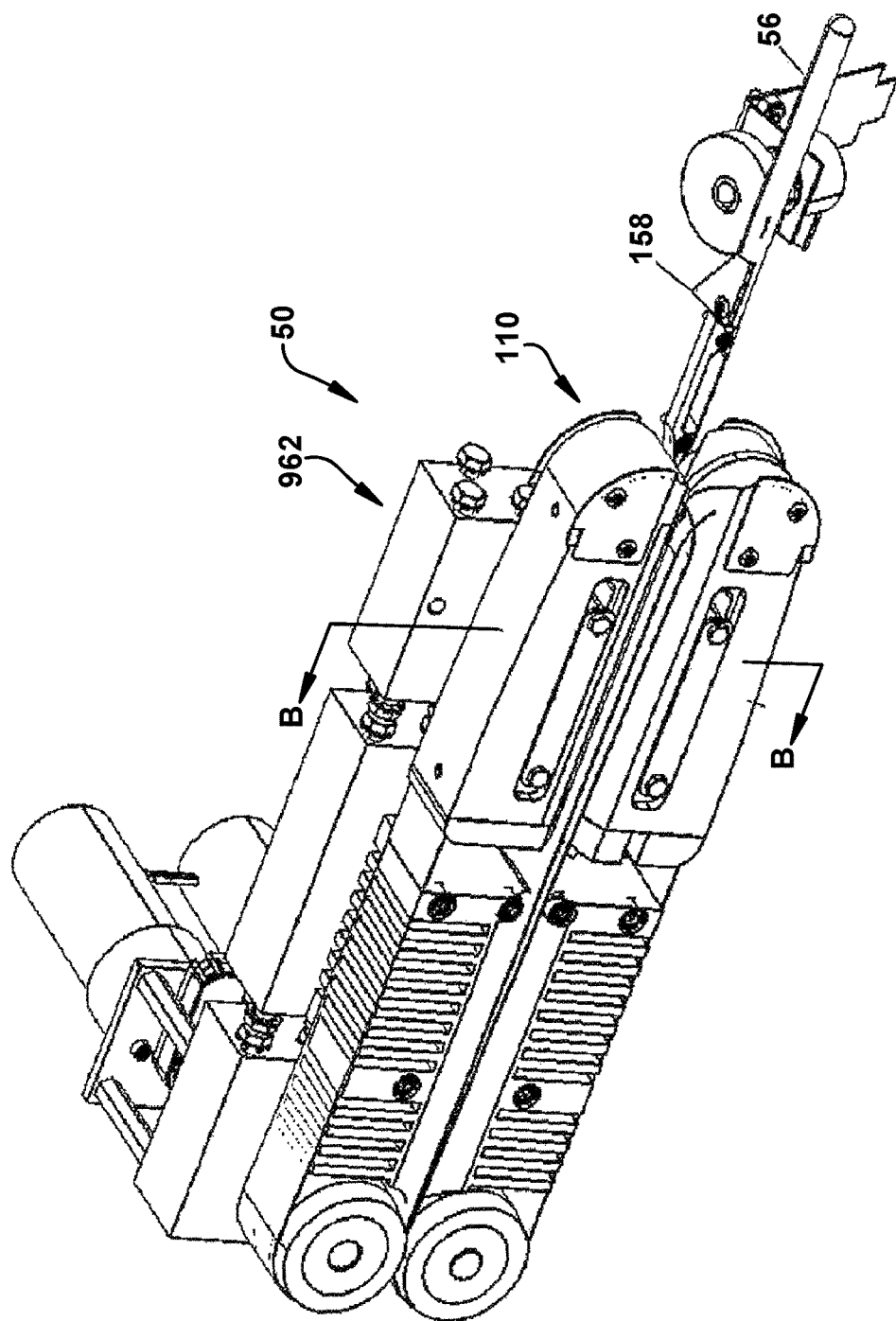
FIG. 31 is a perspective view of a part of an air cushion inflation machine illustrated by FIG. 13A.
Figure 32:
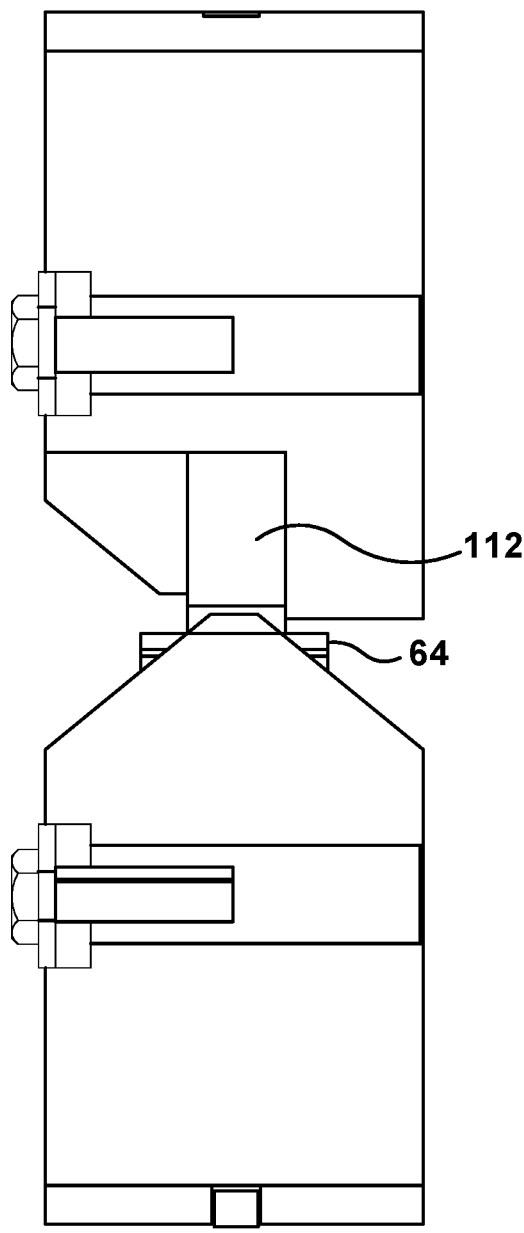
FIG. 32 is a view taken as indicated by lines B-B in FIG. 31.

With reference to FIG. 31, the machine 50 is illustrated showing the guide pin 56, the separation device 158, and the sealing and clamping arrangement 110. FIG. 32 illustrates a cross-sectional view of the machine 50 along the B-B in FIG. 31. With reference to FIG. 32, the heated sealing element 64 and compliant material 112 are illustrated in the sealing and clamping arrangement of the machine 50.

FIGS. 14, 14A, 16, 17, 17A, 17B, and 20-30 illustrate a second non-limiting, exemplary embodiment of an inflation machine 50 in detail. In the example illustrated by FIGS. 14, 15, 16, 17, 17A, 17B, and 20-30, the machine 50 includes an inflation arrangement 960 (see FIG. 17), a sealing arrangement 962 (see FIG. 20), a clamping arrangement 910, and a web tensioning device 875 (see FIG. 17).

Figure 14:
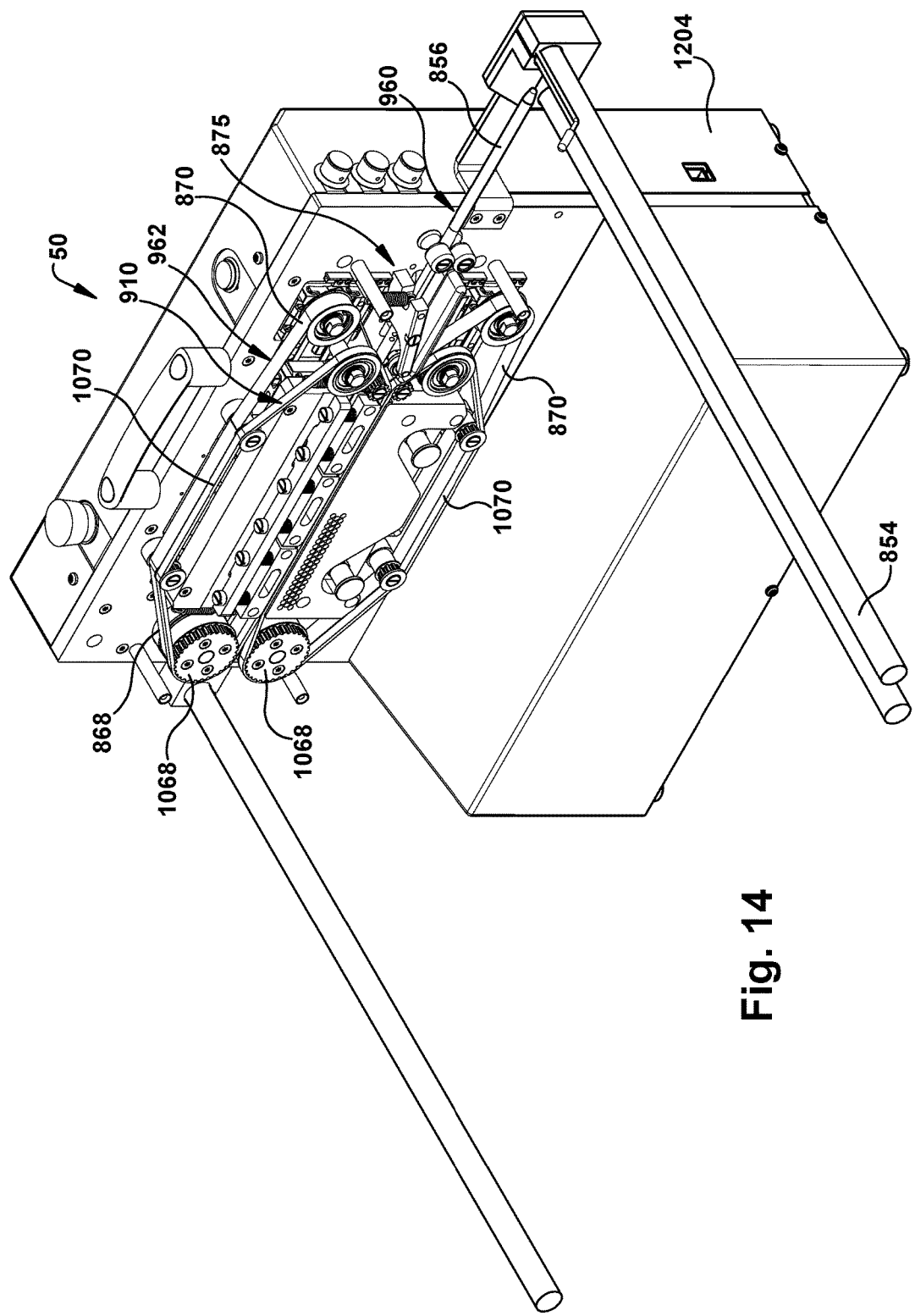
FIG. 14 is a perspective view of a dual belt air cushion inflation machine, such as the air cushion inflation machine illustrated by FIGS. 7B and 7C.

Referring to FIG. 14, the web 10 is routed from a supply to and around a pair of elongated, transversely extending guide rollers 854. The web 10 is then routed to a longitudinally extending guide pin 856. The guide pin 856 is disposed between the inflation edge 20 and the transverse seals 22 of the web 10. The guide pin 856 aligns the web as it is pulled through the machine. The web 10 is routed along the guide pin 856 through the web tensioning device 875.

Figure 17:
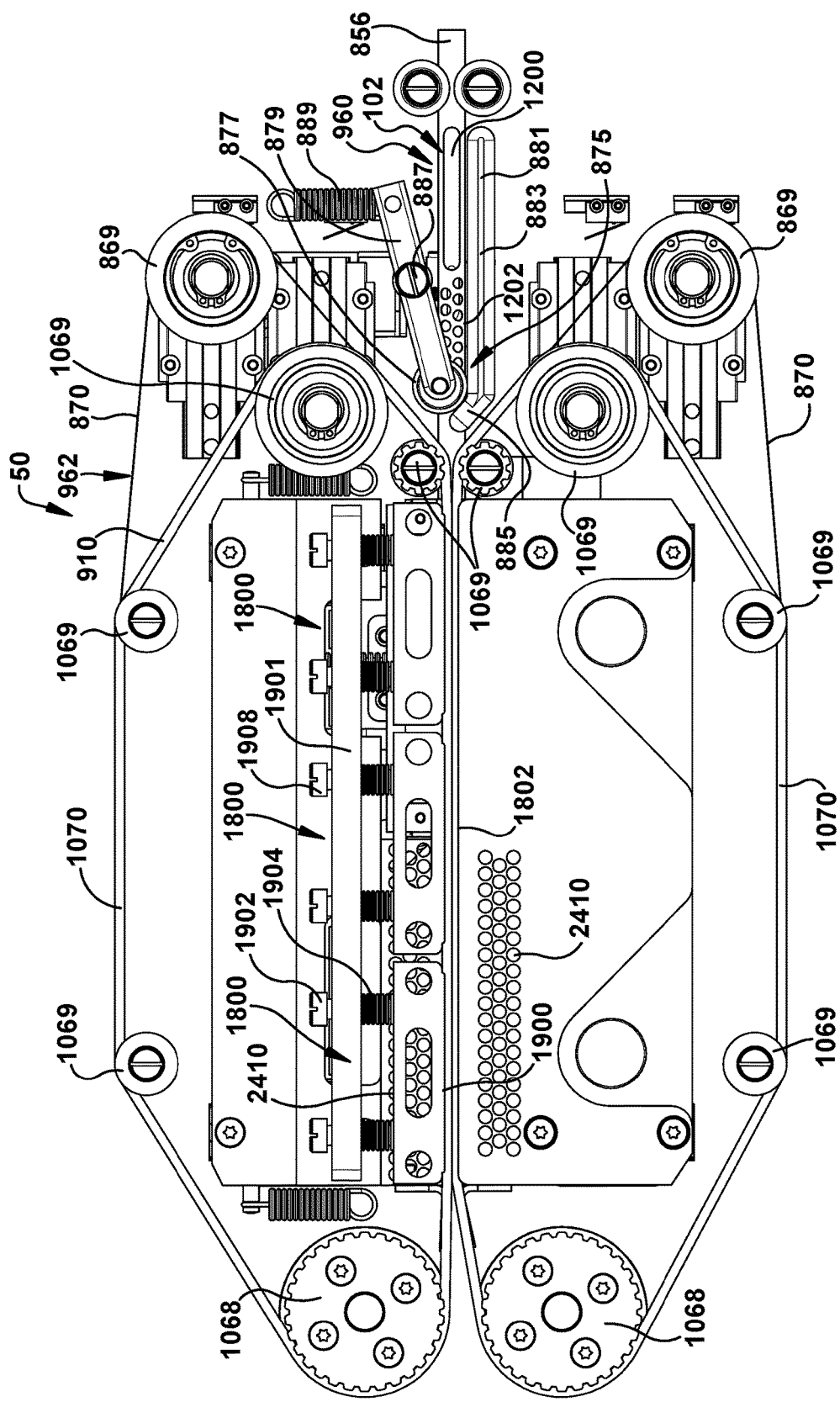
FIG. 17 is a view taken as indicated by lines 12-12 in FIG. 16.
Figure 17A:
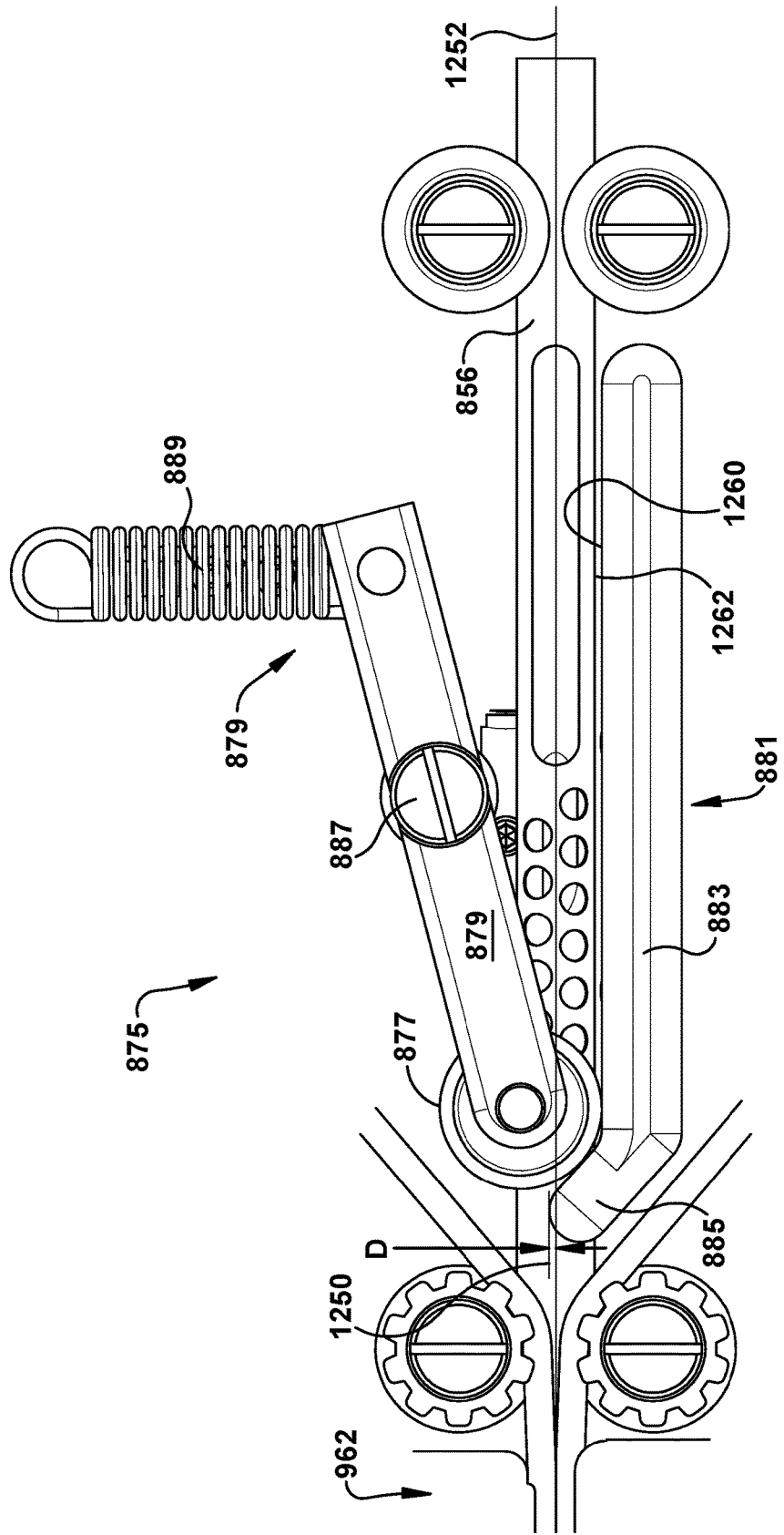
FIG. 17A is an enlarged portion of FIG. 17.
Figure 17B:
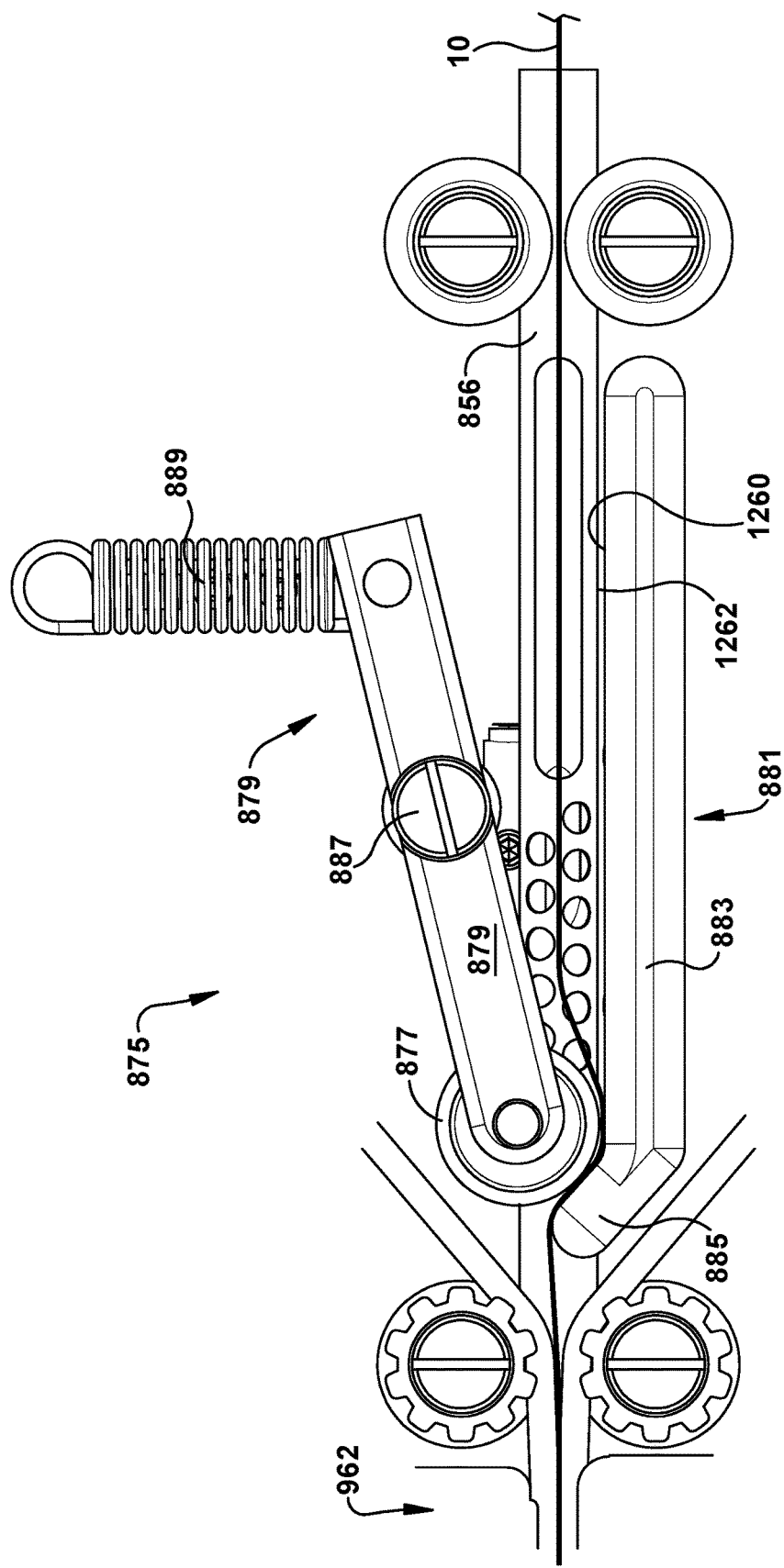
FIG. 17B is a view similar to FIG. 17A illustrating routing of inflation cushion material into the machine.

The tensioning device 875 keeps the web 10 (see FIG. 17B) taught as the web is pulled through the machine 50 (see FIG. 17). Keeping the web taught in the sealing arrangement 962 prevents wrinkles from forming in the seal 23. The tensioning device can take a wide variety of different forms. Any arrangement that applies tension to the web 10 can be used. Referring to FIGS. 17A and 17B, in the illustrated embodiment the tensioning device 875 includes a roller 877, a spring loaded pivot arm 879, and a shelf member 881. The shelf member 881 is fixed with respect to the path of travel of the web 10. The illustrated shelf member 881 includes a substantially horizontal portion 883 and an upwardly extending portion 885 that extends upward at an obtuse angle from the substantially horizontal portion 883.

The substantially horizontal portion 883 and the upwardly extending portion 885 can take a variety of different forms. In FIG. 17A, a centerline 1252 (the midpoint between the top and the bottom) of the guide pin 856 is depicted. In an exemplary embodiment, an upper surface 1260 of the substantially horizontal portion 883 is lower than the centerline 1252. In the example illustrated by FIG. 17A, an upper surface 1260 of the substantially horizontal portion 883 is lower than a bottom 1262 of the guide pin 856. In FIG. 17A, a horizontal line 1250 that is tangent to the top or uppermost surface of the upwardly extending portion 885 is depicted. In an exemplary embodiment, the top or uppermost surface 1250 is positioned to keep the pocket 23 taught against the guide pin 856, but not so taught that the perforations of the pocket 23 break. By pulling the pocket 23 of the web 10 taught against the guide pin 856, wrinkles in the web are eliminated as the web passes through the sealing arrangement 162. In one exemplary embodiment, the uppermost surface 1250 is positioned at or above the centerline 1252 of the guide pin 856. For example, the uppermost surface 1250 may be positioned at a distance D above the centerline. The distance D may be less than or equal to 0.250 inches, less than or equal to 0.218 inches, less than or equal to 0.187 inches, less than or equal to 0.156 inches, less than or equal to 0.125 inches, less than or equal to 0.093 inches, less than or equal to 0.062 inches, or less than or equal to 0.031 inches.

Referring to FIG. 17B, the pivot arm 879 is pivotally mounted to the machine 50 at a pivot 887. A spring 889 is attached to a first end of the pivot arm and to the machine 50. The roller 877 is rotatably attached to the second end of the pivot arm 879. The spring 889 forces the roller 877 against the shelf member 881 at the intersection of the substantially horizontal portion 883 and the upwardly extending portion 885. It should be readily apparent that the roller 877, the pivot arm 879 and/or the spring 889 can be replaced with any arrangement that frictionally engages the web. The frictional force is selected to keep the web 10 taught as the web passes through the sealing arrangement 162, but the frictional force is not great enough to cause the web 10 to tear. In one exemplary embodiment, the force applied between the roller 877 and the shelf 881 is between 5 lbs and 10 lbs, such as about 7 lbs or 7 lbs. The width of the contact area between the roller 877 and the shelf member 881 also influences the frictional force applied to the web 10. In one exemplary embodiment, the width of the contact area between the roller 877 and the shelf member 881 is between 0.062 and 0.375 inches, between 0.093 and 0.250 inches, between 0.125 and 0.187 inches, about 0.140 inches, or 0.140 inches.

Referring to FIG. 17B, the web 10 is routed between the roller 877 and the shelf member 881 such that the roller and the shelf member frictionally engage the layers 14, 16 of the web 10. The web 10 passes under the roller 877, up and over the upwardly extending portion 885 of the shelf member, and then into the sealing arrangement 962. The friction between the web 10, the roller 877, and the shelf member 881 keeps the web taught as the web is pulled through the sealing arrangement 962.

The inflation arrangement 960 can take a wide variety of different forms. Referring to FIG. 17, in the illustrated embodiment, the inflation arrangement 960 includes the hollow, longitudinally extending guide pin 856 and an inlet opening 1200 for fluid connection to a blower or other source of air under pressure or other fluid under pressure. The illustrated guide pin 856 includes a plurality of inflation openings 1202. The inflation openings 1202 can take a wide variety of different forms. In the illustrated embodiment, the guide pin 856 includes a first, relatively large, opening 1200 and a plurality of smaller openings 1202. The illustrated opening 1200 is a slot with semi-circular ends. The illustrated smaller openings 1202 are circular in shape. The blower and blower control are disposed in a housing 1204 (FIG. 14) of the machine 50.

Figure 20:
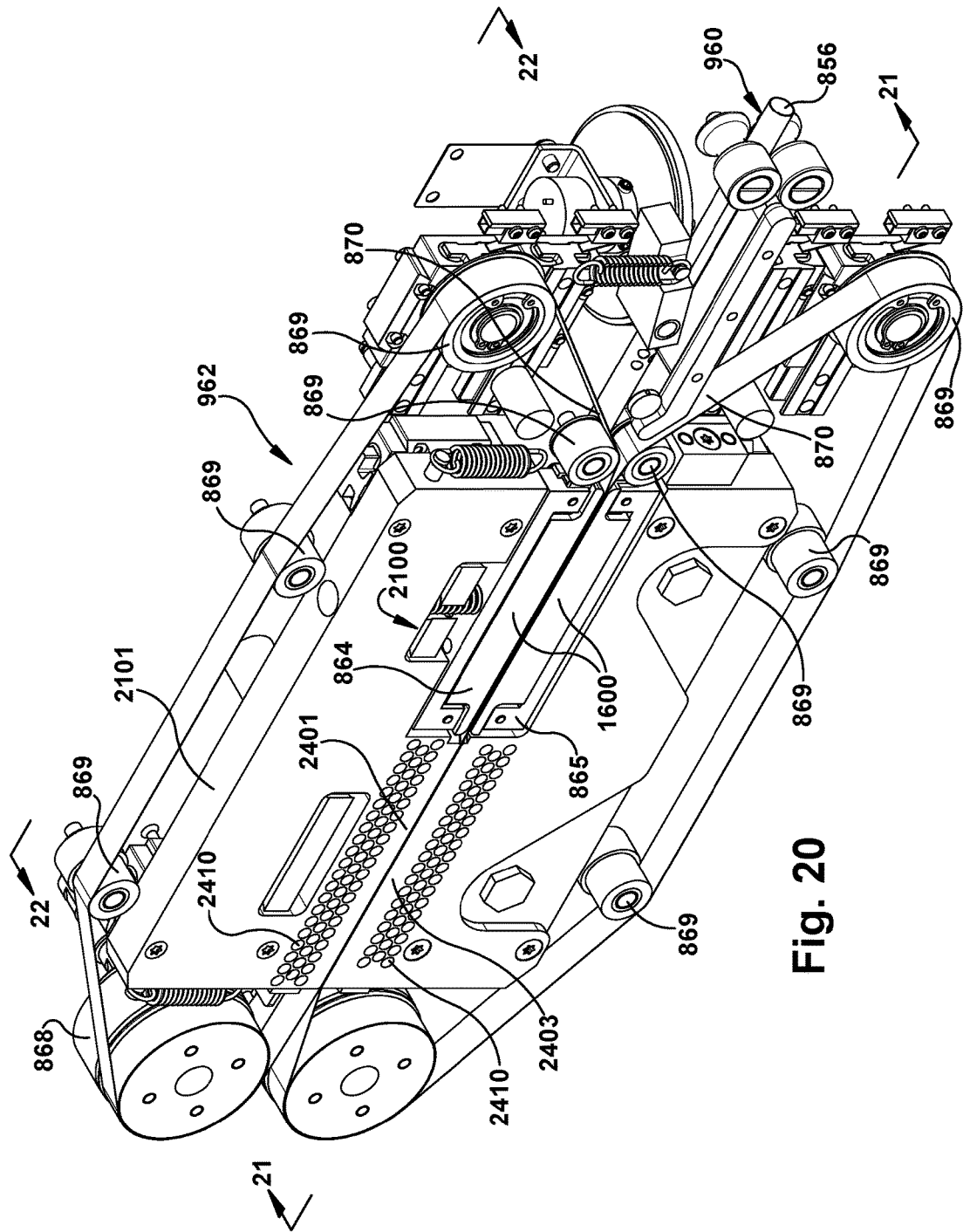
FIG. 20 is a perspective view of a sealing assembly of the air cushion inflation machine shown in FIG. 14.
Figure 21:
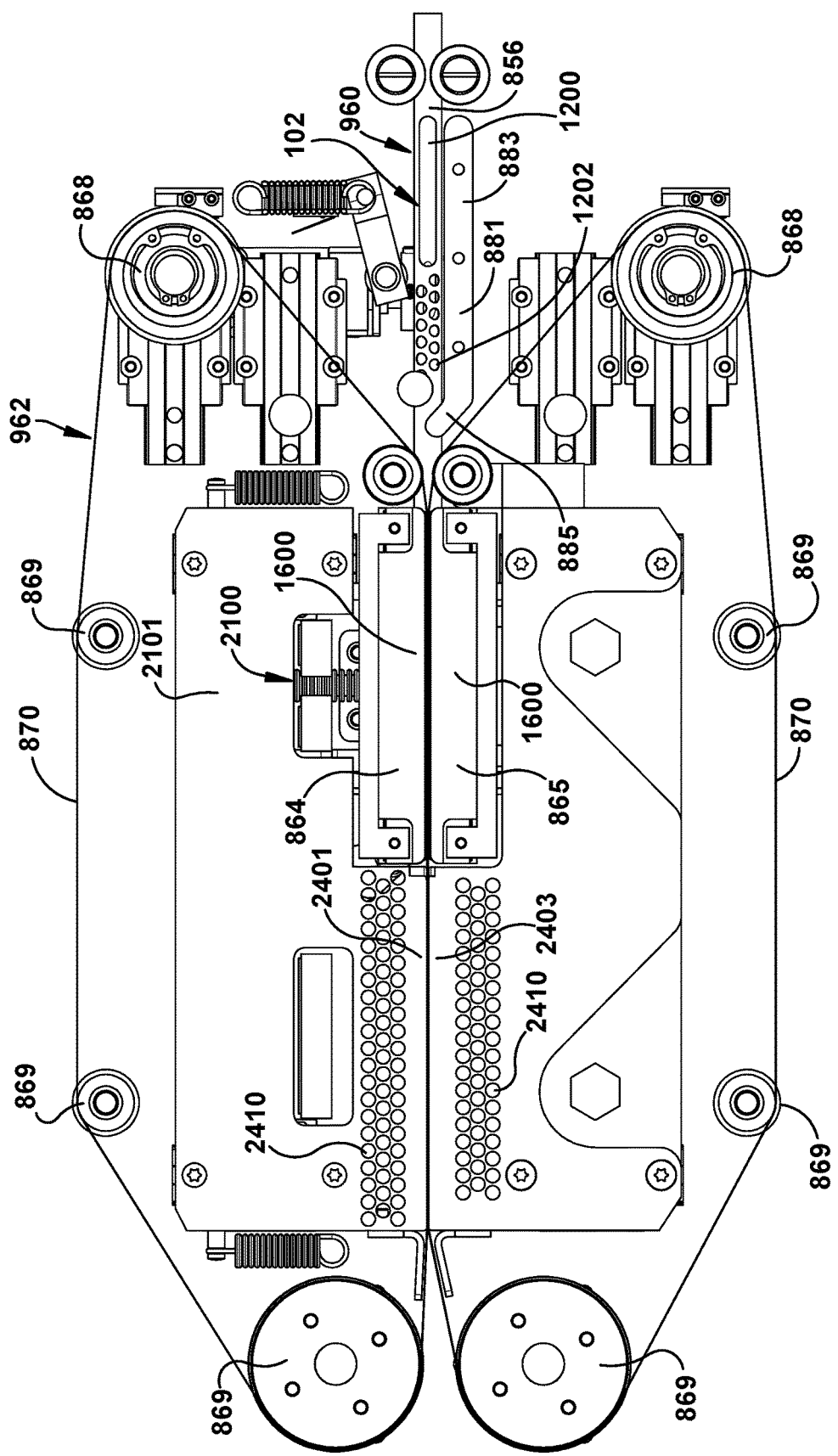
FIG. 21 is a view taken as indicated by lines 16-16 in FIG. 20.
Figure 22:
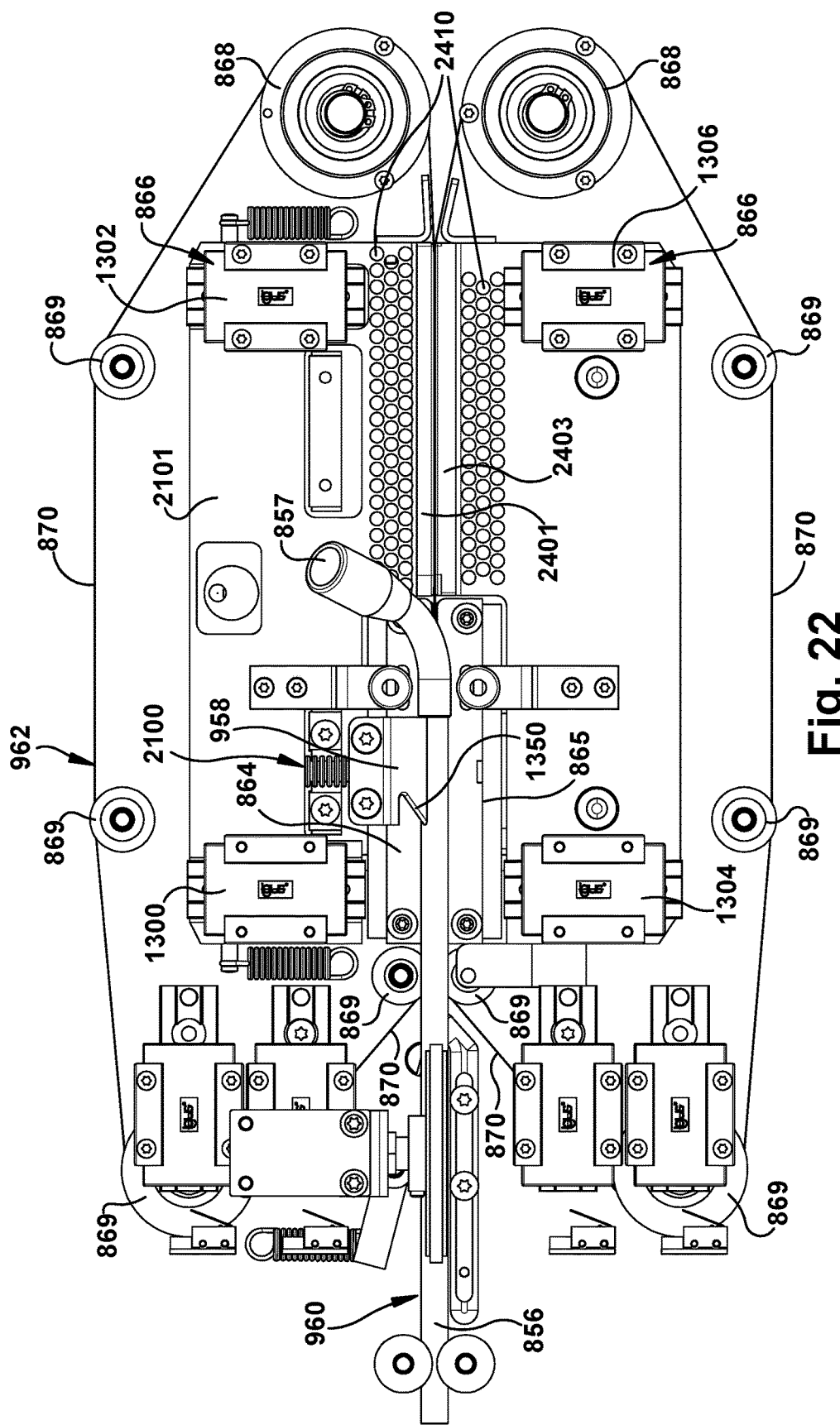
FIG. 22 is a view taken as indicated by lines 17-17 in FIG. 20.

The sealing arrangement 962 forms the seal 42 to create sealed inflated cushions 12. The sealing arrangement 962 can take a wide variety of different forms. Referring to FIGS. 20-22, the sealing assembly 962 includes a compliant material 864 and a heated sealing element 865, a positioning device 866, drive rollers 868, idler rollers 869, and sealing belts 870. Each belt 870 is disposed around its respective heat sealing elements 864, 865, drive roller 868, and idler rollers 869. Each belt 870 is driven by its respective drive roller 868. In an exemplary embodiment, the speed of the drive rollers 868 and belts 870 are controlled by a belt speed control that is disposed in the housing 1204 of the machine. The belt speed control may be part of an overall controller for the machine or the belt speed controller may be a separate device that interfaces with other devices. The belts 870 engage one another, such that the belts 870 pull the web 10 through the heat sealing elements 864, 865. The seal 42 is formed as the web 10 passes through the heated sealing elements 864, 865.

Figure 26:
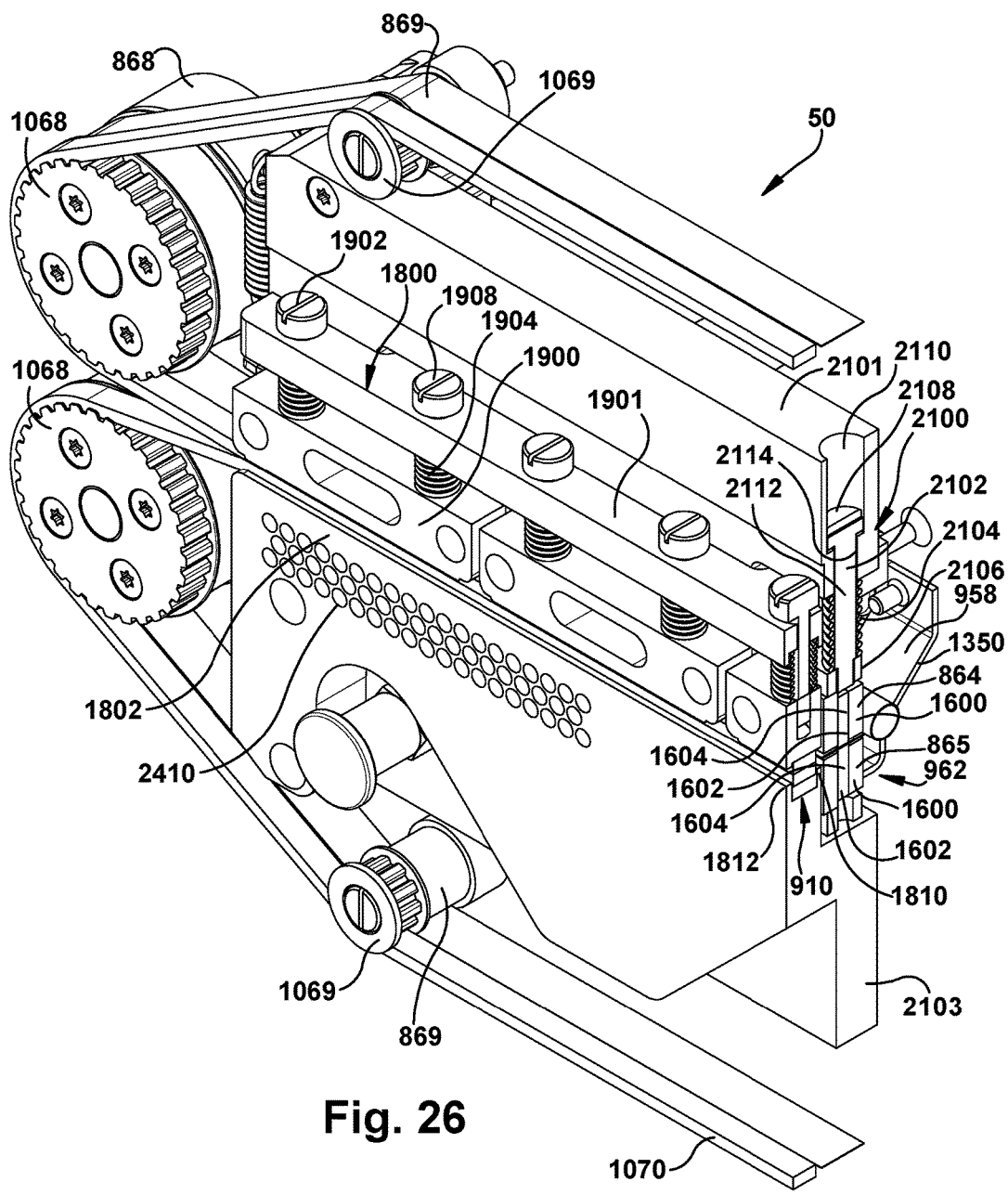
FIG. 26 is a sectioned perspective view with the section being taken as indicated by lines 21-21 in FIG. 25.

Referring to FIG. 26, in the illustrated example the heat sealing element 864 is biased toward the heat sealing element 865 by a biasing assembly 2100. The biasing assembly 2100 can take a wide variety of different forms. The biasing arrangement may be any arrangement that biases the heat sealing elements 864, 865 relatively toward one another. In the illustrated example, the biasing assembly 2100 includes a support member 2101, a shaft member 2102, a spring 2104 disposed around the shaft member, and a coupling member 2106 connected to the heat sealing element 864. A head 2108 of the shaft member 2102 is disposed in a counterbore 2110 of the support member 2101 with a shaft portion 2112 of the shaft member extending through a hole 2114 in the support member 2101. The shaft member 2102 is free to move axially in the counterbore. An end of the shaft portion is connected to the coupling member 2106. The spring 2104 pushes the coupling member 2106 and attached heat sealing element 864 downward. The biasing assembly 2100 ensures that the heat sealing elements 864, 865 securely engage the web 10 between the belts 1070 whenever the belts are engaged.

The heating element 864 can take a wide variety of different forms. Referring to FIG. 26, in the illustrated example the heating element 864 includes an outer body 1600, an internal ceramic element 1602, and an internal thermocouple 1604 or other device for measuring the temperature of the internal ceramic element 1602. A potting material or other encapsulating material surrounds the internal ceramic element 1602 and the thermocouple 1604. In an exemplary embodiment, the thermocouple 1604 is disposed directly on the ceramic element 1602. As discussed above, in other embodiments the heating element 864 may also be the wire including at least one low resistance portion 82 and at least one high resistance portion 84. The compliant material 112 is included as part of a spring loaded clamping assembly 1800, which is discussed below.

A temperature control arrangement is coupled to the thermocouple 1602 and the ceramic element 1602 for controlling the temperature of the ceramic element 1602 based on feedback from the thermocouple 1604. The temperature measured by the thermocouple is used to adjust the power applied to the heating element and thereby control the temperature of the heating element. The temperature control arrangement is disposed in the housing 1204 of the machine. The temperature control arrangement may be part of an overall controller for the machine or the temperature control arrangement may be a separate device that interfaces with other devices.

Figure 27:
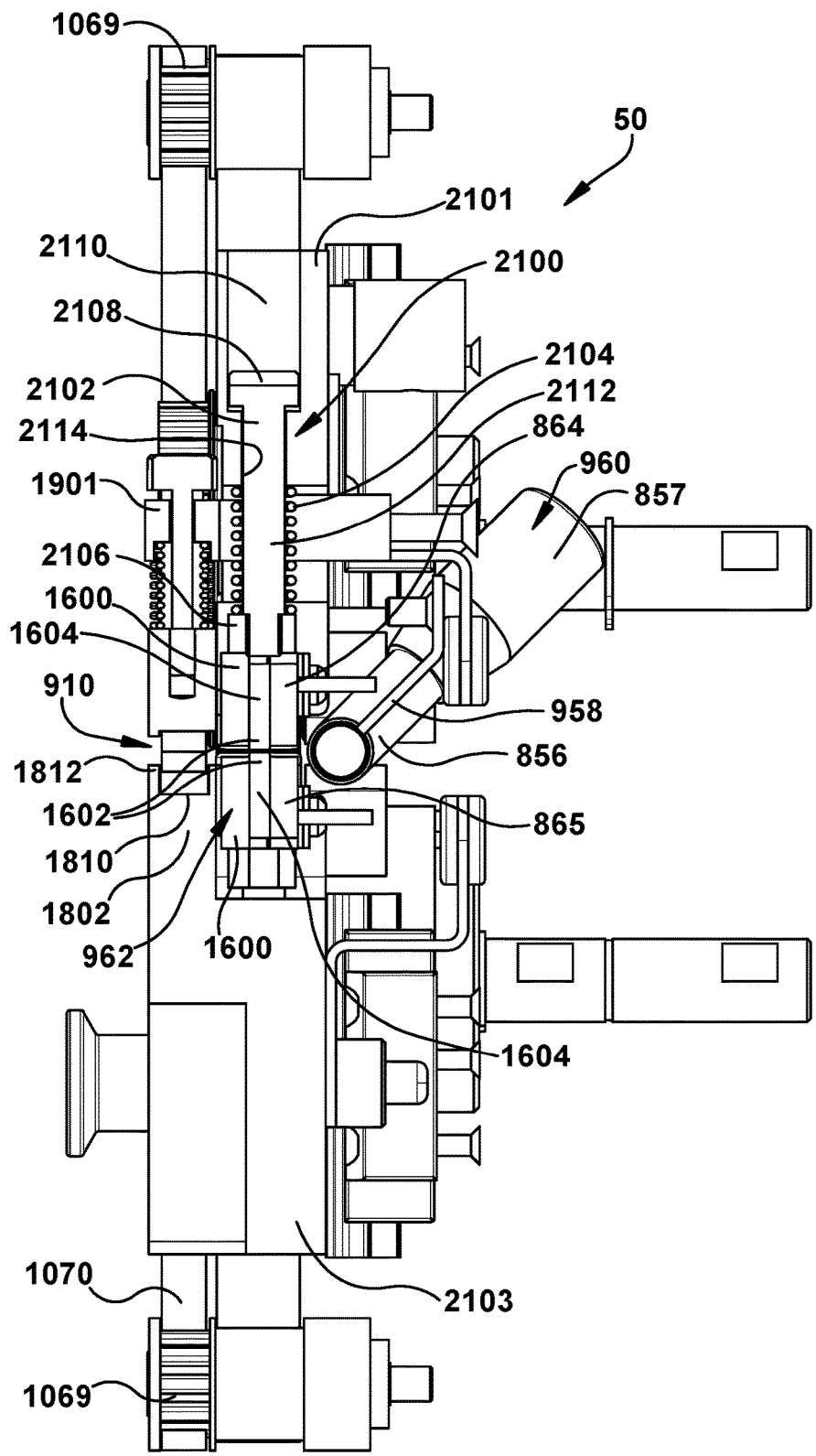
FIG. 27 is a sectional view taken along the plane indicated by lines 21-21 in FIG. 25.
Figure 28:
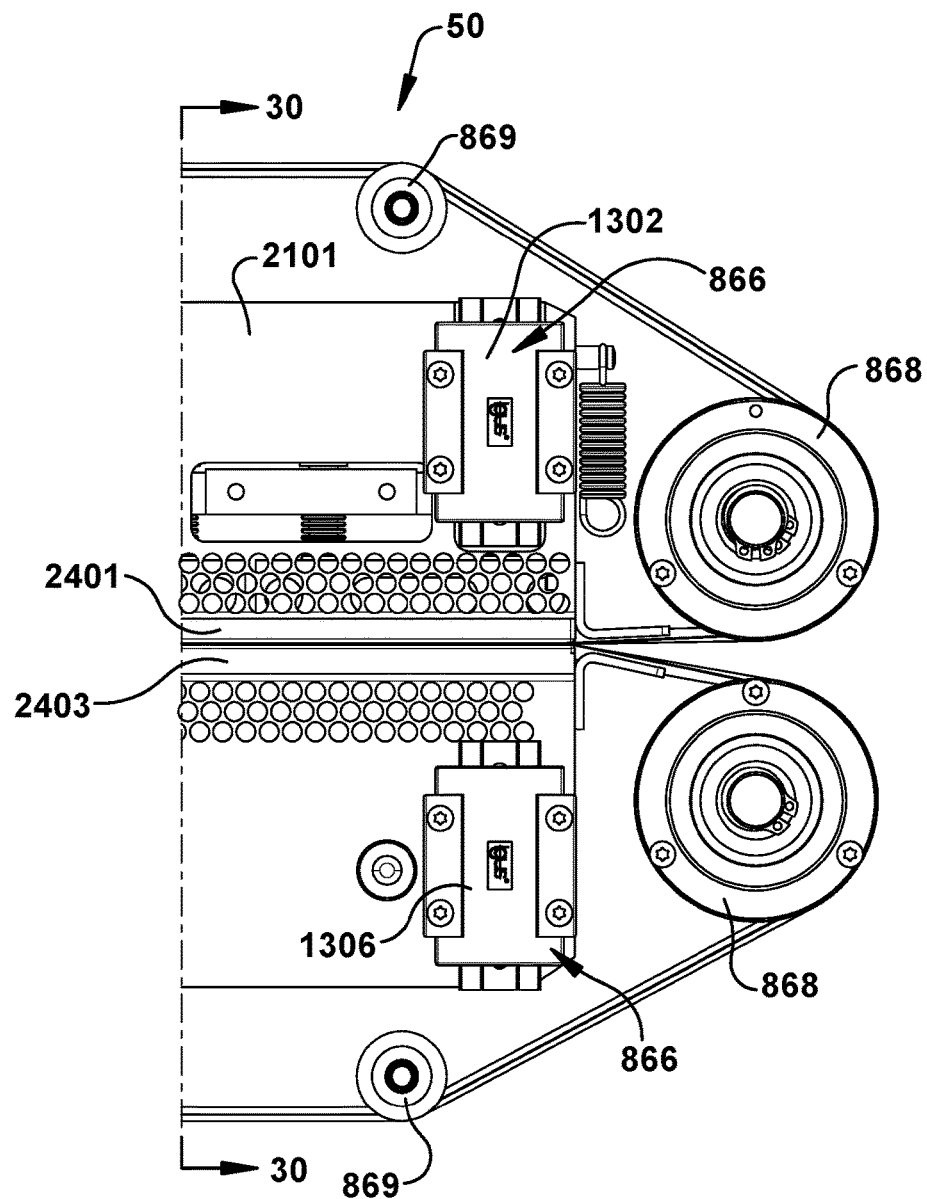
FIG. 28 is a partial rear view of the sealing and clamping assemblies shown in FIG. 16.

The heating sealing element positioning device 866 can take a wide variety of different forms. Referring to FIGS. 26 and 27, in the illustrated example the heat sealing element 865 is coupled to the upper support members 2101 and a lower support member 2103. The heat sealing element 865 is fixed to the lower support member 2103. However, the lower heat sealing element may be coupled to the lower support member 2103 in any manner. For example, the lower heat sealing element 865 may be coupled to the lower support member 2103 by a second biasing assembly. In the illustrated embodiment, the heat sealing element positioning device 866 (see FIG. 25) comprises two upper actuators 1300, 1302 (see FIG. 22) and two lower actuators 1304, 1306 (see FIG. 22). The two upper actuators 1300, 1302 (see FIG. 22) are each operably connected to the upper support member 2101 and a fixed component of the machine 50, such as the housing 1204. The two lower actuators 1304, 1306 are each operably connected to the lower support member 2103 and a fixed component of the machine 50, such as the housing 1204. The actuators 1300, 1302, 1304, 1306 are operable to move the upper and lower support members 2101, 2103 and coupled heat sealing element 865 relatively toward and away from one another. As such, the heating element 865 is positioned with respect to the path of travel of the web 10 such that the sealing belts 870 selectively engage and disengage the web 10.

Figure 29:
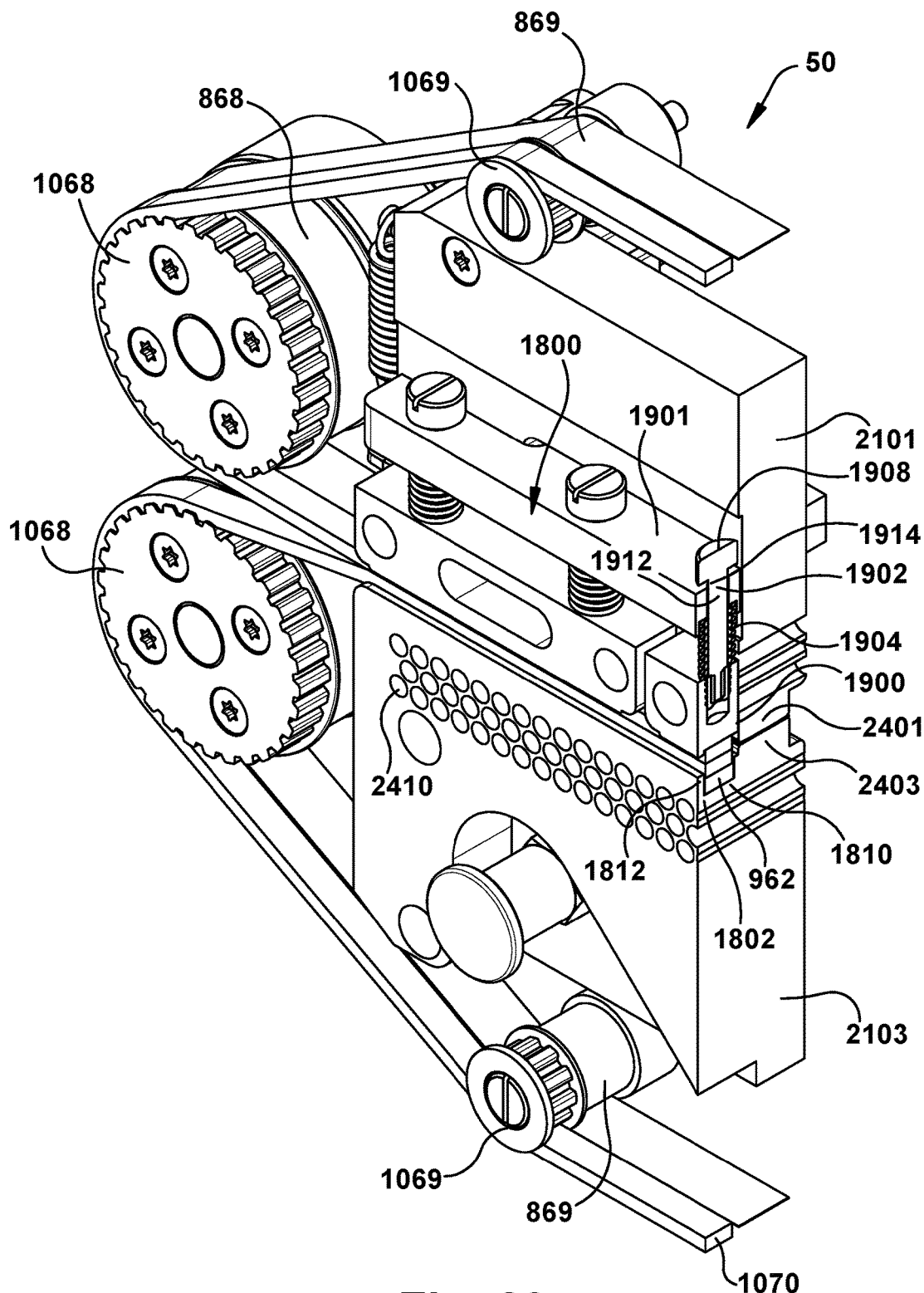
FIG. 29 is a sectioned perspective view with the section being taken as indicated by lines 24-24 in FIG. 28.
Figure 30:
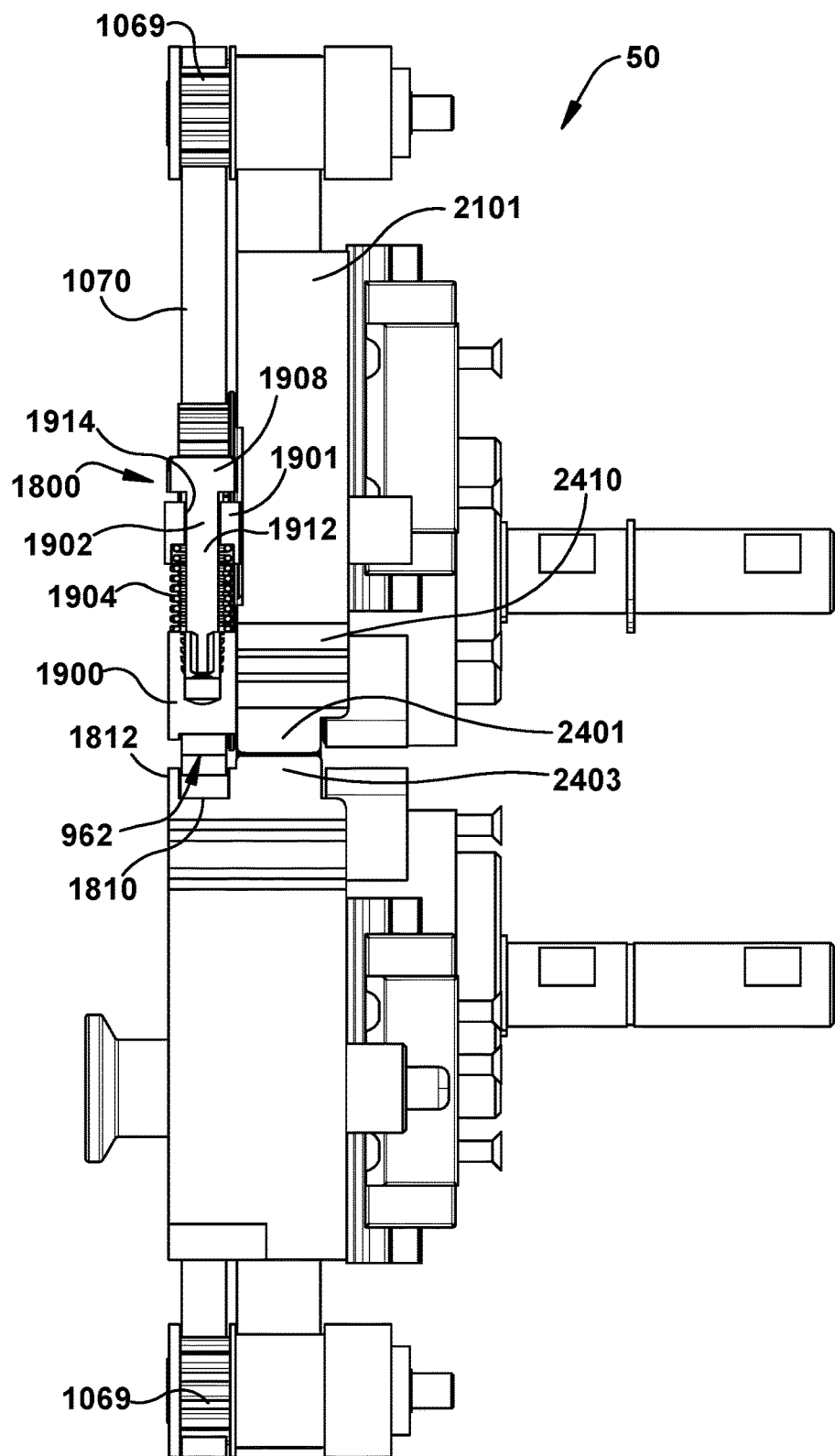
FIG. 30 is a sectional view taken along the plane indicated by lines 24-24 in FIG. 28.

Referring to FIGS. 29 and 30, the illustrated upper and lower support members 2101, 2103 include seal cooling portions 2401, 2403. The seal cooling portions 2401, 2403 engage the belts 870 and compress the material of the seal downstream of the sealing elements 864, 865. Heat of the seal is transferred through the belts 870 and into the seal cooling portions 2401, 2403 of the support members 2101, 2103 to cool the material of the seal. The illustrated upper and lower support members 2101, 2103 include optional holes 2410. The holes 2410 increase the surface area of the upper and lower support members 2101, 2103 to increase their effectiveness as heat sinks and reduce their weight. The upper and lower support members 2101, 2103 can be made from a wide variety of different materials. In an exemplary embodiment, the support members are made from a thermally conductive material such as aluminum or copper.

Figure 23:
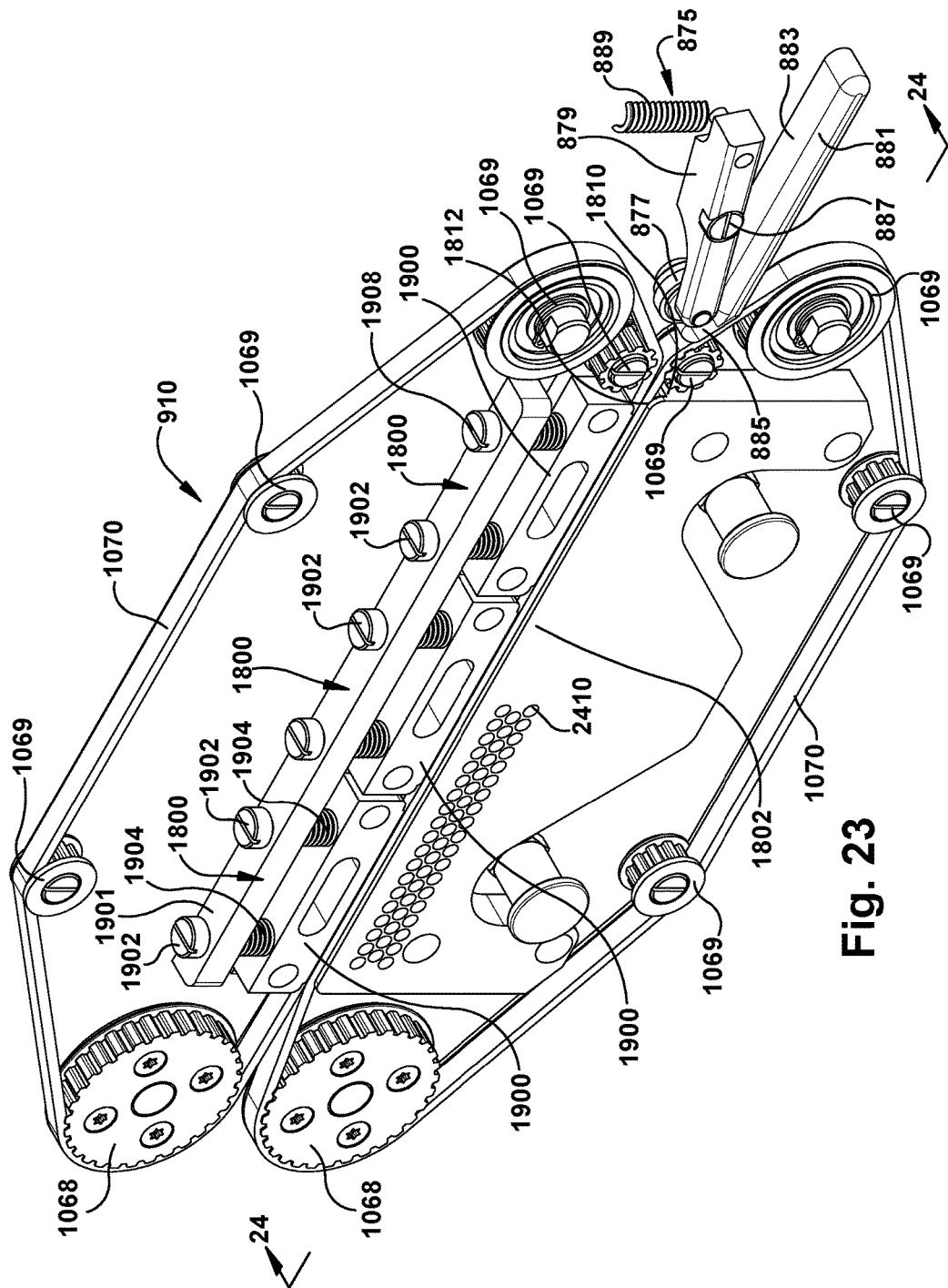
FIG. 23 is a perspective view of a clamping assembly of the air cushion inflation machine shown in FIG. 14.
Figure 24:
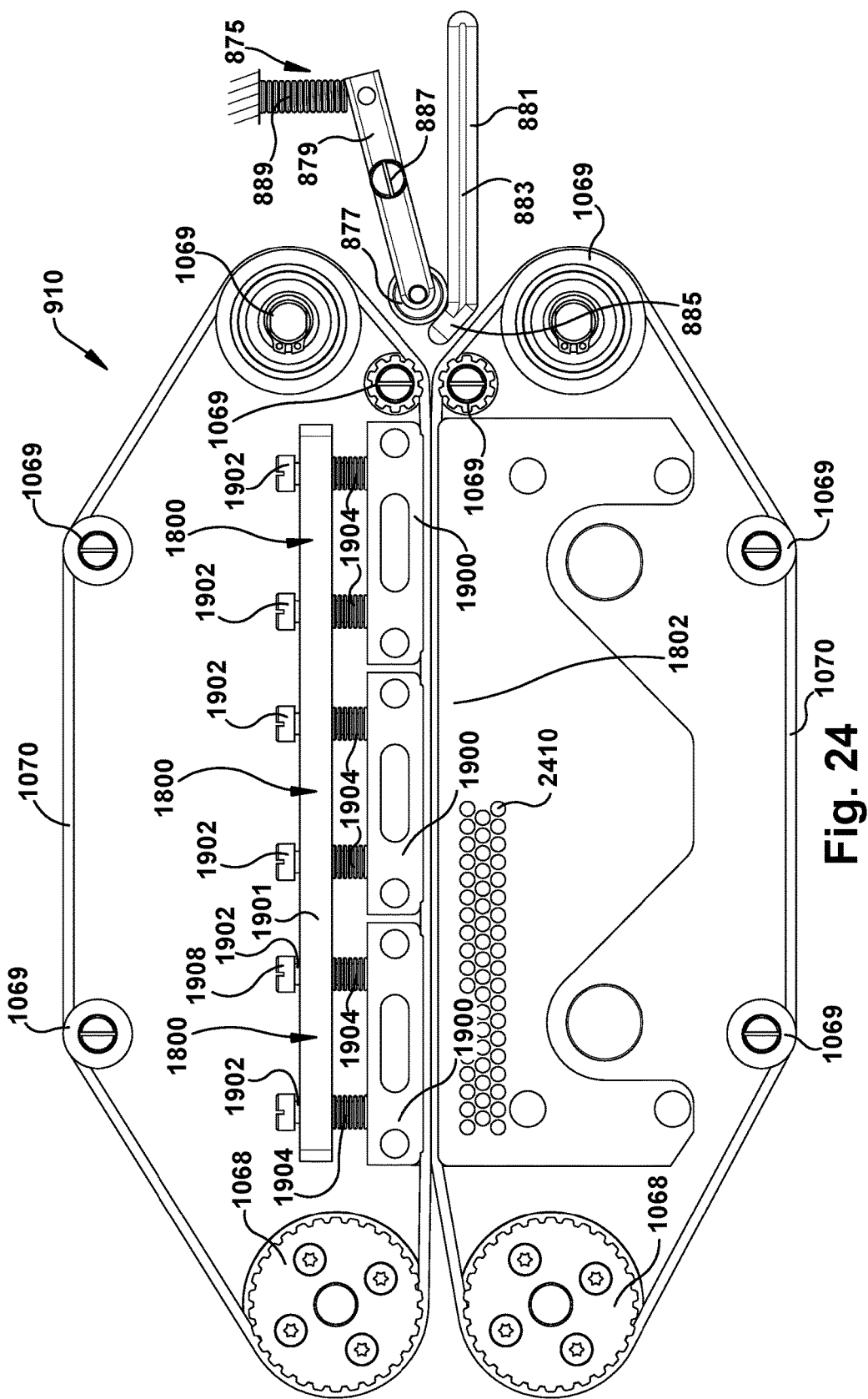
FIG. 24 is a view taken as indicated by lines 19-19 in FIG. 23.
Figure 25:
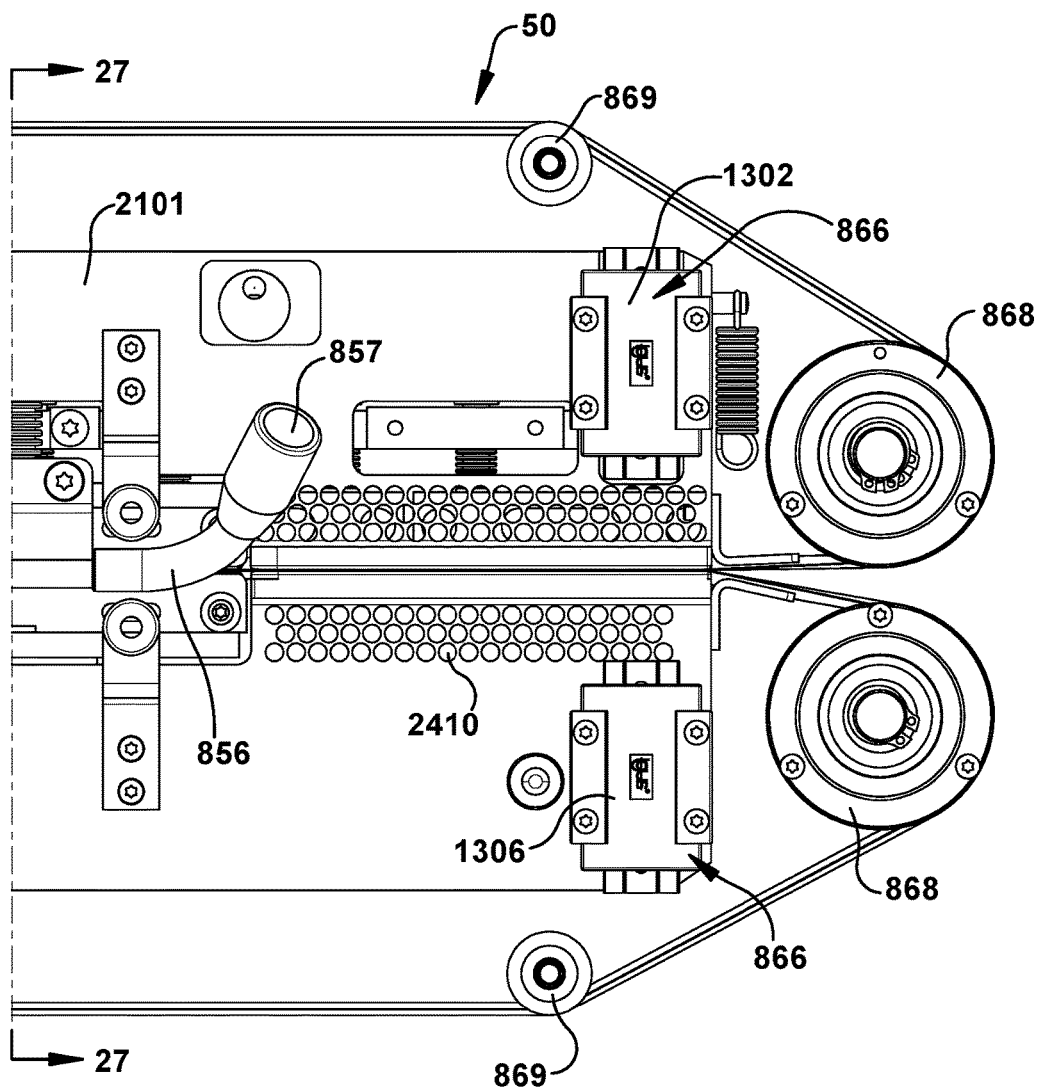
FIG. 25 is a partial rear view of the sealing and clamping assemblies shown in FIG. 16.

The clamping arrangement 910 is positioned to pinch the top and bottom layers 14, 16 of the preformed web together. The clamping arrangement 910 can take a wide variety of different forms. Referring to FIGS. 23 and 24, the clamping arrangement 910 includes drive rollers 1068, idler rollers 1069, spring loaded clamping assemblies 1800, a clamping portion 1802 of the lower support member 2103, and a pair of drive belts 1070. The illustrated clamping portion 1802 of the lower support member 2103 includes a support surface 1810 or groove and a lip 1812. The width of the support surface 1810 or groove corresponds to the width of the belts 1070. The support surface 1810 supports the lower belt 1070 and the lip 1812 retains the belt or the support surface.

Referring to FIGS. 29 and 30, each spring loaded clamping assembly 1800 includes a clamping member 1900, a shaft member 1902, and a spring 1904 disposed around the shaft member. The clamping members 1900, shaft members 1902, and springs are coupled to a support member 1901. Each clamping member 1900 is biased toward the clamping portion 1802 of the lower support portion 2103 by the springs 1902. A head 1908 of each shaft member 1902 is disposed on the support member 1901 with a shaft portion 1912 of the shaft member extending through a hole 1914 in the support member 1901. The shaft member 1902 is free to move axially in the counterbore. An end of each shaft portion 1912 is connected to a clamping member 1900. The springs 1904 push the clamping members 1900 downward. The biasing assemblies 1800 ensure that the belts 1070 securely engage the web 10 whenever the belts are engaged.

Each belt 1070 is disposed around its respective drive rollers 1068 and idler rollers 1069. Each belt 1070 is driven by its respective drive roller 1068, which is attached to a drive roller 868. As such, the sealing belts 870 and the pinching belts 1070 are driven in sync. The belts 1070 engage one another, such that the belts 1070 pull the web 10 and pinch the web as the web moves through the heat sealing element 865.

Figure 33:
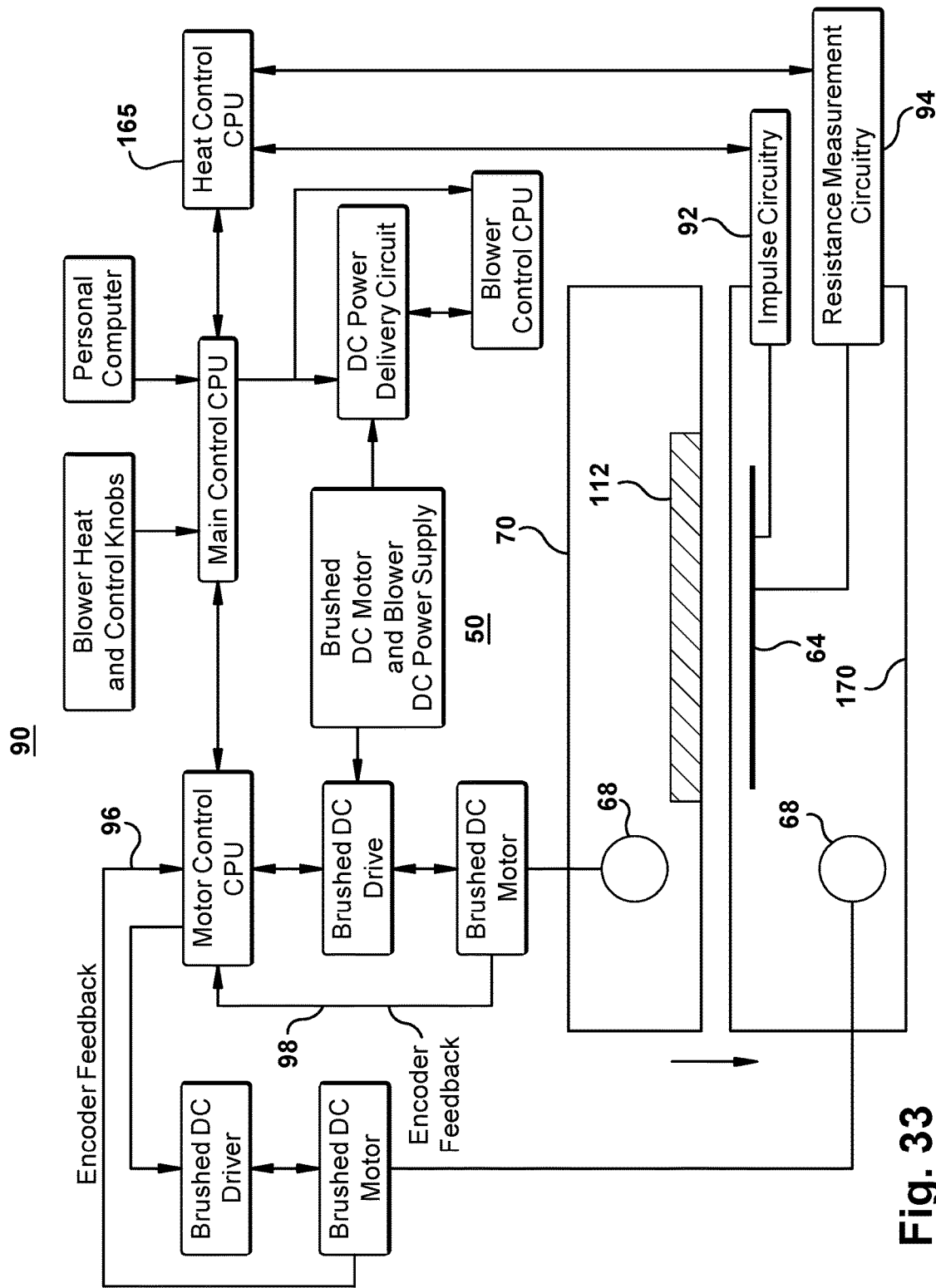
FIG. 33 is a component diagram of an air cushion inflation machine.
Figure 34:
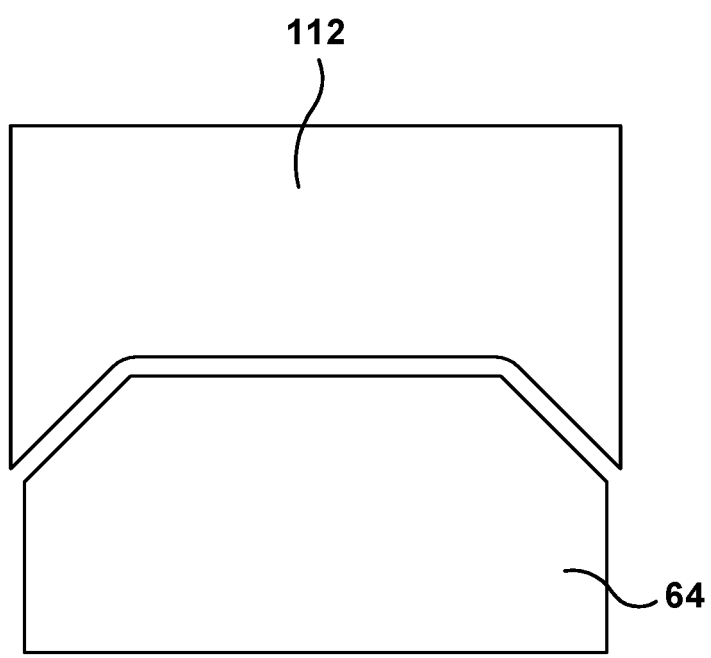
FIG. 34 is a sectional view of the heated sealing element and the compliant material.
Figure 35:
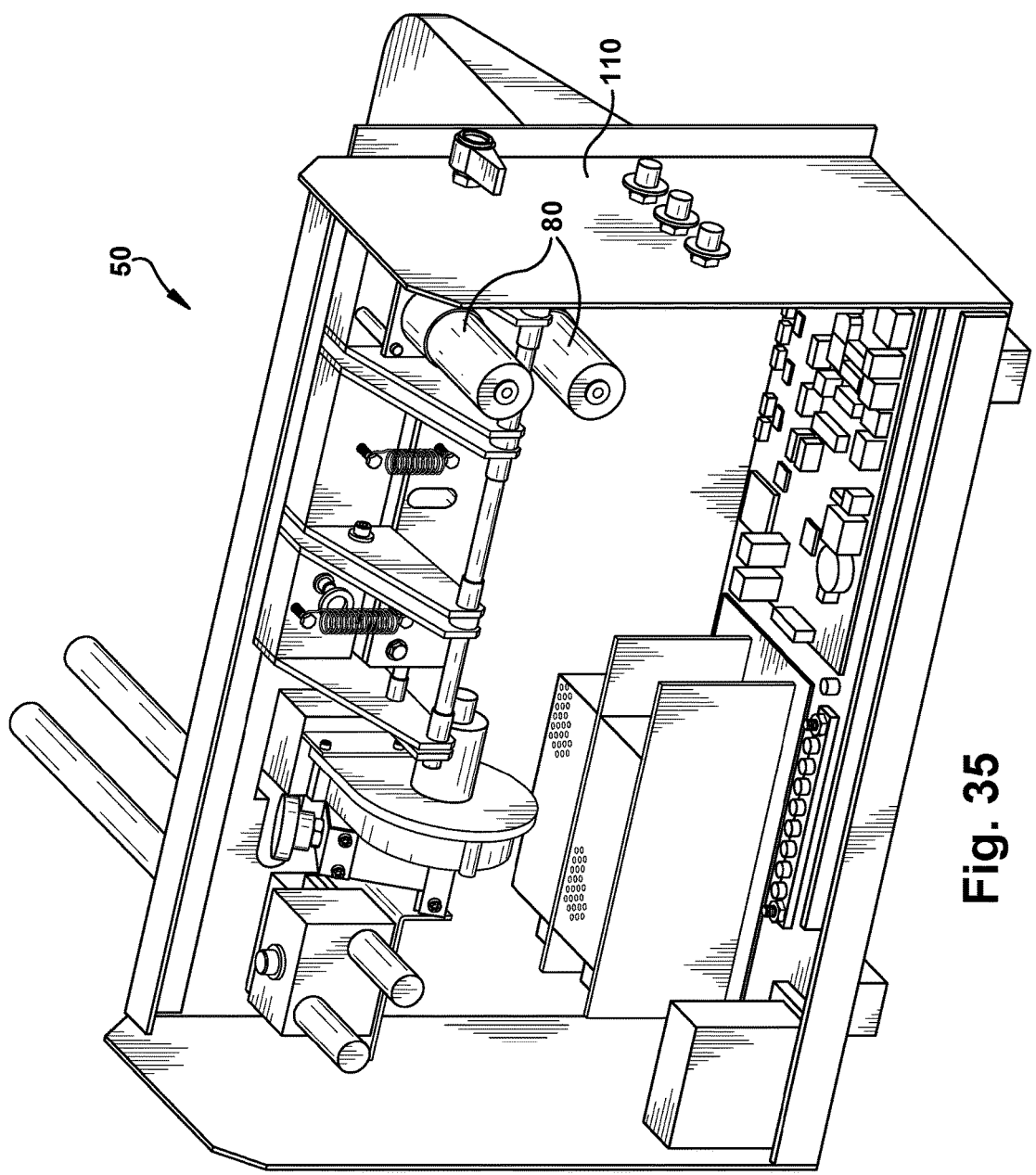
FIG. 35 is a perspective view showing an inside of the air cushion inflation machine.
Figure 36:
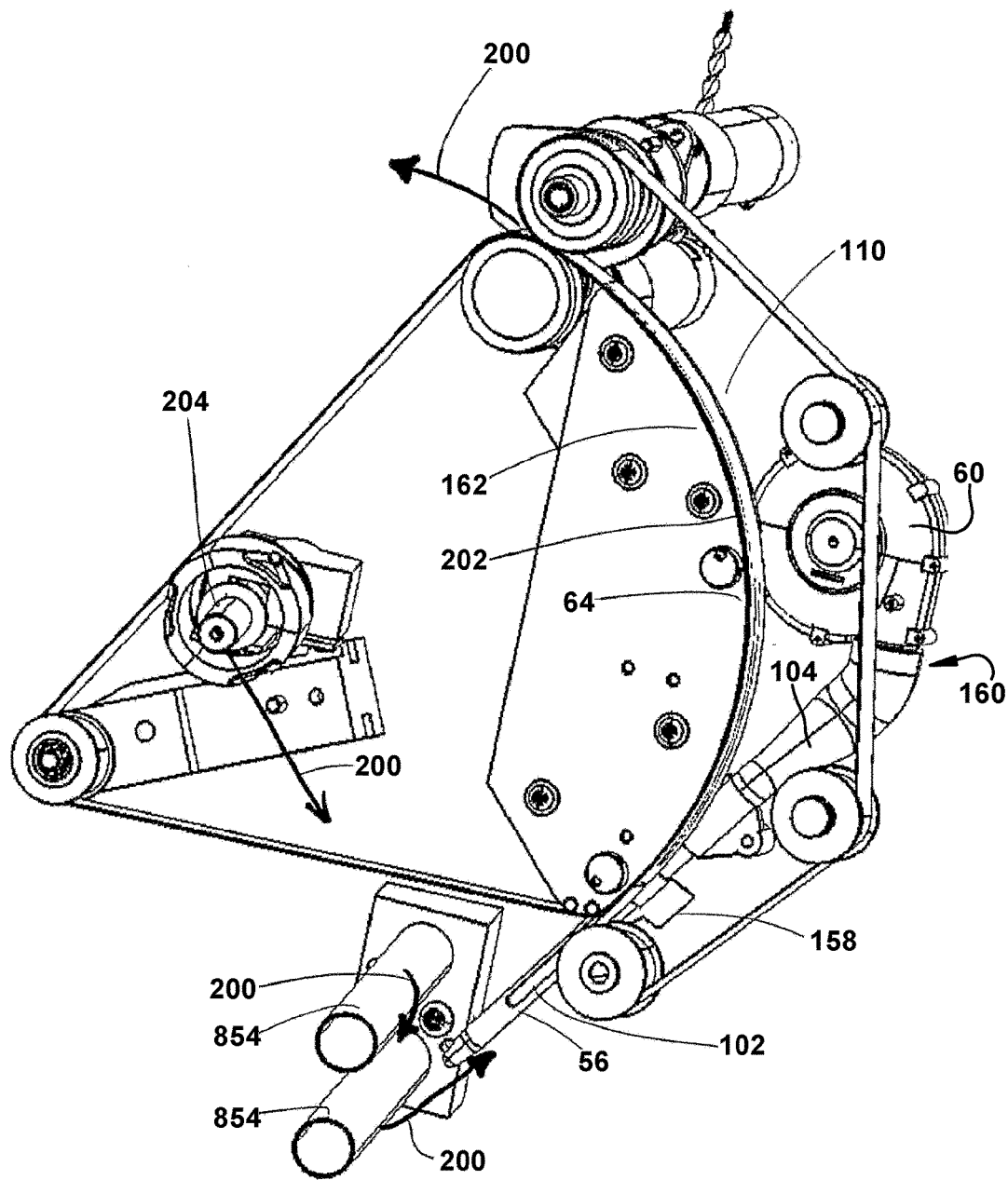
FIG. 36 is a perspective view of another exemplary embodiment of an air cushion inflation system showing a curved belt surface.
Figure 37:
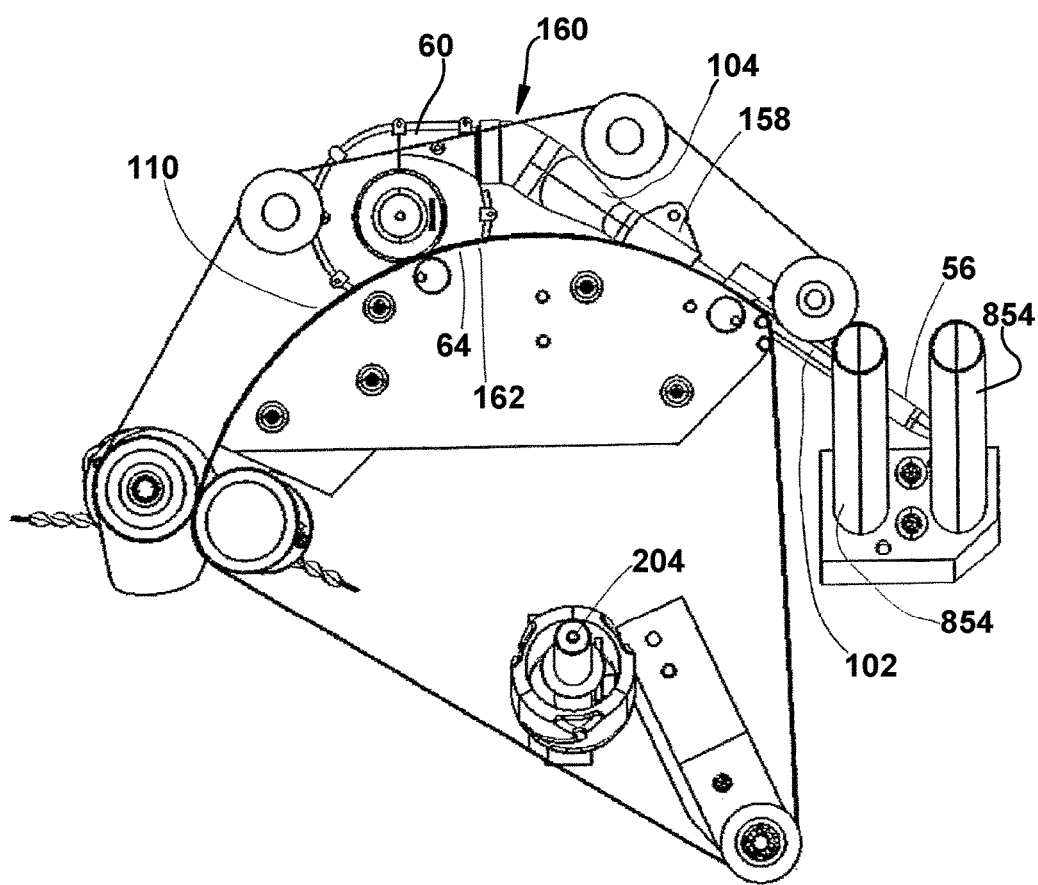
FIG. 37 is a perspective view of a part of an air cushion inflation system showing a curved belt surface.
Figure 38:
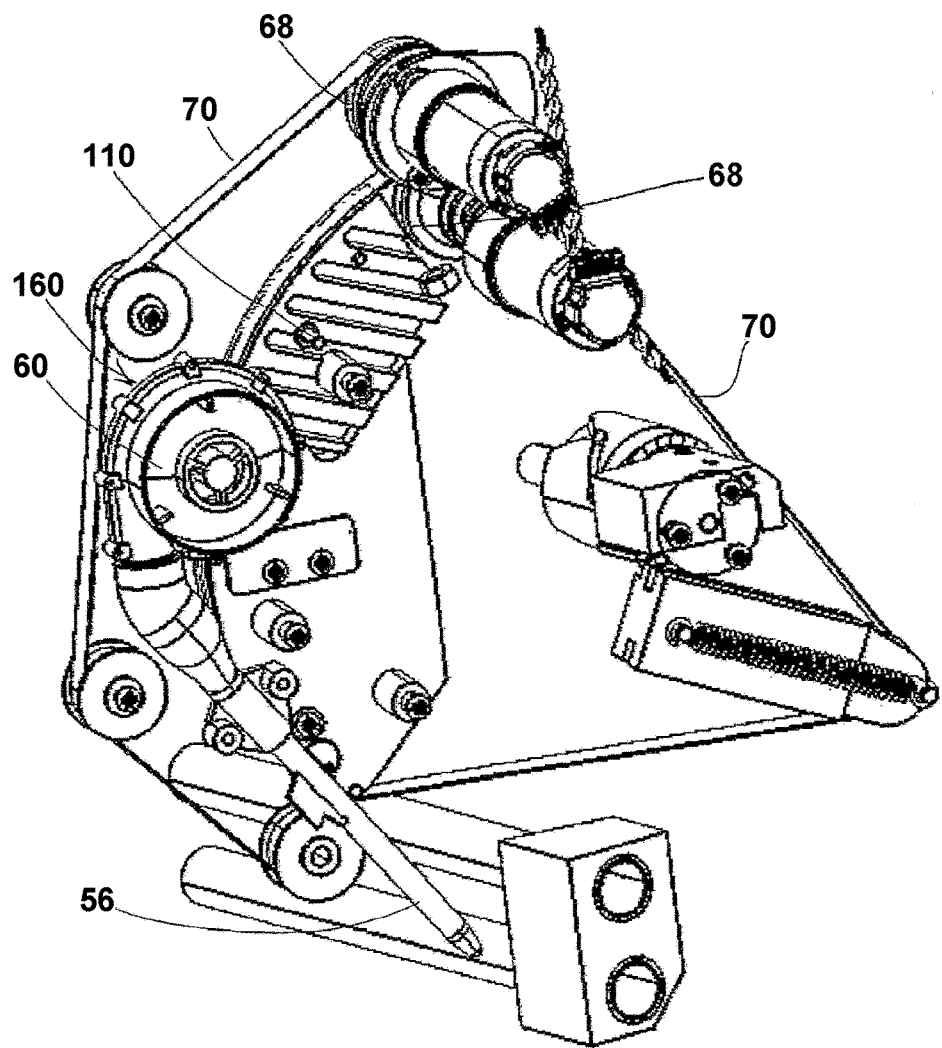
FIG. 38 is a perspective view of a part of an air cushion inflation system showing a curved belt surface.
Figure 39:
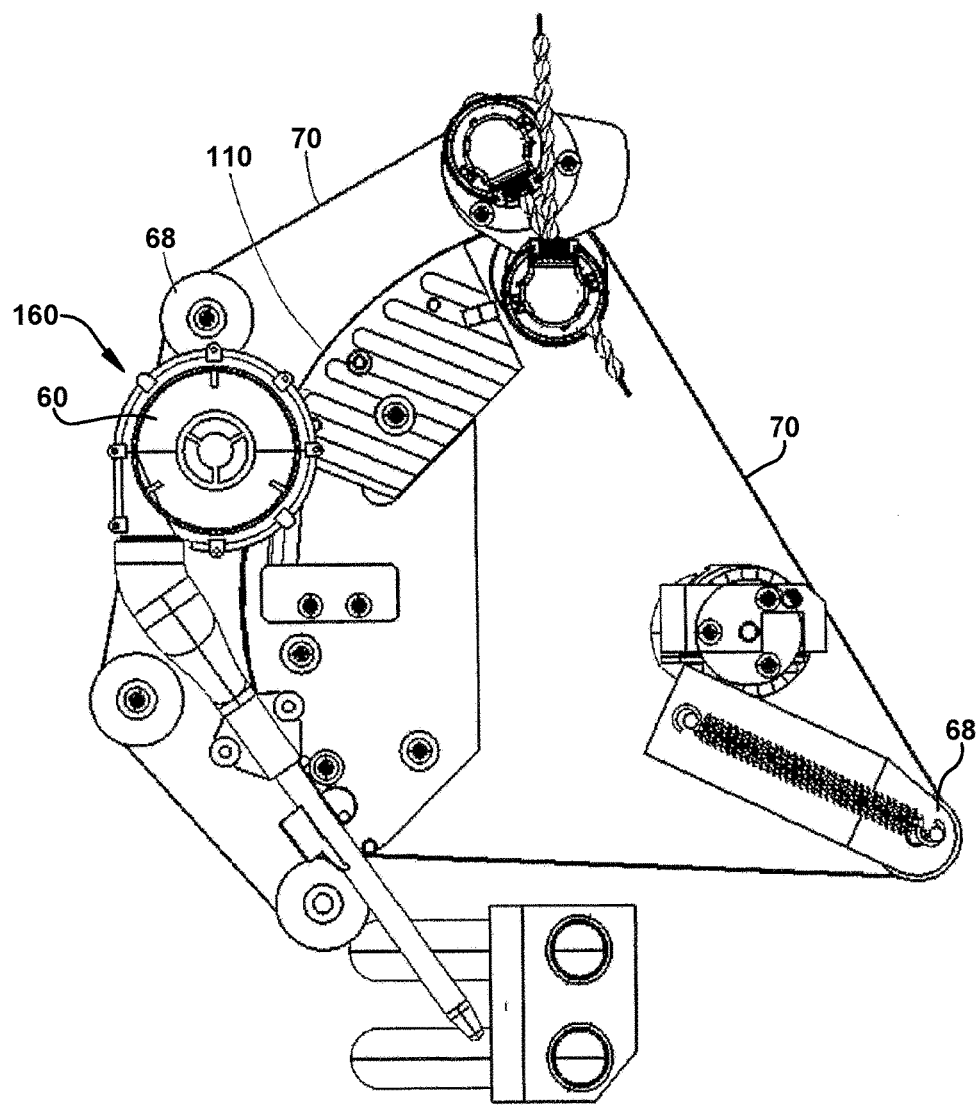
FIG. 39 is a perspective view of a part of an air cushion inflation system showing a curved belt surface and the blower assembly.

FIG. 33 illustrates a component diagram of a system 90 including the machine 50. The system 90 includes the rollers 68, belts 70, the heated sealing element 64 and the compliant material 112. Impulse circuitry 92 receives a pulse width modulation (PWM) signal for driving the heated sealing element 64. A Resistance Measurement Circuitry 94 measures current draw from a known voltage. Therefore, the Resistance Measurement Circuitry 94 acts as a current sensor (e.g., feedback resistance) for determining temperature based on a linear relationship with resistance. In one exemplary embodiment, the temperature of the DC powered heat sealing element 64 is repeatedly calculated at very short time intervals. For example, the temperature of the DC powered heat sealing element may be calculated a less than 10 ms, less than 5 ms, less than or equal to 2 ms, or less than or equal to 1 ms. It is contemplated that the system 90 operates at about 281 Hz. If the system operates at about 281 Hz, the heated sealing element 64 is monitored between every about 2 ms and about 10 ms (e.g., in one embodiment about every 3.56 ms) instead of about every 20 ms if the system is operated at 50 Hz. Furthermore, although brushed motors are included on the illustration, brushless motors are also contemplated. Lines 96, 98 represent the encoder feedback from the respective rollers 68 driven by the motors. FIG. 34 illustrates a cross-sectional view of the compliant material 112 and the heated sealing element (e.g., wire) 64. FIG. 35 illustrates the machine 50 with the encoders 81. In this embodiment, the encoders 81 are in the drive train of the motors 100.

FIGS. 36-39 schematically illustrate another exemplary embodiment of a machine 50 for converting a preformed web to the inflated cushions 12 (see FIG. 2A). The machine 50 may take a wide variety of different forms and the inflation, sealing and separation arrangements described below may be in the order/positions described or in any other order/position that facilitates inflation of the web 10, sealing of the web, and separation of the web from the machine 50. In the illustrated example, the machine 50 includes an inflation arrangement 160, a sealing arrangement 162, a clamping arrangement 110, a web separation device 158, and arms 854 around which the web 10 is fed. A spool mount 204 (e.g., spindle) receives a spool including the web material 10.

The inflation arrangement 160 can take a wide variety of different forms. Any arrangement capable of providing air under increased pressure (above atmosphere) to the pouches 26 can be used. In the illustrated embodiment, the inflation arrangement 160 includes a hollow, longitudinally extending guide pin 56 and a blower 60. A web is routed along a path indicated by arrows 200 from a supply and the pocket 23 is placed around the guide pin 56, such that the guide pin 56 is between the inflation side edge 20 and the transverse seals 22. The guide pin 56 aligns the web as it is pulled through the machine 50. The guide pin 56 includes an inflation opening 102 that is fluidly connected to the blower 60 by a conduit 104. The blower 60 inflates the web pouches 26 as the web moves past the inflation opening 102.

Belts 70 are provided around respective drive rollers 68. Each belt 70 is driven by its respective drive roller 68. The speed of the drive rollers 68 and belts 70 are controlled by a belt speed control 67. The belts 70 are in close proximity or engage one another, and form a curved surface 202 such that the belts 70 pull the web 10 proximate to the heat sealing element 64. The seal 42 (see FIG. 2) is formed as the web passes proximate to the heated sealing elements 64.

In this embodiment, the curved surface 202 optionally eliminates the need for the compliant material used in the embodiments discussed above. For example, the curved surface 202 results in the two layers 14, 16 of the web 10 being more taut as the filled bags pass between the belts 70 and move toward the inside of the curve. The relatively more taut layers 14, 16 of the web 10 result in a better seal between the two layers 14, 16 of the web 10. In another exemplary embodiment, one or both of the belts 70 are made from a compliant material or one or both of the belts are backed by a compliant material in addition to having the curved path. As the web passes between the heating element and compliant material, imperfections in the web are smoothed by the compliant material and the layers of the web are sealed by the heating element. The compliant or softer material spreads the pressure applied to the sealed area more evenly, which results in a more uniform seal.

Figure 40:
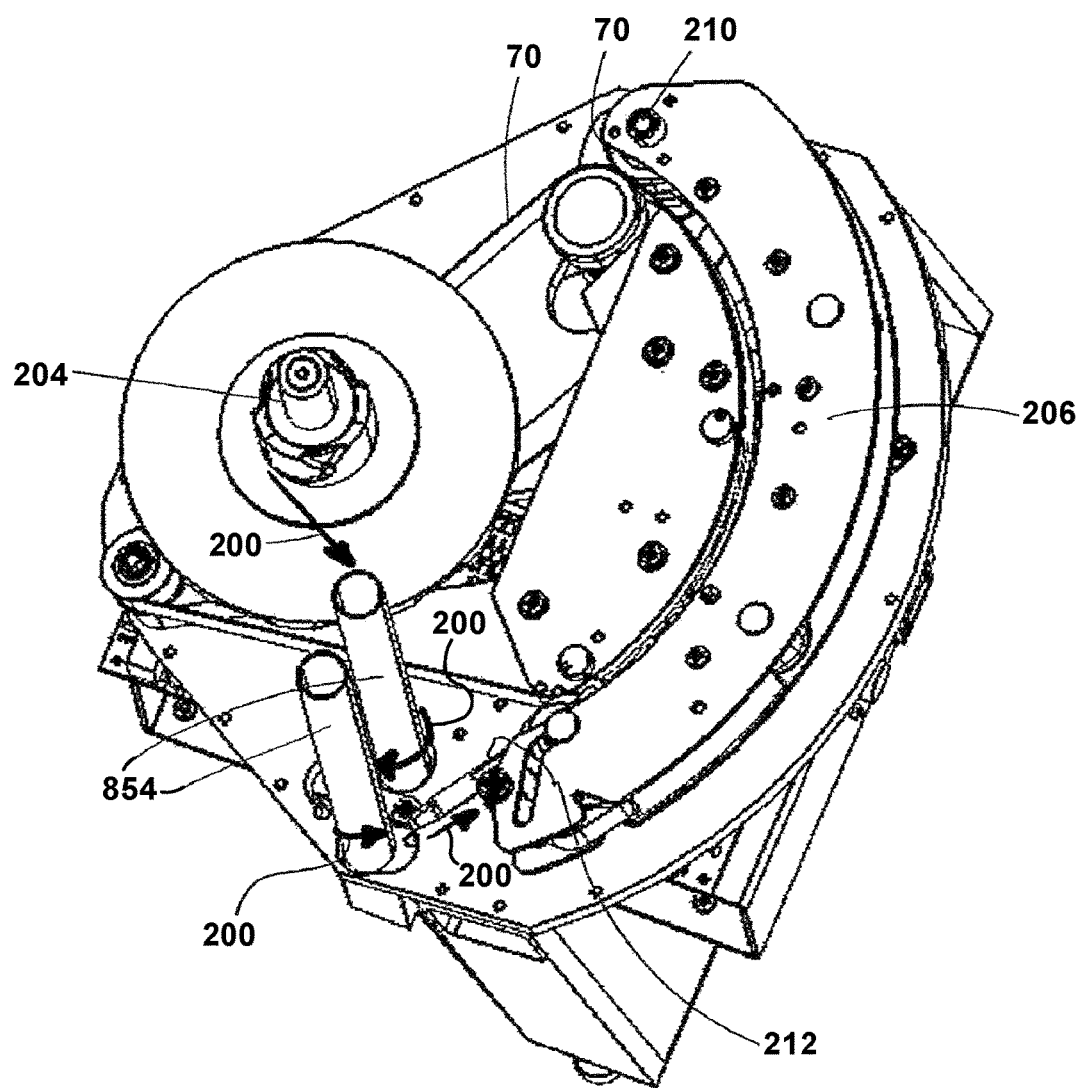
FIG. 40 is a perspective view of a part of an air cushion inflation system showing a curved belt surface.

With reference to FIG. 40, the spindle 204 for the spool of web material is illustrated on the machine 50. A cover 206 is illustrated over the belt 70. The cover 206 pivots around a point 210 to open for loading the belt. The web follows the path of arrows 200 and encounters an inflection point 212 when travelling through the machine 50.

Figure 41:
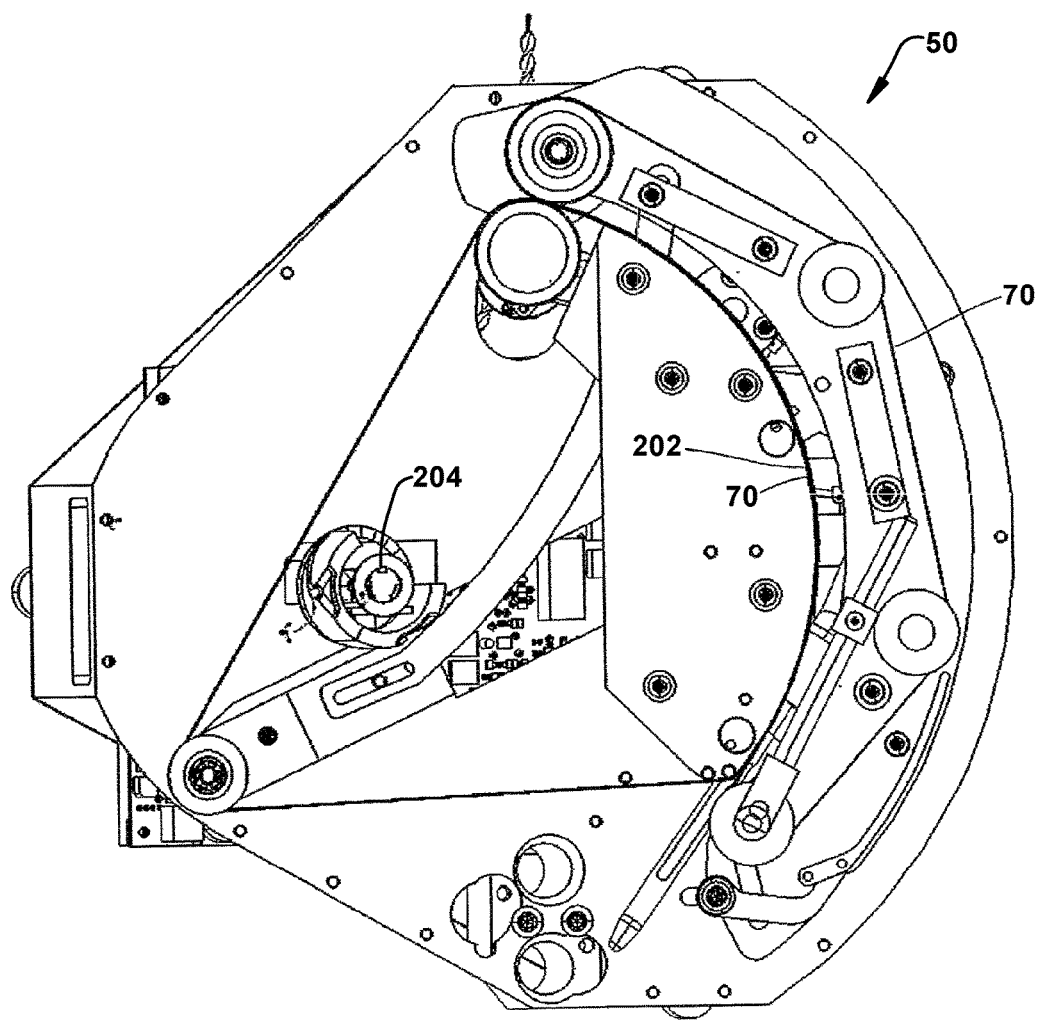
FIG. 41 is a view of a part of an air cushion inflation system showing a curved belt surface.
Figure 42:
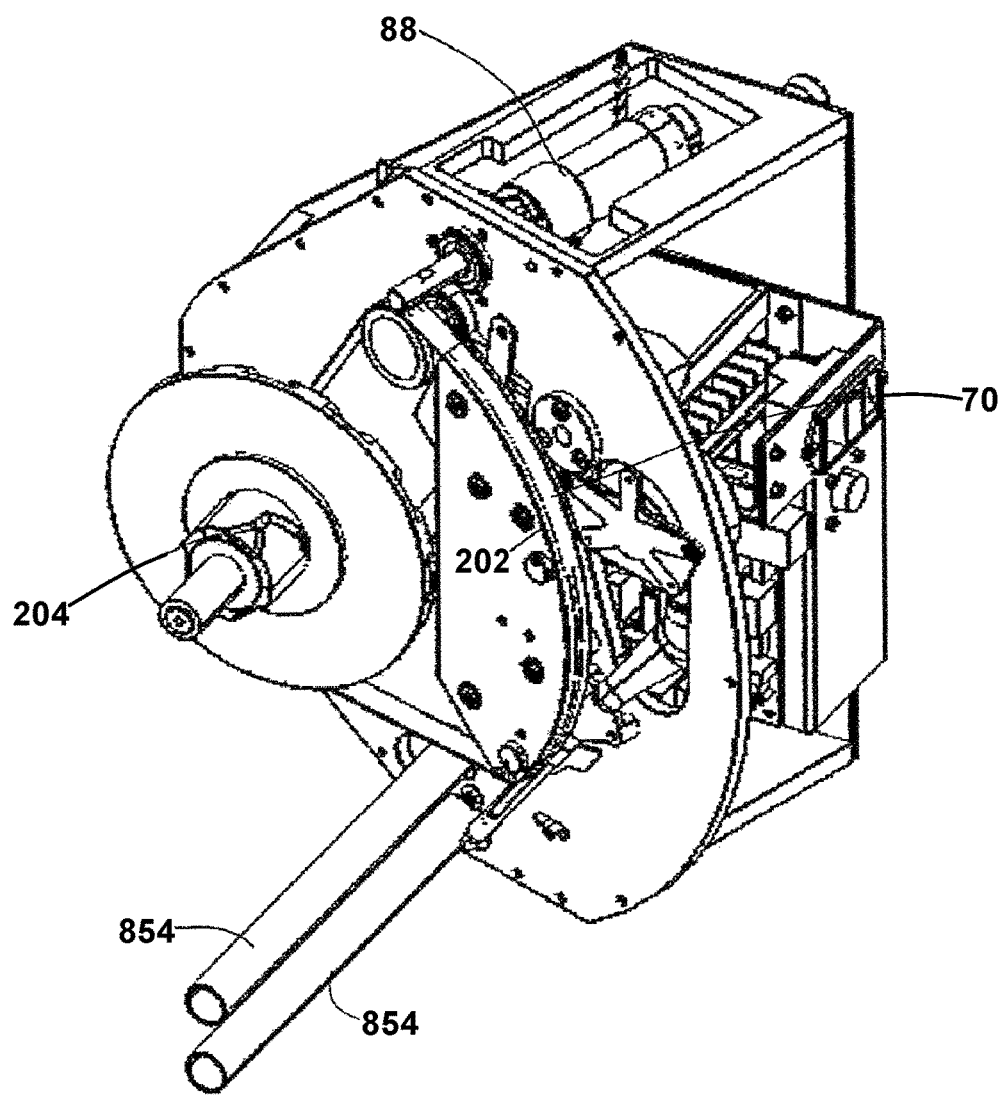
FIG. 42 is a perspective view of a part of an air cushion inflation system showing a curved belt surface.
Figure 43:
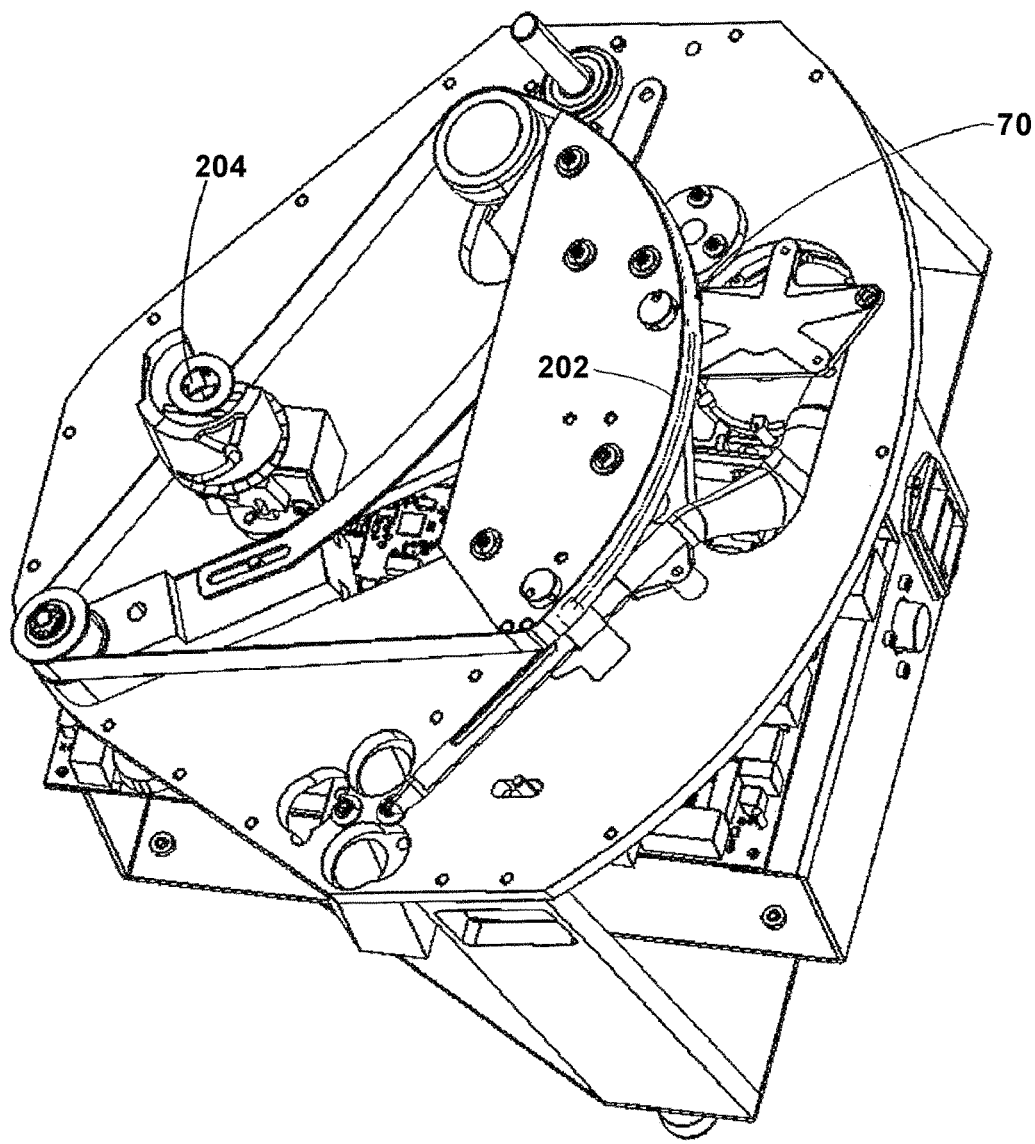
FIG. 43 is a perspective view of a part of an air cushion inflation system showing a curved belt surface.
Figure 44:
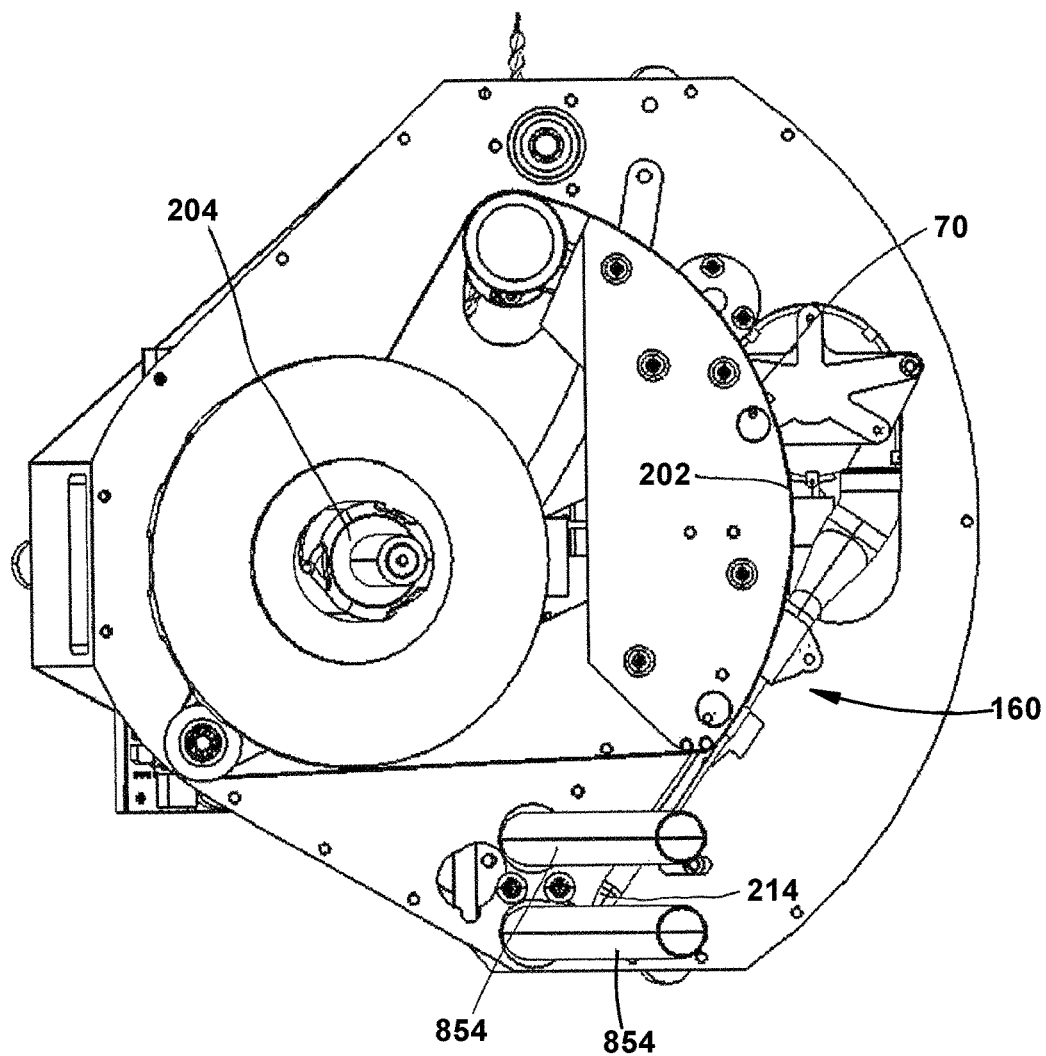
FIG. 44 is a perspective view of a part of an air cushion inflation system showing a curved belt surface.
Figure 45:
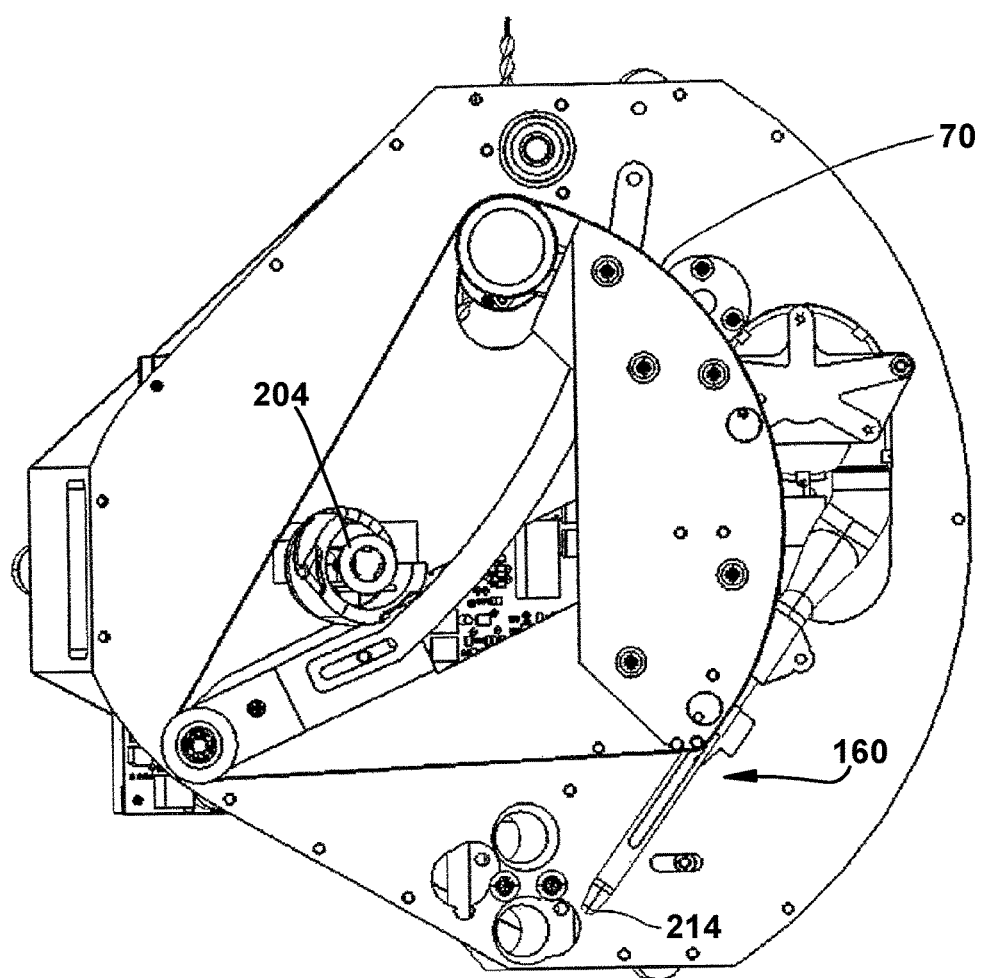
FIG. 45 is a perspective view of a part of an air cushion inflation system showing a curved belt surface.
Figure 46:
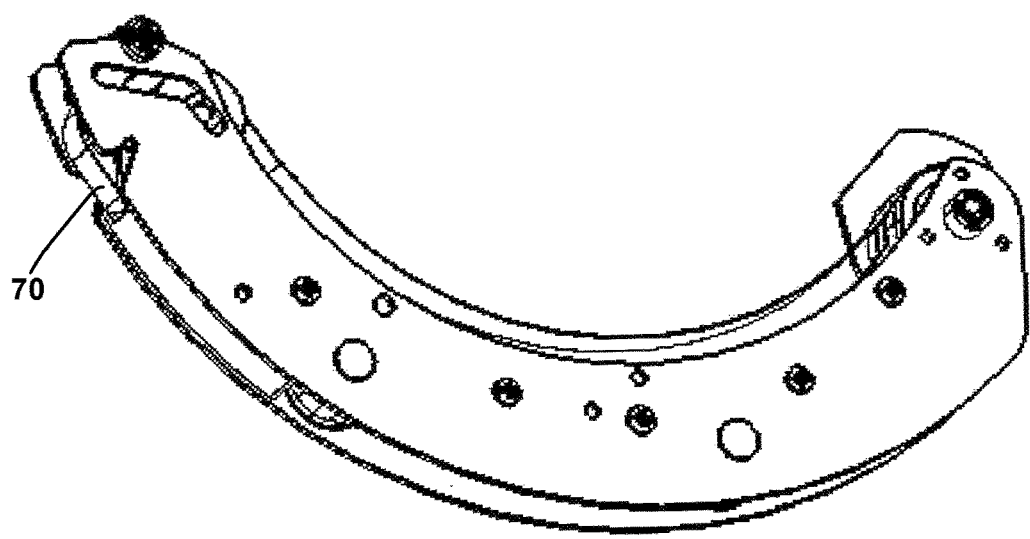
FIG. 46 is a perspective view of a belt assembly including a curved belt surface.
Figure 47:
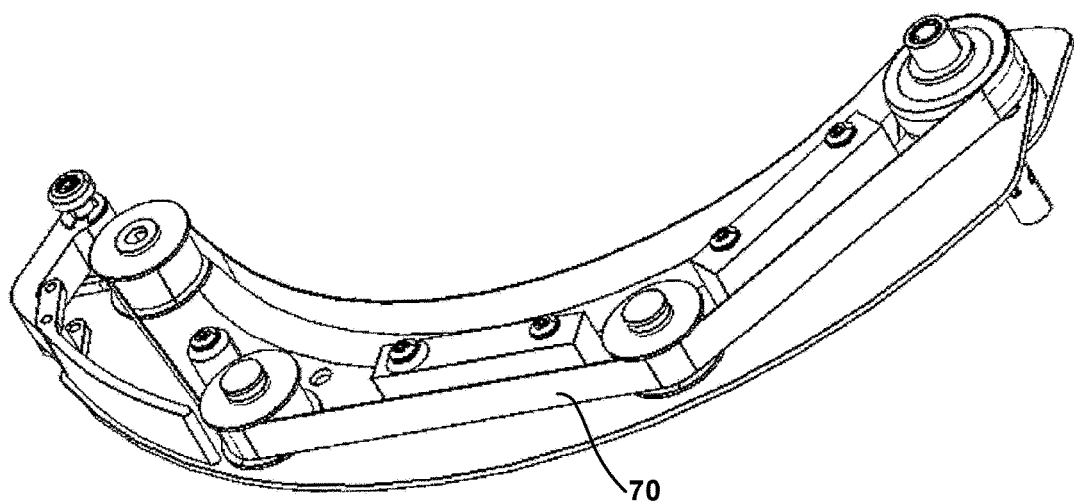
FIG. 47 is a perspective view of a belt assembly including a curved belt surface.
Figure 48:
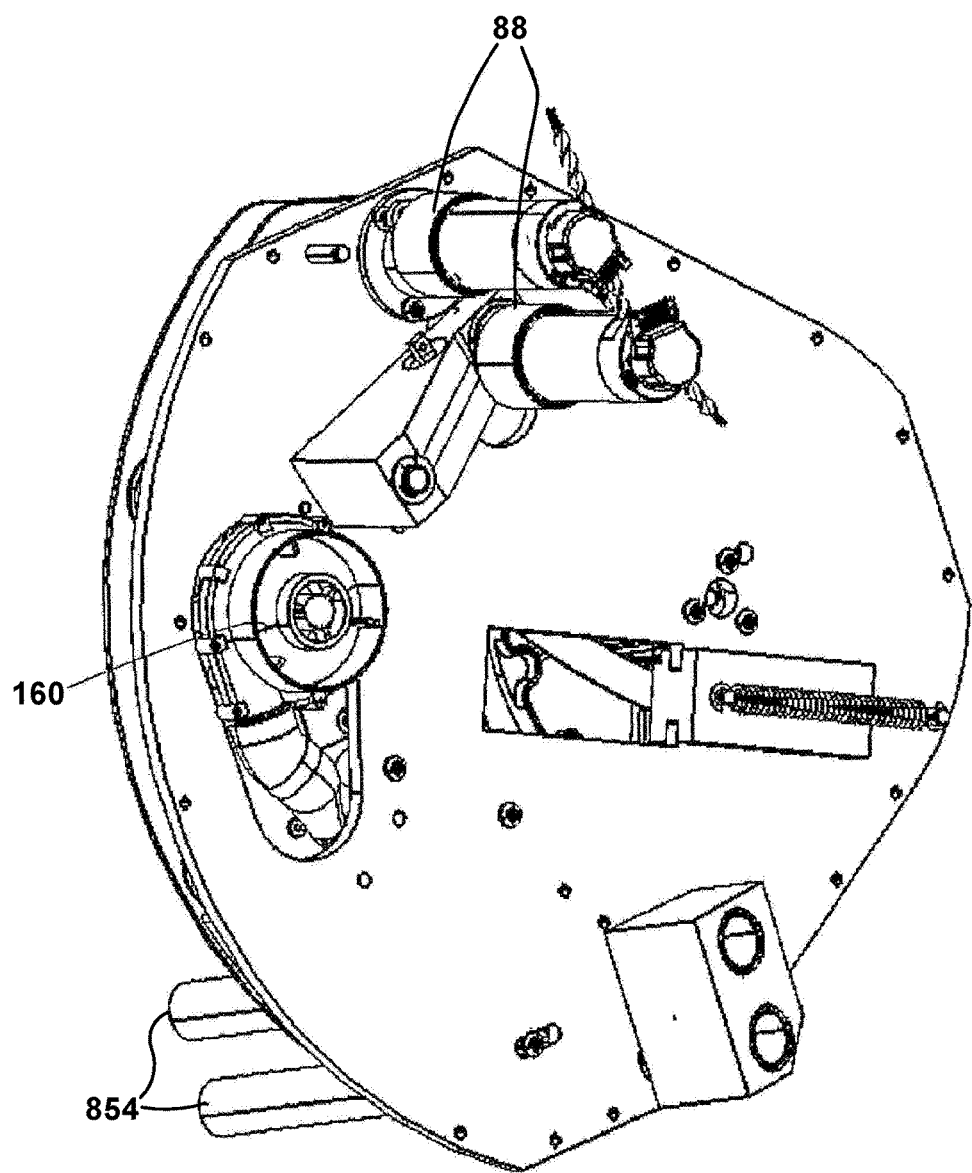
FIG. 48 is a perspective view of a part of an air cushion inflation system showing a blower system.
Figure 49:
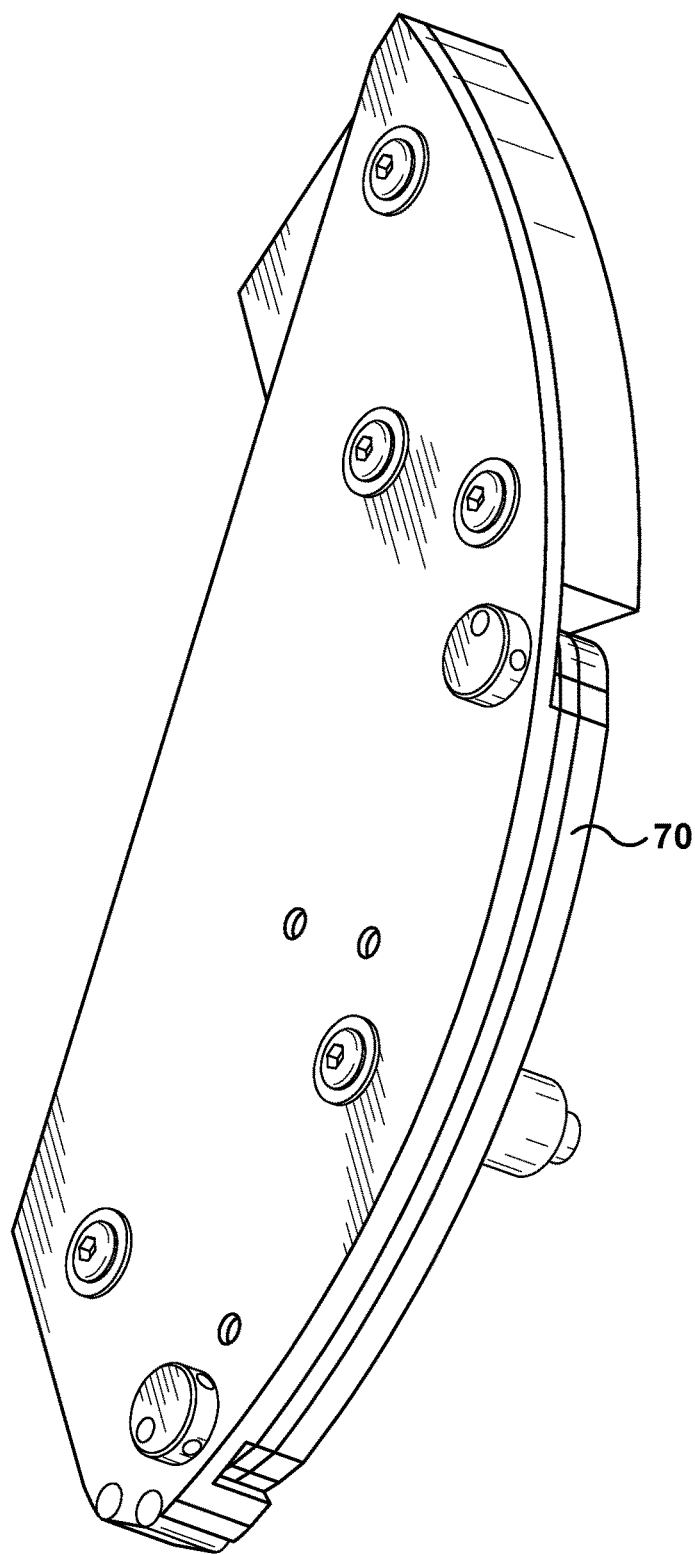
FIG. 49 is a perspective view of a belt assembly including a curved belt surface.
Figure 50:
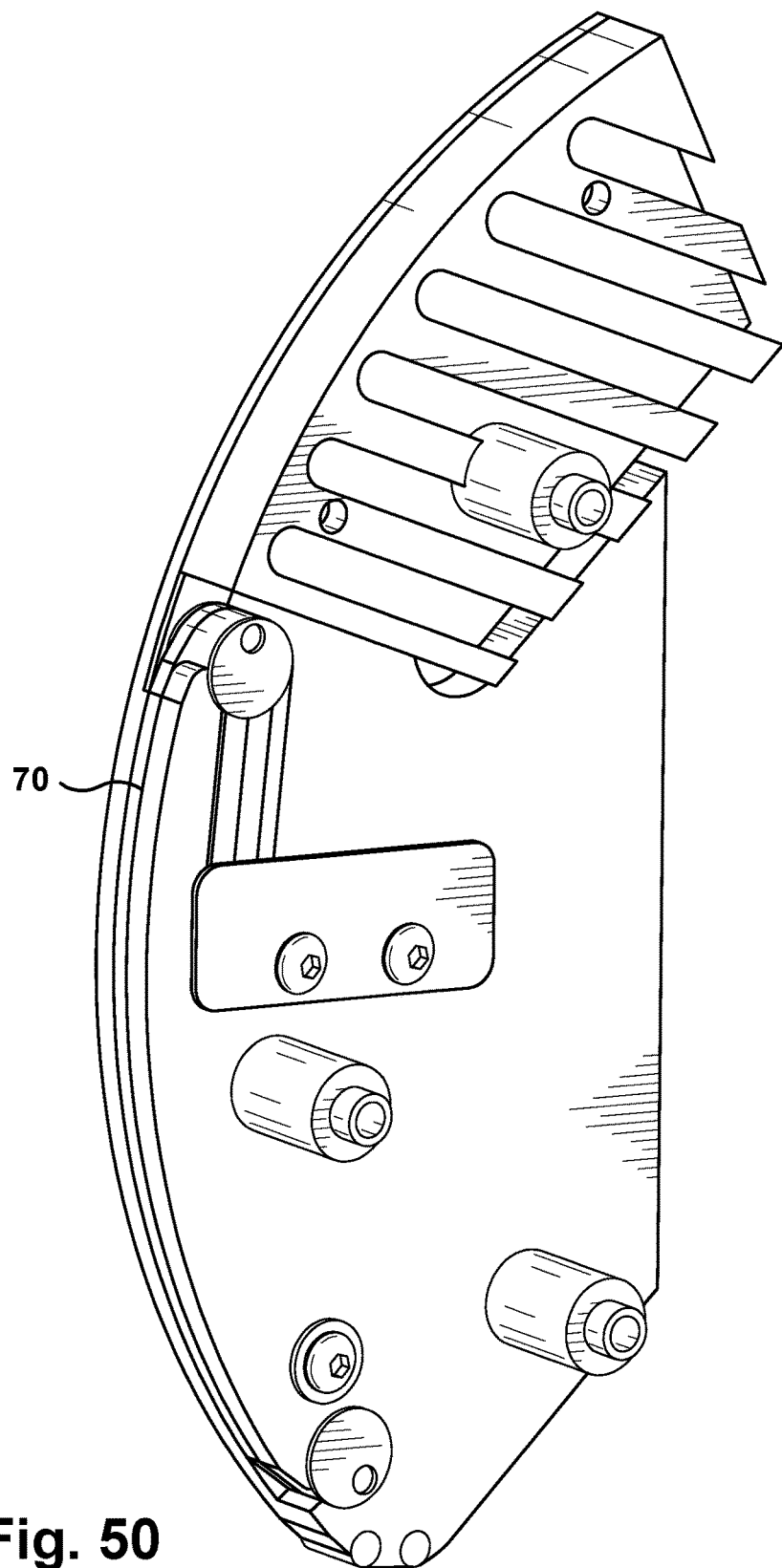
FIG. 50 is a perspective view of a belt assembly including a curved belt surface.

With reference to FIG. 41, the spindle 204 for the spool of web material is illustrated on the machine 50. The cover 206 (see FIG. 40) has been removed in FIG. 41 so the belt 70 is visible. FIG. 42 illustrates another view of the machine 50 with one of the belt assemblies removed. The belt 70 that remains is illustrated showing the curved path 202. The motor 88 and the spindle 204 are also illustrated. FIG. 43 illustrates another view of the machine 50 showing the spindle 204. FIGS. 44 and 45 illustrate another view of the machine 50. In FIG. 45, the arms 854 are not illustrated so that a nozzle 214 of the inflation arrangement 160 may be seen. FIG. 46 illustrates one of the belt assemblies including the belt 70 including the cover 206. FIG. 47 illustrates the belt assembly of FIG. 46 with one of the covers removed to show the belt 70. FIG. 48 illustrates another view of the machine 50 showing the blower 60, a pulley tensioner 216, and the belt motors 88. FIGS. 49 and 50 illustrate different views of the belt assembly showing the curved surface 202.

Figure 51:
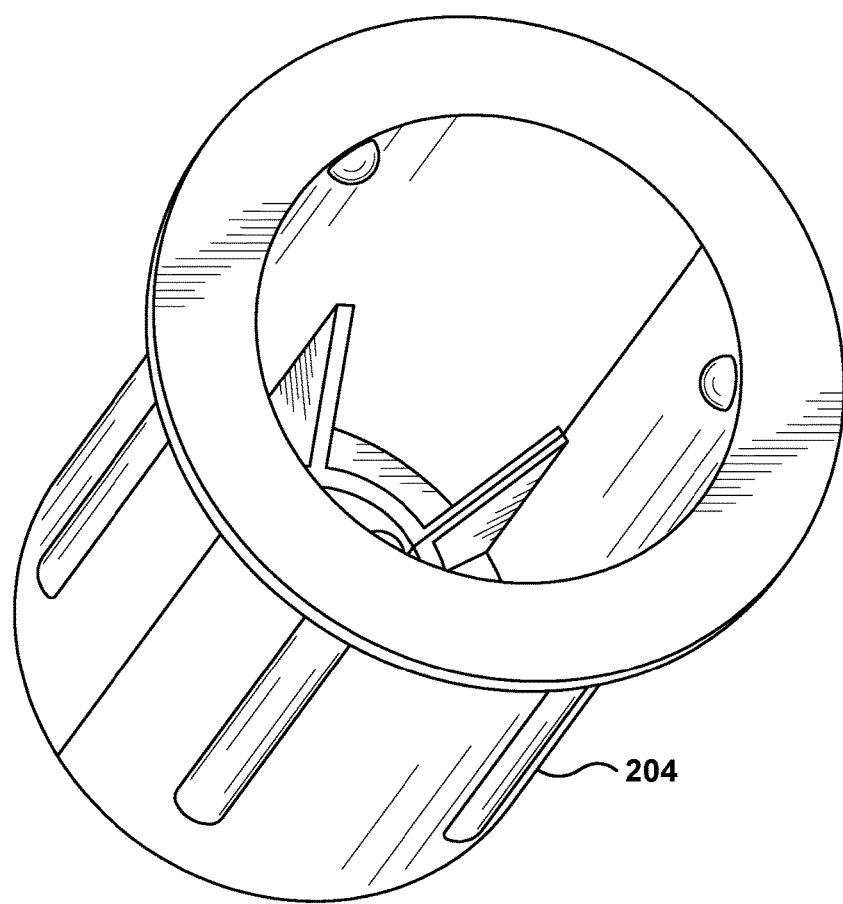
FIG. 51 is a perspective view of a spindle for an air cushion inflation system.
Figure 52:
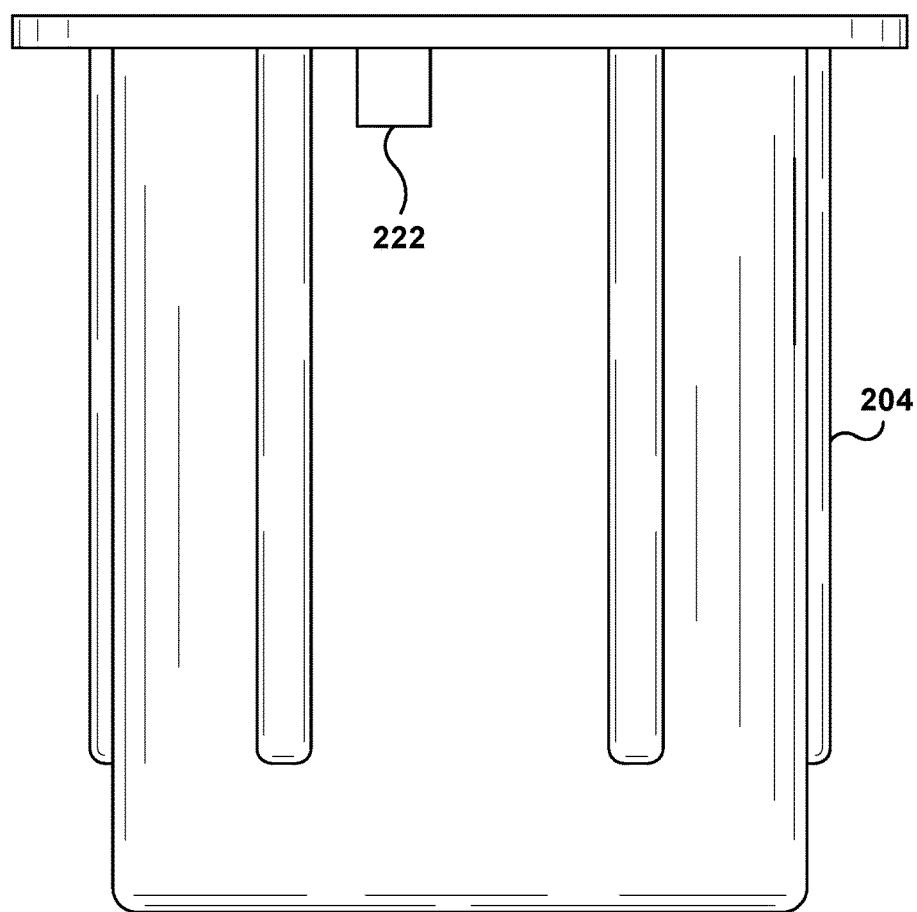
FIG. 52 is a side view of a spindle for an air cushion inflation system.
Figure 53:
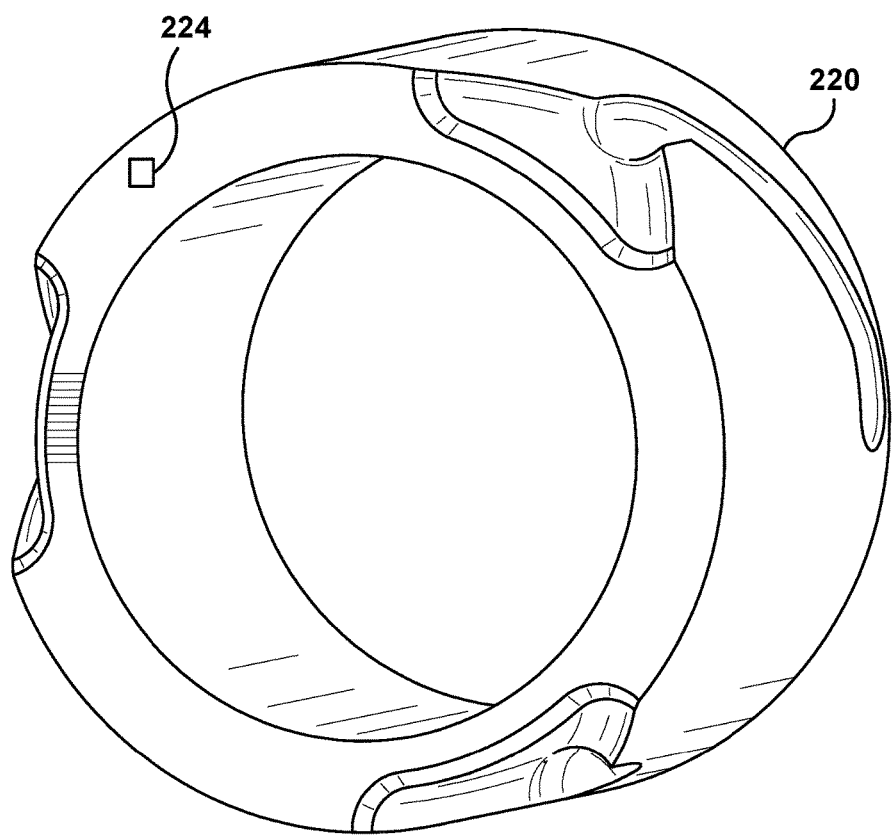
FIGS. 53 and 54 are perspective views of a spool for an air cushion inflation system.
Figure 54:
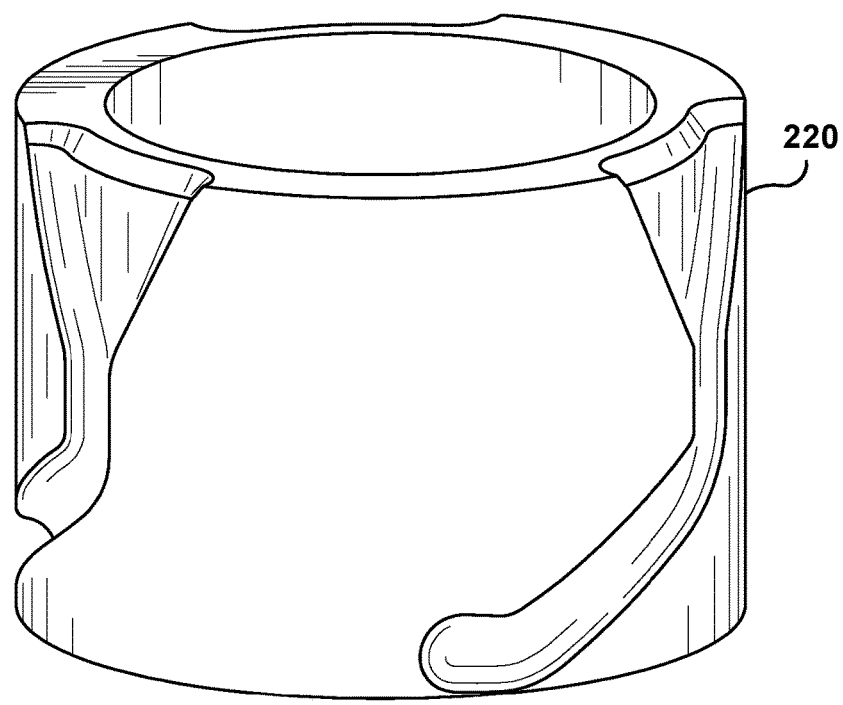

FIGS. 51 and 52 illustrate the spindle 204. FIGS. 53 and 54 illustrate the spool 220 around which the web is wrapped. A clip 222 (see FIG. 52) is used for securing the spool 220 to the spindle 204. In one embodiment, a radio-frequency identification device (RFID) 224 is included on the spool 220. The RFID 224 may be encoded with, for example, a source of at least one of the spool 220 and the web material 10 on the spool 220. The RFID 224 may also be encoded with the type of web material 10 (e.g., plastic) on the spool 220. A device (e.g., the encoder 80) on the machine 50 reads a signal from the RFID 224 to confirm the source of the at least one of the spool 220 and the web material 10 on the spool 220. In one embodiment, if the source of at least one of the spool 220 and the web material 10 on the spool 220 is not authorized, the device (e.g., the encoder 80) does not allow the machine 50 to function. In another embodiment, the device (e.g., the encoder 80) on the machine 50 also reads the type of web material 10 on the spool 220 for determining how the machine 50 will run. The encoder 80, for example, may then run the machine 50 at a speed and temperature suitable for the web material 10 on the spool 220.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, hardware, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

We claim:

1. A machine for converting a web of preformed pouches into inflated dunnage units, the pouches defined by transverse seals extending from a remote edge to within a predetermined distance from an inflation edge, the machine comprising:
   a sealing arrangement positioned to provide a longitudinal seal that intersects the transverse seals to close the preformed pouches and form a dunnage unit, the sealing arrangement having at least two sealing belts, each belt powered by a drive roller and positioned so that respective first sides engage a surface of the web and pull the web through sealing elements positioned on either side of the web;
   a heating element on a second side of the first belt not engaging the web, wherein the heating element is a substantially flat wire comprising at least one relatively higher resistance portion and at least one relatively lower resistance portion;
   a compliant material on a second side of the second belt not engaging the web;
   wherein as the web passes between the heating element and compliant material, imperfections in the web are smoothed by the compliant material and the layers of the web are sealed by the heating element.

2. The machine of claim 1, wherein the relatively higher resistance portion has a length of about four inches to about five inches.

3. The machine of claim 1, wherein the relatively lower resistance portion is coated with copper.

4. The machine of claim 1, further including
   a temperature control arrangement controlling a temperature of the relatively higher resistance portion.

5. The machine of claim 4, wherein the temperature control arrangement controls the temperature of the relatively higher resistance portion based on a feedback loop that determines a temperature of the relatively higher resistance portion based on a resistance of the relatively higher resistance portion.

6. A machine for converting a web of preformed pouches into inflated dunnage units, the pouches defined by transverse seals extending from a remote edge to within a predetermined distance from an inflation edge, the machine comprising:
   a guide pin for insertion between the transverse seals and the inflation edge to define a path of travel of the web;
   a tensioning device for frictional engagement with the web, wherein the tensioning device holds the web taught during downstream travel;
   an inflation arrangement for inflation of the preformed pouches;
   a sealing arrangement positioned to provide a longitudinal seal that intersects the transverse seals to close the preformed pouches and form a dunnage unit, the sealing arrangement having at least two sealing belts, each belt powered by a drive roller and positioned so that respective first sides engage a surface of the web and pull the web through sealing elements positioned on either side of the web;
   a heating element on one of the at least two sealing belts, wherein the heating element is a substantially flat wire comprising at least one relatively higher resistance portion and at least one relatively lower resistance portion;
   a clamping arrangement positioned to pinch the two layers of the web during travel through the sealing elements, the clamping arrangement having at least two pinching belts, each belt powered by a drive roller and positioned to engage a surface of the web and pull the web and pinch the web through the sealing elements;
   an encoder receiving speeds of the respective belts;
   wherein if the relative speeds of the respective belts is not within a predetermined tolerance, the encoder determines that an error has occurred.

7. The machine of claim 6, wherein the encoder adjusts the speeds of the respective belts to maintain the relative speeds within the predetermined tolerance.

8. The machine of claim 6, wherein the encoder determines the belt speeds based on a feedback from respective motors.

* * * * *